United States Patent
Fukunaga et al.

(10) Patent No.: US 7,346,714 B2
(45) Date of Patent: Mar. 18, 2008

(54) NOTIFICATION OF COMPLETION OF COMMUNICATION WITH A PLURALITY OF DATA STORAGE AREAS

(75) Inventors: Koji Fukunaga, Kanagawa (JP); Atsushi Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 10/654,025

(22) Filed: Sep. 4, 2003

(65) Prior Publication Data
US 2004/0057447 A1    Mar. 25, 2004

(30) Foreign Application Priority Data
Sep. 5, 2002    (JP)    ............................. 2002-260397
Dec. 24, 2002    (JP)    ............................. 2002-373106

(51) Int. Cl.
*G06F 3/00*    (2006.01)
*G06F 13/00*    (2006.01)
(52) U.S. Cl. ............................. 710/21; 710/6; 710/19; 710/20; 710/5
(58) Field of Classification Search ............... 710/36, 710/18–21, 55, 5, 6, 15
See application file for complete search history.

(56) References Cited
U.S. PATENT DOCUMENTS
2001/0027486 A1*  10/2001  Takamoto et al. ........... 709/227
2002/0026550 A1    2/2002  Suzuki et al. ................ 710/104
2003/0065865 A1    4/2003  Nakamura et al. ........... 710/305
2003/0110329 A1*   6/2003  Higaki et al. ................. 710/36
2003/0182503 A1*   9/2003  Leong et al. .................. 710/36
2004/0057448 A1*   3/2004  Nakamura ................... 370/428
2004/0215840 A1*  10/2004  Shimura ........................ 710/1

FOREIGN PATENT DOCUMENTS
JP    2000-250715    9/2000

OTHER PUBLICATIONS

"IEEE Standard for a High Performance Serial Bus", published from IEEE (The Institute of Electrical and Electronics Engineers, Inc.), Aug. 30, 1996.

P. Johansson, "Working Draft T10 Project 1467D Revision 11", Feb. 5, 2002, Information Technology - Serial Bus Protocol 3 (SBP-3). (cited in JP OA dated Aug. 20, 2007, copy provided herewith).

* cited by examiner

Primary Examiner—Kim Huynh
Assistant Examiner—Joshua D. Schneider
(74) Attorney, Agent, or Firm—Fitzpatrick, Cella, Harper & Scinto

(57) ABSTRACT

It is an object of this invention to expand an SBP-3 protocol such that two data buffers can be independently controlled. To achieve this object, a target sends responses to status blocks corresponding to two commands included in one ORB in the SBP-3, and an initiator receives these responses to the commands independently of each other. The number of times of execution and time interval are designated for each command. The target repeats a command the designated number of times at the designated time interval.

16 Claims, 47 Drawing Sheets

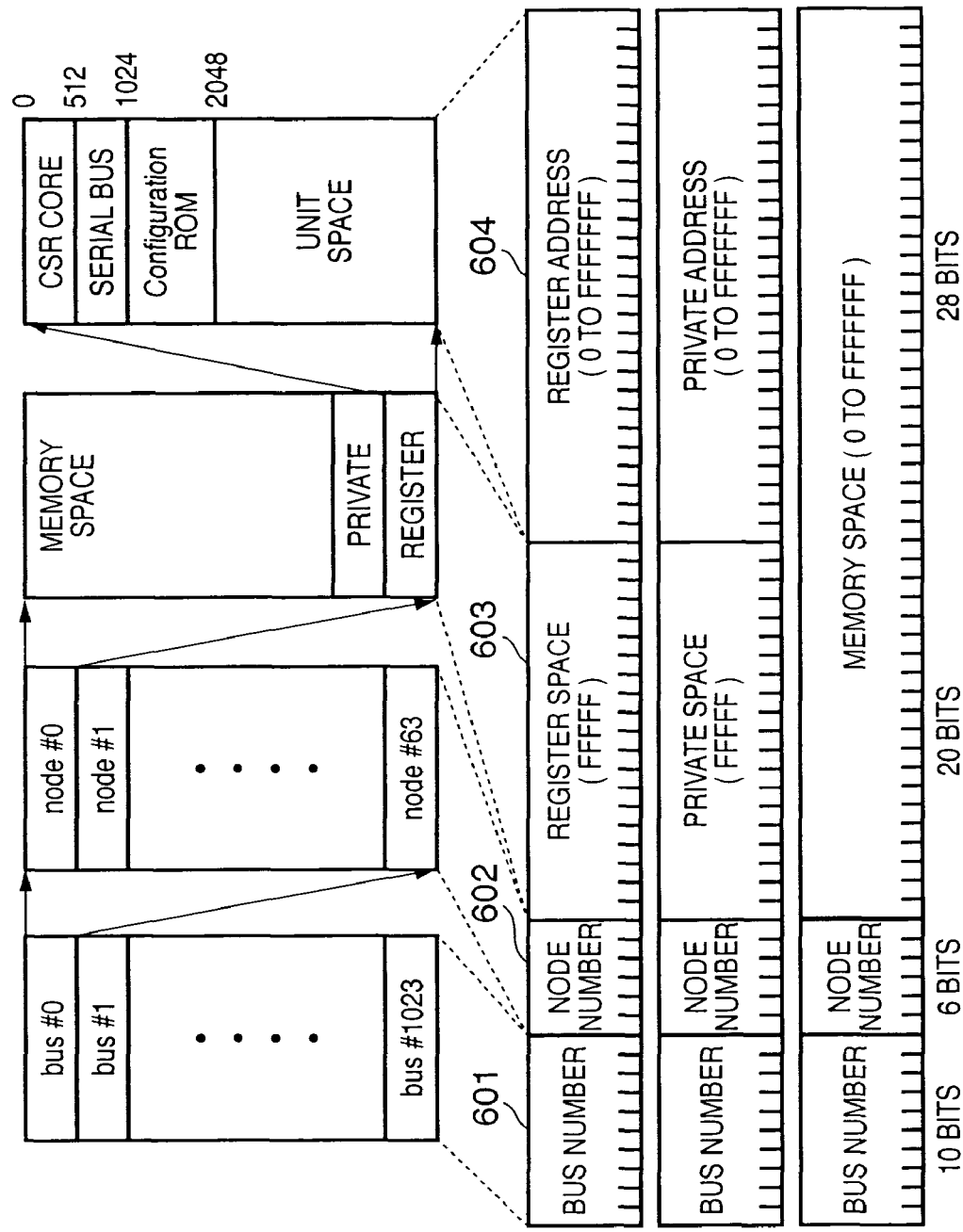

FIG. 7

| OFFSET (HEXADECIMAL NUMBER) | REGISTER NAME | FUNCTION |
|---|---|---|
| 000 | STATE_CLEAR | INFORMATION OF STATE AND CLEAR |
| 004 | STATE_SET | INFORMATION INDICATING WHETHER STATE_CLEAR CAN BE WRITTEN |
| 008 | NODE_IDS | BUS ID + NODE ID |
| 00C | RESET_START | BUS IS RESET BY WRITE IN THIS AREA |
| 010~014 | INDIRECT_ADDRESS, INDIRECT_DATA | REGISTER FOR ACCESSING ROM LARGER THAN 1 K |
| 018~01C | SPLIT_TIMEOUT | VALUE OF TIMER FOR DETECTING TIMEOUT OF SPLIT TRANSACTION |
| 020~02C | ARGUMENT, TEST_START, TEST_STATUS | REGISTER FOR DIAGNOSIS |
| 030~04C | UNITS_BASE, UNITS_BOUND, MEMORY_BASE, MEMORY_BOUND | NOT INSTALLED IN IEEE1394 |
| 050~054 | INTERRUPT_TARGET, INTERRUPT_MASK | INTERRUPT NOTIFICATION REGISTER |
| 058~07C | CLOCK_VALUE, CLOCK_TICK_PERIOD, CLOCK_STOROBE_ARRIVED, CLOCK_INFO | NOT INSTALLED IN IEEE1394 |
| 080~0FC | MESSAGE_REQUEST, MESSAGE_RESPONSE | MESSAGE NOTIFICATION REGISTER |
| 100~17C | . | RESERVED |
| 180~1FC | ERROR_LOG_BUFFER | RESERVED FOR IEEE1394 |

FIG. 8

| OFFSET (HEXADECIMAL NUMBER) | REGISTER NAME | FUNCTION |
|---|---|---|
| 200 | CYCLE_TIME | COUNTER FOR ISOCHRONOUS TRANSFER |
| 204 | BUS_TIME | REGISTER FOR TIME SYNCHRONIZATION |
| 208 | POWER_FAIL_IMMINENT | REGISTER FOR POWER SUPPLY |
| 20C | POWER_SOURCE | |
| 210 | BUSY_TIMEOUT | CONTROL RETRY OF TRANSACTION LAYER |
| 214 ~ 218 | | RESERVED |
| 21C | BUS_MANAGER_ID | NODE ID OF BUS MANAGER |
| 220 | BANDWIDTH_AVAILABLE | MANAGE BAND OF ISOCHRONOUS TRANSFER |
| 224 ~ 228 | CHANNELS_AVAILABLE | MANAGE CHANNEL NUMBER OF ISOCHRONOUS TRANSFER |
| 22C | MAINT_CONTROL | REGISTER FOR DIAGNOSIS |
| 230 | MAINT_UTILITY | |
| 234 ~ 3FC | | RESERVED |

Configuration ROM HAVING MINIMUM FORM

FIG. 11

| OFFSET (HEXADECIMAL NUMBER) | REGISTER NAME | FUNCTION |
|---|---|---|
| 800 ~ FFC | | RESERVED |
| 1000 ~ 13FC | TOPOLOGY_MAP | SERIAL BUS CONFIGURATION INFORMATION |
| 1400 ~ 1FFC | | RESERVED |
| 2000 ~ 2FFC | SPEED_MAP | SERIAL BUS TRANSFER RATE INFORMATION |
| 3000 ~ FFFC | | RESERVED |

F I G. 13
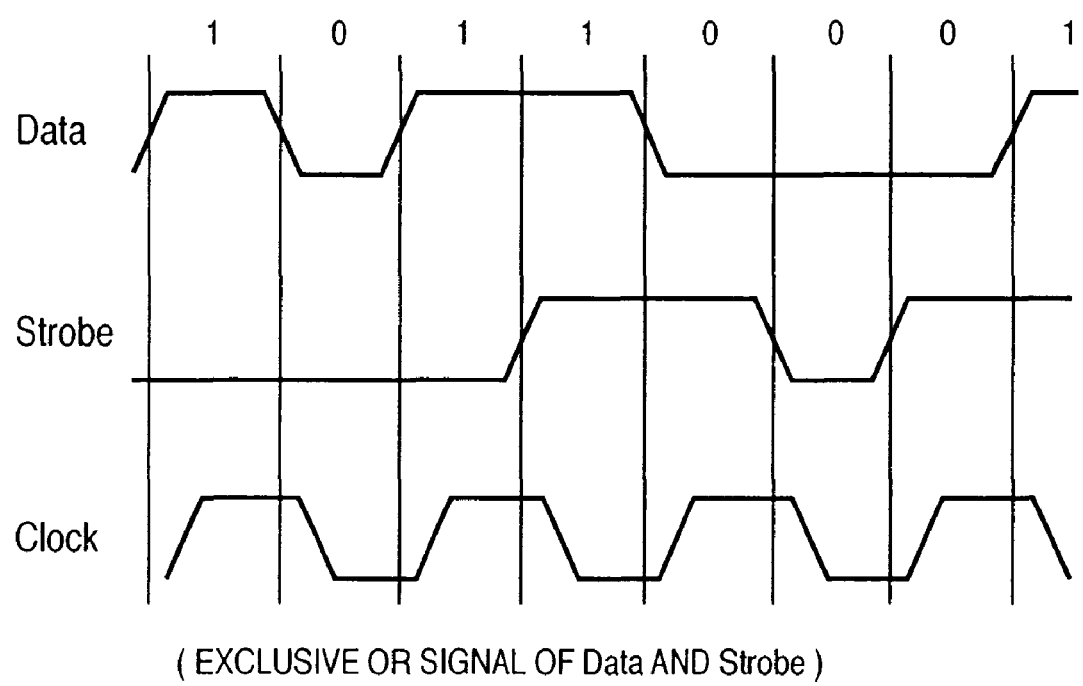
( EXCLUSIVE OR SIGNAL OF Data AND Strobe )

REQUEST FOR BUS USE RIGHT

PERMISSION OF BUS USE

FIG. 35

| src | resp | d | len | sbp_status | ORB_offset_hi | | | |
|---|---|---|---|---|---|---|---|---|
| | | | | | ORB_offset_lo | | | |
| a | b0 | b1 | | | rsv | | r | |
| | | | | | command set_dependent | | | |

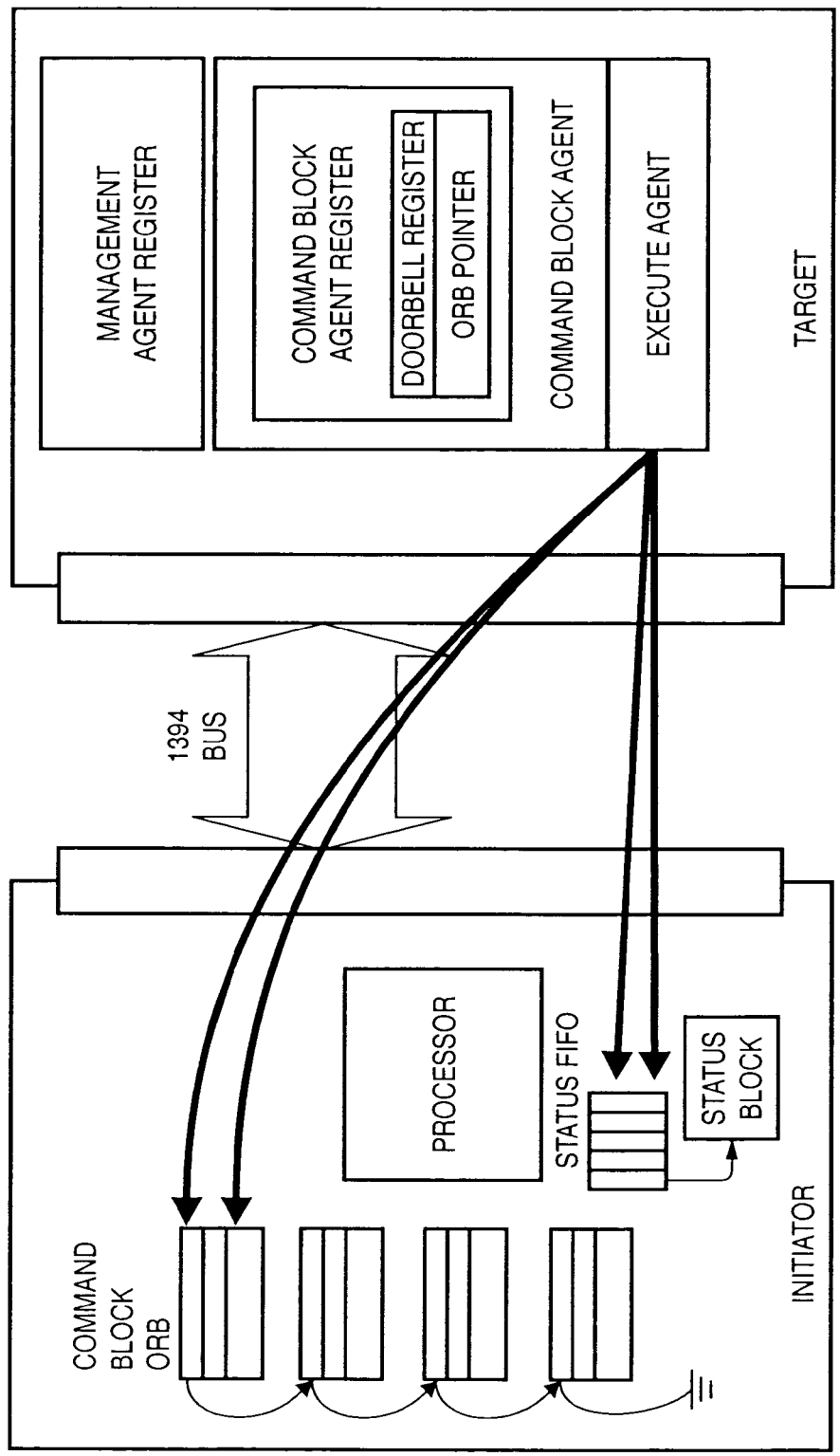
F I G. 36

FIG. 40

| Buffer1 address | | | | Buffer2 address | | | | | | |
|---|---|---|---|---|---|---|---|---|---|---|
| | | 0 | 1 | | WRITE | | 1 | | 3000 | |
| | | | 1 | | STATUS | | | | Reserved | |
| | | | | | | | -1 | | 1000 | |

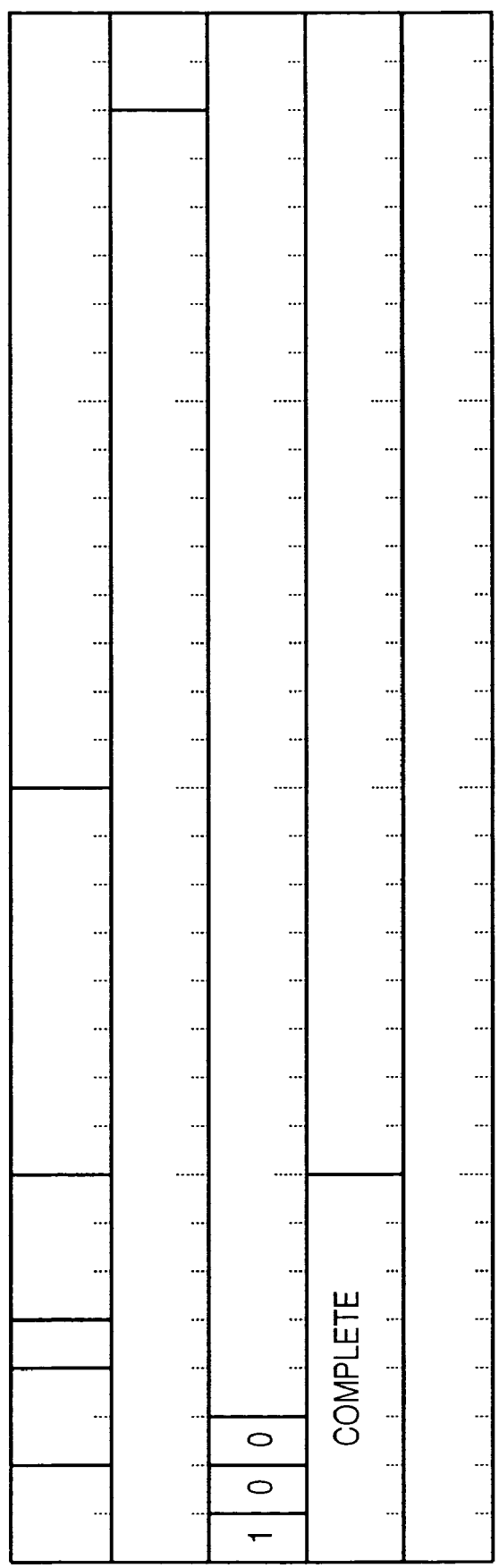

F I G. 45
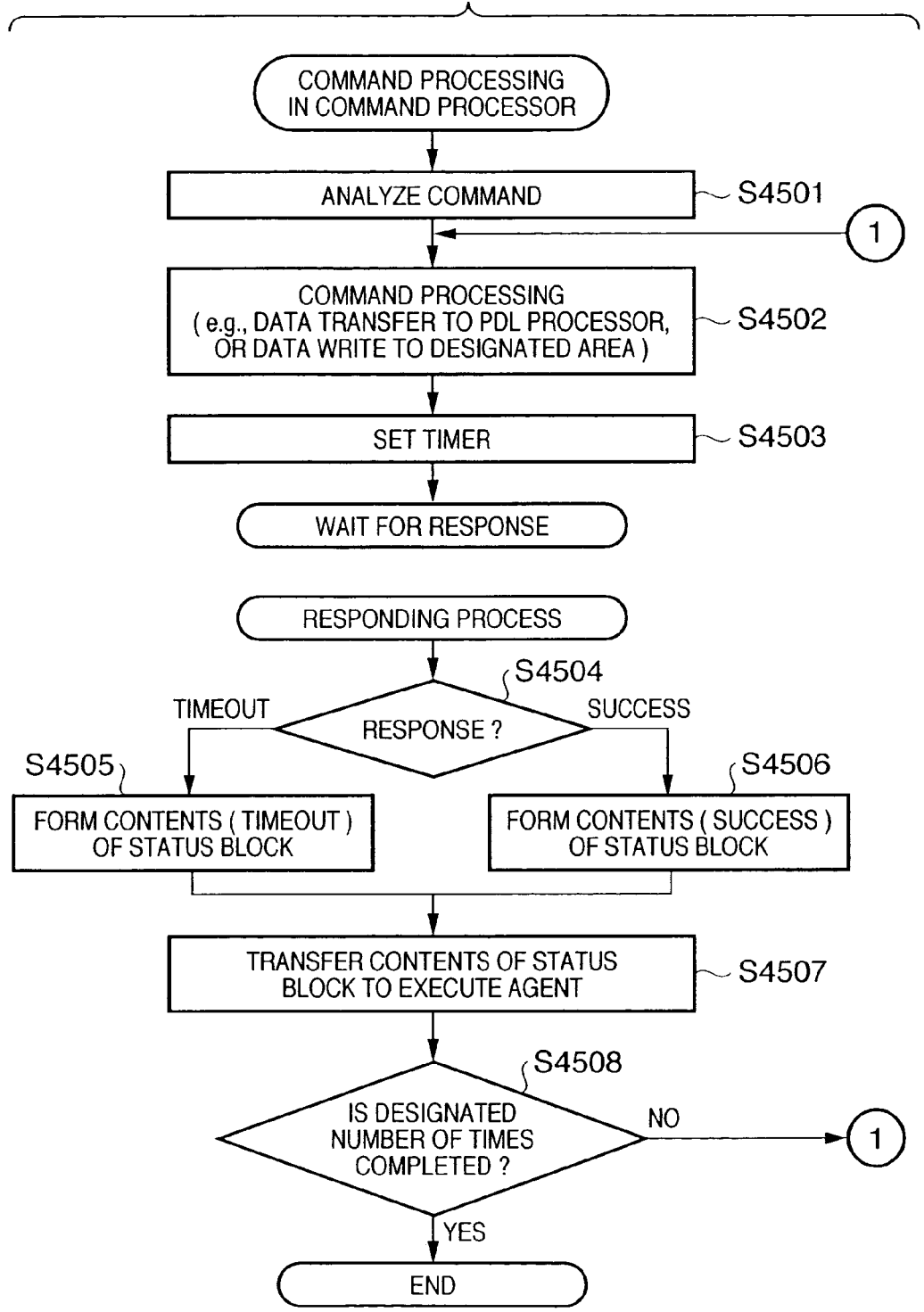

FIG. 47
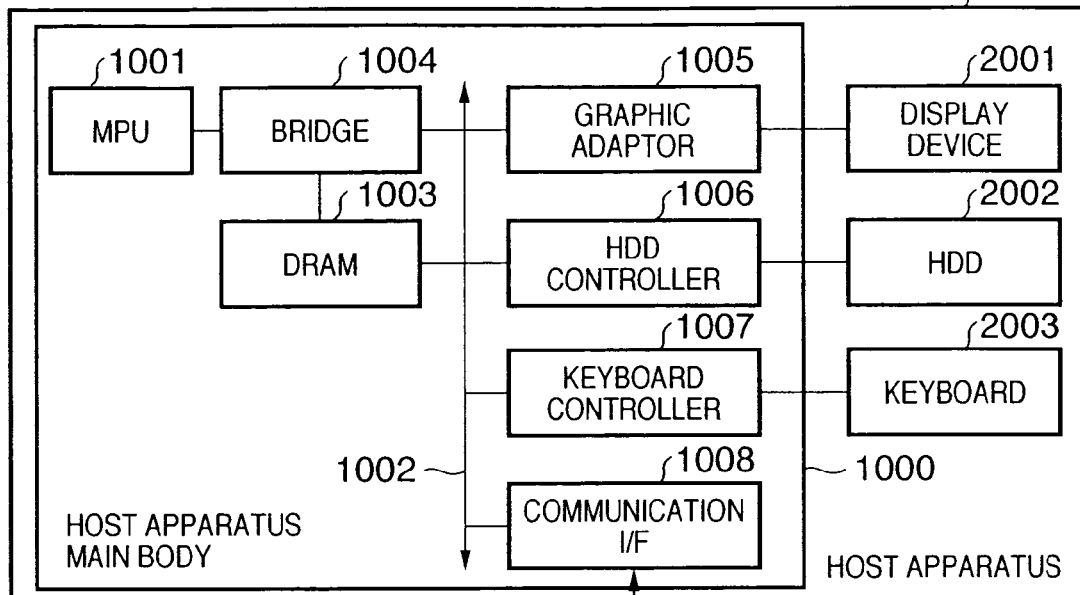
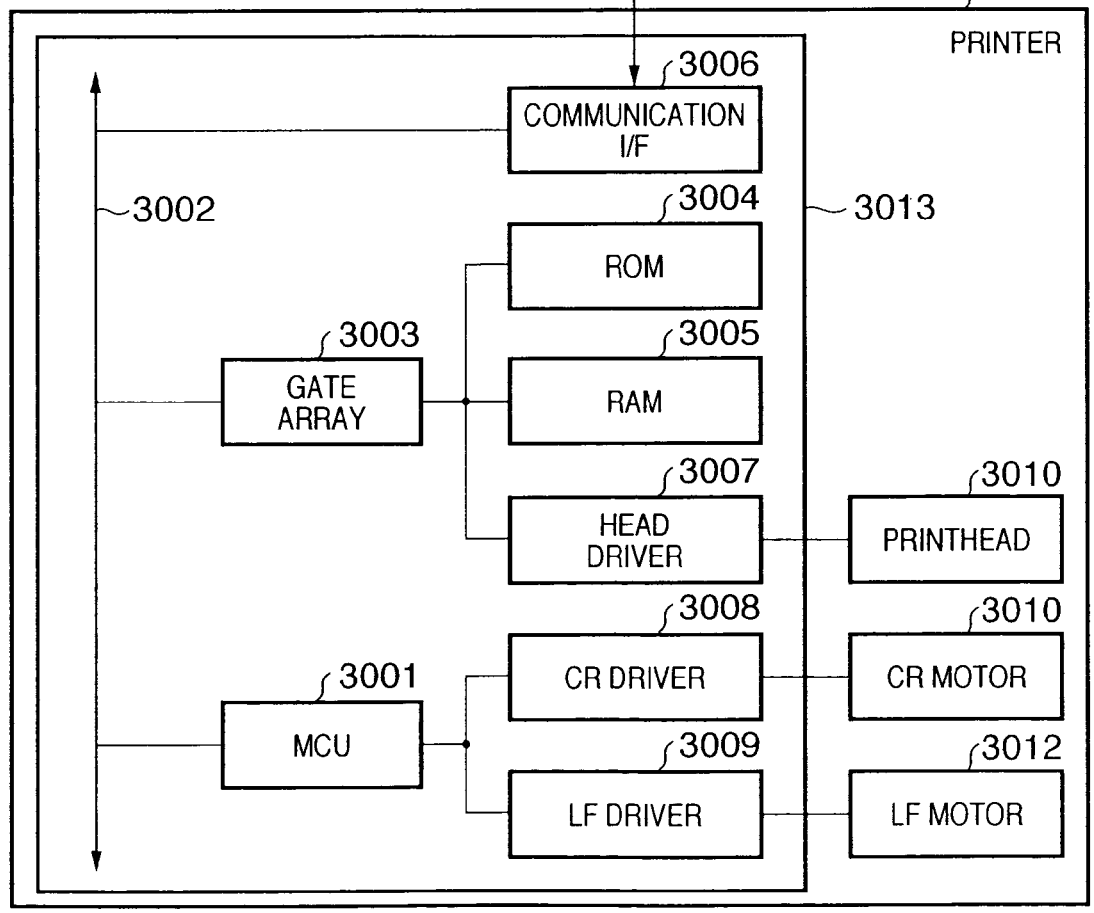

NOTIFICATION OF COMPLETION OF COMMUNICATION WITH A PLURALITY OF DATA STORAGE AREAS

FIELD OF THE INVENTION

The present invention relates to a communication system connected by an interface such as IEEE1394.

BACKGROUND OF THE INVENTION

When communication is to be performed by connecting one host and one device by using an interface such as the centronics, USB, or IEEE1394, a plurality of logic channels are connected between the host and device during one session of a communication protocol in order to control various functions, and data is transferred in each channel.

When the SBP-2 as a data communication protocol on the IEEE1394 is used, one data buffer is looked up for one ORB as a data transfer unit in one logical unit which is a pair of one initiator and one target. Accordingly, communication is performed by a single data channel in one way, or one-way, half-duplex data communication is performed. This makes a plurality of logic channels difficult to realize. The standard of the SBP-3 as a function expanded version of the SBP-2 is currently being defined. This SBP-3 is so expanded to allow two data buffers to be looked up for ORB as a data transfer unit in a logical unit, thereby realizing two data transfer channels for one logical unit.

Unfortunately, in data transfer performed by the SBP-3, flow control of the two data transfer channels is performed for each ORB. Therefore, if data transmission and reception cannot be performed any longer in one data transfer channel for some reason, or if data transfer in one data transfer channel is slower than in the other, the fast channel is influenced by the slow channel. This is so because even when access to one data buffer is normally terminated, if access to the other data buffer is not completed, a completion notification (status block) with respect to the ORB cannot be transmitted to the initiator of the SBP-3, and this delays data transfer as a logical unit.

Also, when a command set by which two data buffers and two commands can be arranged in one ORB is to be realized by the SBP-3, data transfer can be more efficiently performed in some cases depending on a target device if each command is executed under independent conditions.

SUMMARY OF THE INVENTION

The present invention has been made in consideration of the above prior art, and has as its object to provide a communication system which realizes a plurality of channels while efficiently transferring data.

Also, the present invention has been made in consideration of the above prior art, and has as its object to provide a communication system which can set independent conditions for each command and executes a command under the conditions set for the command.

To achieve the above objects, the communication system of the present invention includes the following arrangements.

An information processing system includes first and second apparatuses, wherein the first apparatus has a transmitting unit adapted to transmit to the second apparatus one request in which a plurality of data storage areas are designated, and the second apparatus has a completion notifying unit adapted to notify the first apparatus that data communication to one of the plurality of data storage areas is completed.

Alternatively, an information processing system includes first and second apparatuses, wherein the first apparatus has two data buffers allocated to one command ORB by using one logical unit, and the second apparatus has a descriptor for performing data communication between the two data buffers, and a completion notifying unit adapted to notify that data communication to one of the two data buffers is completed.

Preferably, the completion notifying unit independently notifies completion of data communication for each of the plurality of data storage areas.

Alternatively, to achieve the above objects, the communication method of the present invention includes the following arrangements.

A method of communication between first and second apparatuses includes the steps of transmitting a request in which a plurality of data storage areas are designated from the first apparatus to the second apparatus, and notifying the first apparatus, from the second apparatus, that data communication to one of the plurality of data storage areas is completed.

Alternatively, a method of communication between a plurality of apparatuses comprises a step of looking up two data buffers for one command ORB;

a completion notification step of notifying that any descriptor designated by the ORB has completed data communication; and a step of notifying update information of the data buffer.

The first and second apparatuses are preferably connected by a communication control bus based on IEEE1394.

Preferably, in the transmission step, a request block including identification information indicating each of the plurality of data storage areas and commands each corresponding to one of the plurality of data storage areas is transmitted.

The second apparatus preferably writes data in a data storage area indicated by the identification information, or loads data from a data storage area indicated by the identification information, in accordance with the command.

Alternatively, to achieve the above objects, the information processing apparatus of the present invention includes the following arrangements.

An information processing apparatus capable of communicating with another apparatus, comprises a transmitting unit adapted to transmit to the another apparatus one request in which a plurality of data storage areas are designated; and a unit adapted to receive completion notification indicating that data communication from the another apparatus to one of the plurality of data storage areas is completed.

The transmitting unit preferably transmits a request block including identification information indicating each of the plurality of data storage areas, and commands each corresponding to one of the plurality of data storage areas.

Alternatively, an information processing apparatus capable of communicating with another apparatus, comprises a receiving unit adapted to receive one request in which a plurality of data storage areas are designated, from the another apparatus in which a plurality of data buffers are allocated to one command block; and a completion notifying unit adapted to notify that data communication to one of the plurality of data storage areas is completed.

Preferably, the apparatus further comprises a determining unit adapted to determine, on the basis of identification information indicating each of the plurality of data storage areas, whether a data storage area is designated by a previously received request.

Preferably, the apparatus further comprises a data communicating unit adapted to write data in a data storage area indicated by the identification information, or loads data from a data storage area indicated by the identification information, in accordance with the command.

Alternatively, a communication apparatus capable of communicating with another apparatus, comprises a generating unit adapted to generate a command block including a plurality of commands each corresponding to one of a plurality of data storage areas, and conditions each corresponding to one of the plurality of commands; and a transmitting unit adapted to transmit the command block generated by the generating unit to the another apparatus.

The condition preferably includes the number of times of execution or execution interval of a command.

The apparatus preferably holds a list of command blocks to be transferred to the another apparatus, and, when receiving execution results of all commands included in one command block from the another apparatus, deletes the command block from the list.

Alternatively, a communication apparatus capable of communicating with another apparatus comprises a receiving unit adapted to receive a command block including a plurality of commands each corresponding to a plurality of data storage areas, and conditions each corresponding to one of the plurality of commands; and a data communicating unit adapted to perform data communication with a data storage area in accordance with each of the plurality of commands included in the command block received by the receiving unit, and a condition corresponding to the command.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a block diagram explaining an address space in a 1394 interface;

FIG. 7 is a table showing the addresses and functions of information stored in a CSR core resistor in the 1394 interface;

FIG. 8 is a table showing the addresses and functions of information stored in a serial bus resistor in the 1394 interface;

FIG. 11 is a table showing the addresses and functions of information stored in a serial bus device register in the 1394 interface;

FIG. 13 is a timing chart for explaining a DS-Link coding system;

FIG. 35 shows the format of a status FIFO in the SBP-3 improved version;

FIG. 36 is a block diagram showing the operation of a command ORB in the SBP-3 improved version;

FIG. 40 is a diagram showing a practical example of the command block ORB in this embodiment;

FIG. 41 is a diagram showing a practical example of a normally terminated status FIFO in this embodiment;

FIG. 45 is a flow chart showing an example of a procedure performed by a command processor in this embodiment;

FIG. 47 is a hardware block diagram of a printing system in this embodiment.

DETAILED DESCRIPTION OF THE PREFERRED EMBODIMENTS

An embodiment of the present invention will be described in detail below with reference to the accompanying drawings.

Figure 1:
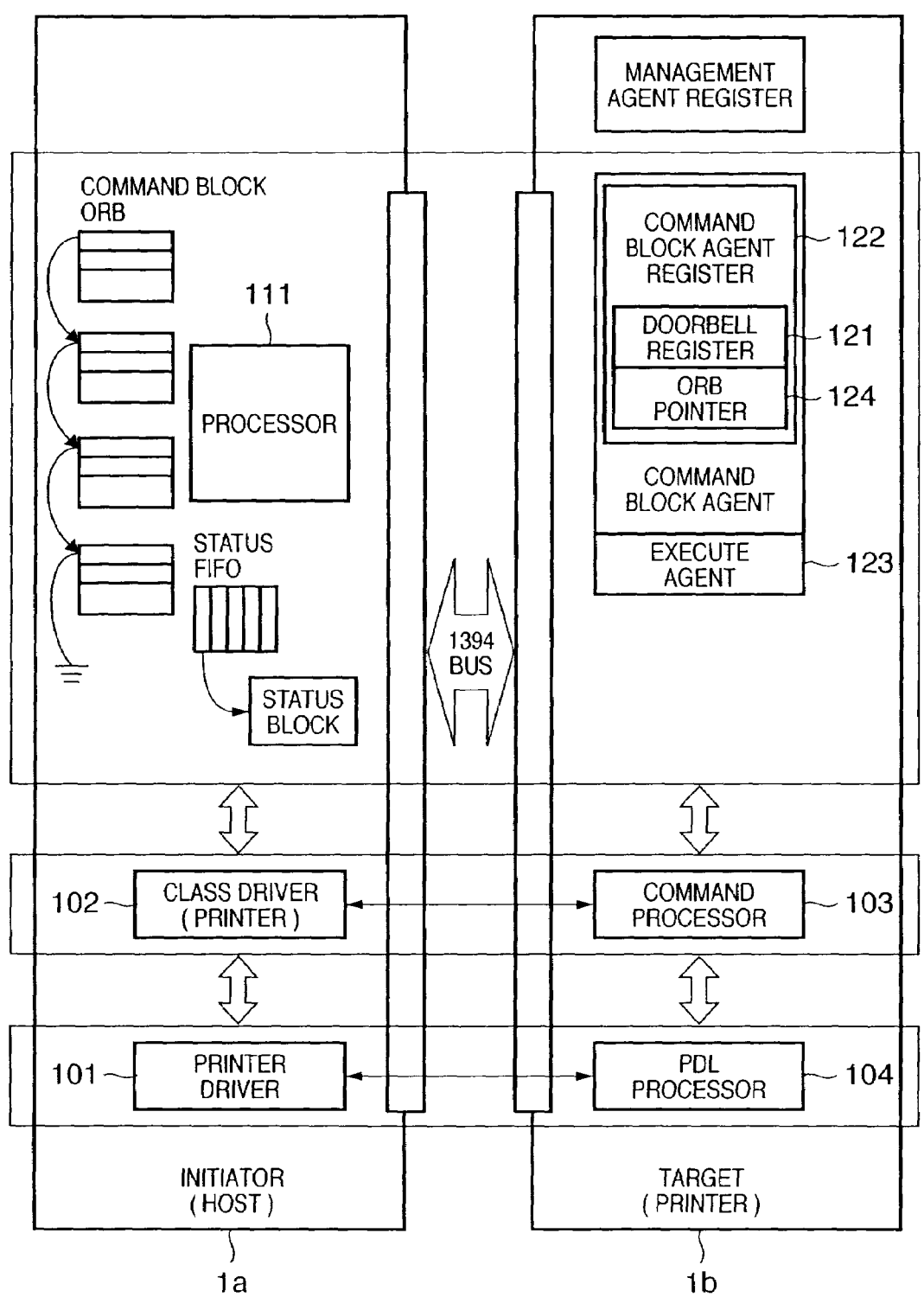
FIG. 1 is a block diagram showing the arrangement of a host-printer communication system of the present invention.

FIG. 1 is a block diagram best illustrating the present invention, in which a host computer (to be referred to as a host hereinafter) 1-*a* and printer 1-*b* connected by the IEEE1394 are shown.

Communication between a computer A and printer B is performed by using the SBP(Serial Bus Protocol)-3 (improved version) as a typical data transfer protocol used on an IEEE1394 interface. LUN0 is predetermined as a communication channel for performing data transfer between the host and printer. Note that the SBP-3 (improved version) is obtained by slightly changing the standardized SBP-3. An outline of this SBP-3 (improved version) will be explained later.

In this embodiment, on the SBP-3 (improved version), a protocol layer is defined between a class driver 102 (in this embodiment, a printer class) of the initiator and a command processor 103 of the target. On this protocol layer, an application layer protocol is defined between a printer driver 101 on the initiator and a PDL processor 104 on the target. The core of the arrangements made in the application layer is the definition of a page description language (PDL). An interlayer is present between the SBP-3 and the application layer and defined in accordance with the type of device and the like. In this embodiment, the device is defined as a printer. The procedure in this layer will be explained later.

<Outline of Techniques of IEEE1394>

The techniques of the IEEE1394-1995 standard applied to the digital interface of this embodiment will be briefly described below. Details of the IEEE1394-1995 standard are described in "IEEE Standard for a High Performance Serial Bus" published from IEEE (The institute of Electrical and Electronics Engineers, Inc.), Aug. 30, 1996.

(1) Outline

Figure 2:
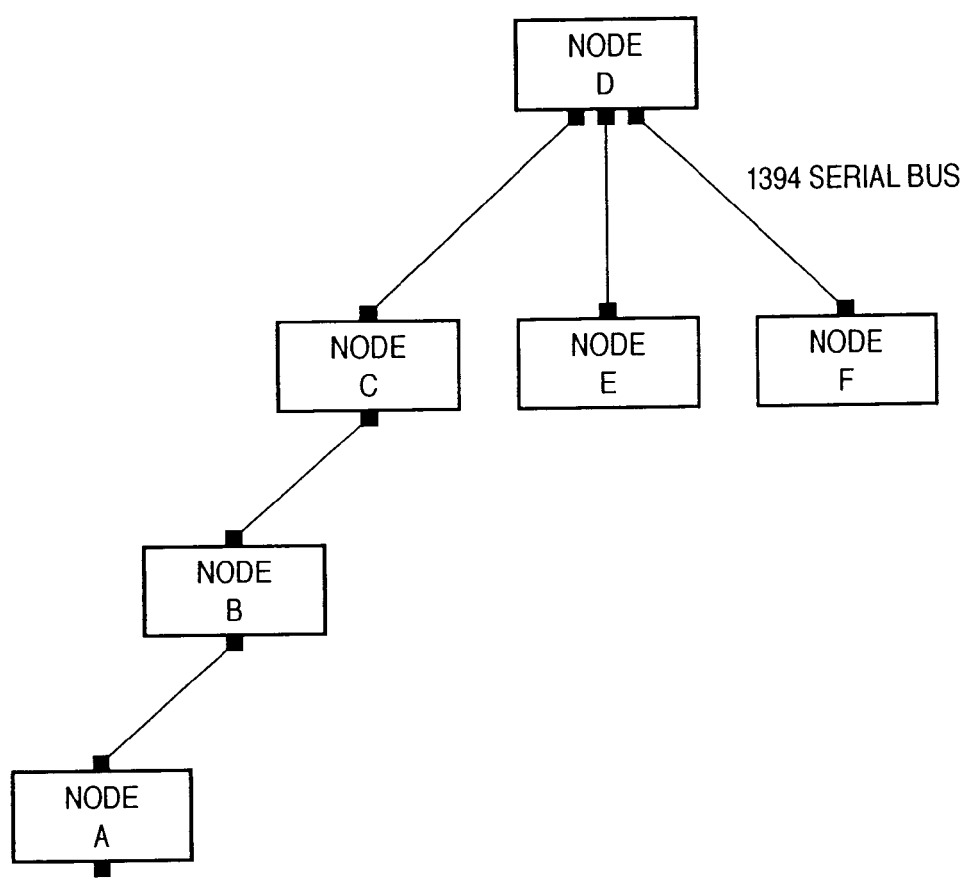
FIG. 2 is a block diagram showing the arrangement of a network using a 1394 serial bus.

FIG. 2 shows an example of a communication system (to be referred to as a 1394 network) made up of nodes each having a digital interface (to be referred to as a 1394 interface hereinafter) based on the IEEE1394. This 1394 network is a bus type network capable of communicating serial data.

Referring to FIG. 2, nodes A to F are connected via communication cables based on the IEEE1394. For example, the nodes A to F are a PC (Personal Computer), digital VTR (Video Tape Recorder), DVD (Digital Video Disk) player, digital camera, hard disk, and monitor.

The 1394 network corresponds to a daisy chain connection system and node branching connection system, and can realize connections having a high degree of freedom.

In the 1394 network, bus reset is automatically performed when the existing apparatus is deleted, a new apparatus is added, or the power supply of the existing apparatus is turned on or off. By this bus reset, the 1394 network can automatically recognize the new connection configuration and allocate ID information to each apparatus. With this function, the 1394 network can always monitor the network connection configuration.

Also, the 1394 network has a function of relaying data transferred from another apparatus. With this function, all apparatuses can check the operating status of the bus.

Furthermore, the 1394 network has a function called plug & play. This function allows the network to automatically recognize a connected apparatus, by only connecting the apparatus, without turning off the power supplies of all apparatuses.

The 1394 network corresponds to data transfer rates of 100, 200, and 400 Mbps. An apparatus having a higher data transfer rate can support a lower data transfer rate. Accordingly, apparatuses corresponding to different data transfer rates can be connected.

In addition, the 1394 network corresponds to two different data transfer modes (i.e., an asynchronous transfer mode and isochronous transfer mode).

The asynchronous transfer mode is effective to transfer data (i.e., a control signal or file data) requiring asynchronous transfer if necessary. The isochronous transfer mode is effective to transfer data (i.e., video data or audio data) requiring continuous transfer of a predetermined amount of data at a predetermined data rate.

The asynchronous transfer mode and isochronous transfer mode can be mixed in each communication cycle (one cycle is normally 125 μS). Each transfer mode is executed after a cycle start packet (to be referred to as a CSP hereinafter) indicating the start of a cycle. In the period of each communication cycle, the isochronous transfer mode is given priority to the asynchronous mode. Also, the transfer band of the isochronous transfer mode is guaranteed in each communication cycle.

(2) Architecture

The constituent elements of the 1394 interface will be described below with reference to FIG. 3.

The 1394 interface is functionally made up of a plurality of layers (hierarchical layers). Referring to FIG. 3, the 1394 interface is connected to the 1394 interface of another node via a communication cable 301 based on the IEEE1394 standard. Also, the 1394 interface has at least one communication port 302 which is connected to a physical layer 303 included in hardware.

Figure 3:
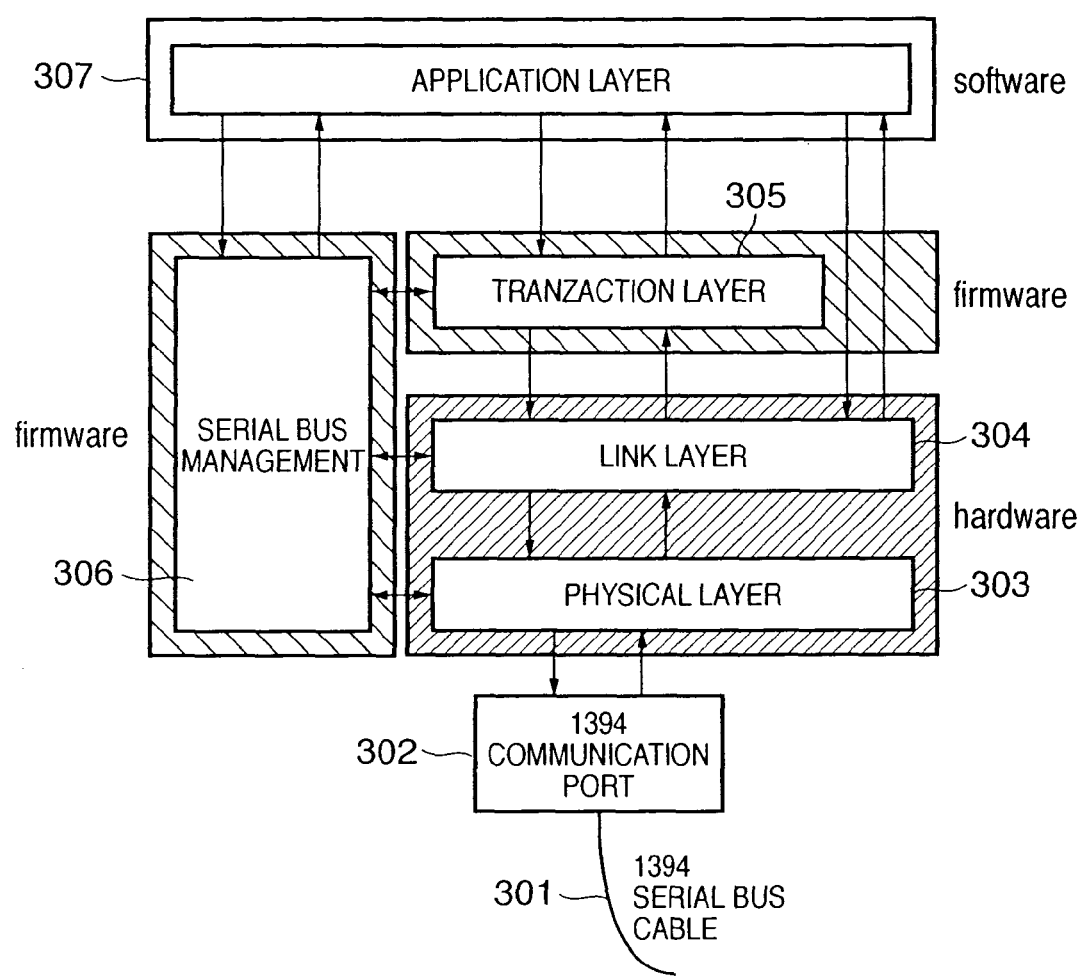
FIG. 3 is a block diagram showing the constituent elements of a 1394 serial bus of the present invention.

In FIG. 3, this hardware includes the physical layer 303 and a link layer 304. The physical layer 303 physically and electrically interfaces with another node, detects bus reset and performs corresponding processing, encodes and decodes input and output signals, arbitrates the bus use right, and the like. The link layer 304 generates, transmits, and receives communication packets, controls a cycle timer, and the like.

Referring to FIG. 3, firmware includes a transaction layer 305 and serial bus management 306. The transaction layer 305 manages the asynchronous transfer mode, and provides various transactions (read, write, and lock). The serial bus management 306 provides functions of controlling its own node, managing the connection state of its own node, managing ID information of its own node, and managing resources of the serial bus network, on the basis of a CSR architecture (to be described later).

These hardware and firmware described above substantially construct the 1394 interface, and their basic configurations are defined by the IEEE1394 standard.

An application layer 307 included in software depends on application software used, and controls the way data is communicated across the network. For example, when motion image data of a digital VTR is to be communicated, the application layer 307 is defined by a communication protocol such as the AV/C protocol.

(2-1) Link Layer 304

Figure 4:
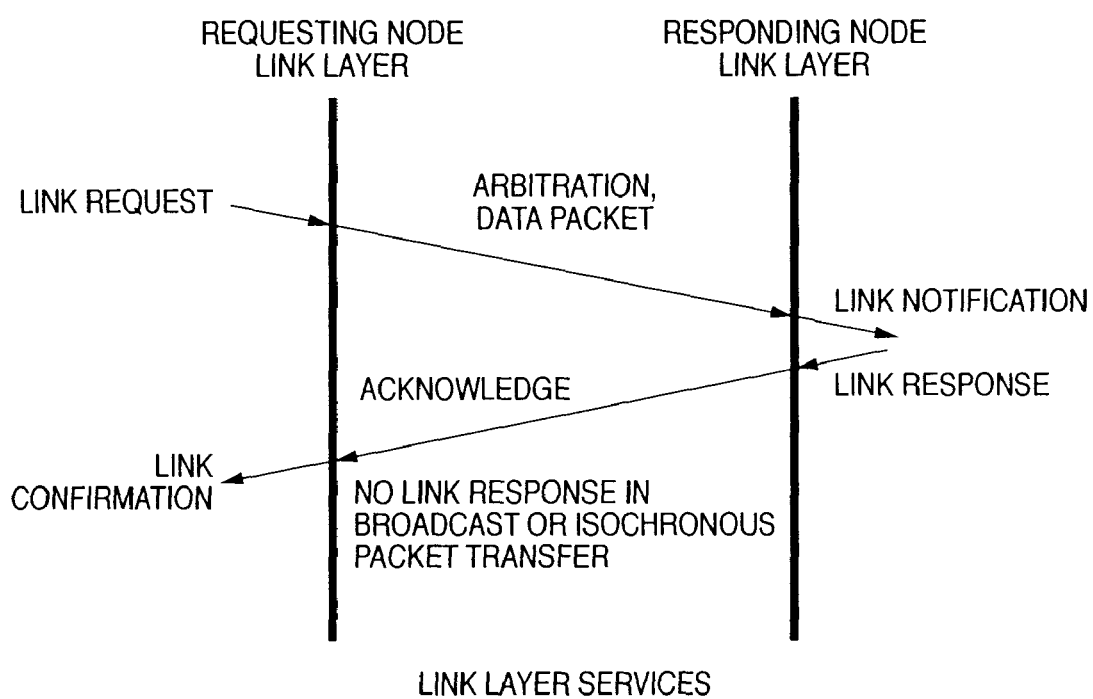
FIG. 4 is a diagram showing services which can be provided by a link layer of the 1394 serial bus of the present invention.

FIG. 4 is a diagram showing services which can be provided by the link layer 304. Referring to FIG. 4, the link layer 304 provides the four services: (1) link request (LK_DATA.request) which requests a responding node to transfer a predetermined packet; (2) link notification (LK_DATA.indication) which notifies a responding node of reception of a predetermined packet; (3) link response (LK_DATA.response) which indicates that acknowledge from a responding node is received; and (4) link confirmation (LK_DATA.confirmation) which confirms acknowledge from a requesting node. Note that link response (LK_DATA.response) does not exist in broadcast communication and in transfer of an isochronous packet.

On the basis of the above services, the link layer 304 realizes the two types of transfer modes described above, i.e., the asynchronous transfer mode and isochronous transfer mode.

(2-2) Transaction Layer 305

Figure 5:
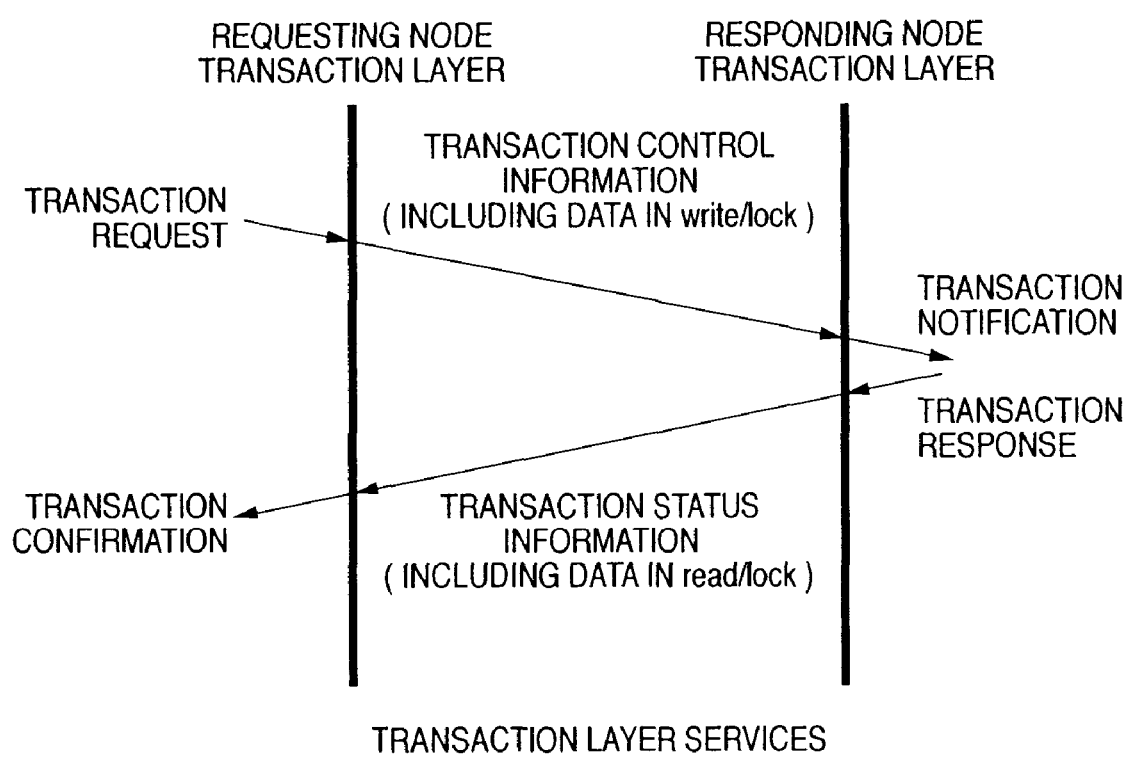
FIG. 5 is a diagram showing services which can be provided by a transaction layer of the 1394 serial bus of the present invention.

FIG. 5 is a diagram showing services which can be provided by the transaction layer 305. Referring to FIG. 5, the transaction layer 305 provides the four services: (1) transaction request (TR_DATA.request) which requests a responding node to transfer a predetermined transaction; (2) transaction notification (TR_DATA.indication) which notifies a responding node of reception of a predetermined transaction request; (3) transaction response (TR_DATA.response) which indicates that status information (including data in the case of write or lock) from a responding node is received; and (4) transaction confirmation (TR_DATA.confirmation) which confirms status information from a requesting node.

On the basis of the above services, the transaction layer 305 manages asynchronous transfer, and achieves the following three types of transactions, i.e., (1) read transaction, (2) write transaction, and (3) lock transaction.

(1) Read transaction: a requesting node reads out information stored at a predetermined address of a responding node.

(2) Write transaction: a requesting node writes predetermined information at a predetermined address of a responding node.

(3) Lock transaction: a requesting node transfers reference data and update data to a responding node, compares information in a predetermined address of the responding node with the reference data, and, in accordance with the comparison result, updates the information in the predetermined address to the update data.

(2-3) Serial Bus Management 306

The serial bus management 306 can provide the three functions: (1) node control, (2) isochronous resource manager (to be referred to as IRM hereinafter), and (3) bus manager.

(1) The node control provides a function of managing the individual layers described above, and managing asynchronous transfer executed between its own node and another node.

(2) The IRM provides a function of managing isochronous transfer executed between its own node and another node. More specifically, the IRM manages information necessary to allocate a transfer band width and channel number, and provides another node with these pieces of information.

The IRM uniquely exists on a local bus, and is dynamically selected from a plurality of candidates (nodes having the functions of the IRM) whenever bus reset is performed. The IMR can also provide some of functions (e.g., connection configuration management, power supply management, and rate information management) which can be provided by a bus manager (to be described below).

(3) The bus manager has the functions of the IRM, and provides a bus managing function more advanced than the IRM. More specifically, the bus manager performs more advanced power supply management (which manages information indicating whether power can be supplied through a communication cable, information indicating whether power supply is necessary, and the like for each node), more advanced rate information management (which manages the maximum transfer rate between individual nodes), more advanced connection configuration management (which forms a topology map), and performs bus optimization and the like on the basis of these pieces of management information. In addition, the bus manager has a function of providing other nodes with these pieces of information.

The bus manger can also provide an application with services for controlling the serial bus network. Examples of the services are serial bus control request (SB_CONTROL.request), serial bus event control confirmation (SB_CONTROL.confirmation), and serial bus event notification (SB_CONTROL.indication).

SB_CONTROL.request is a service by which an application requests bus reset.

SB_CONTROL.confirmation is a service which confirms SB_CONTROL.request for an application.

SB_CONTROL.indication is a service which notifies an application of asynchronously occurring events.

(3) Address Designation

FIG. 6 is a block diagram explaining an address space in the 1394 interface. The 1394 interface defines a 64-bit wide address space in accordance with a CSR (Command and Status Register) architecture based on ISO/IEC 13213:1994.

Referring to FIG. 6, a field 601 having the first ten bits is used as an ID number for designating a predetermined bus. A field 602 having the next six bits is used as an ID number for designating a predetermined apparatus (node). These 16 upper bits are called "node ID", and each node identifies another node by this node ID. Also, each node can communicate with another node by identifying the other node by using the node ID.

A field made up of the 48 remaining bits designates an address space (256-Mbyte structure) of each node. A field 603 including 20 bits of these 48 bits designates a plurality of regions forming the address space.

In the field 603, a portion "0-0xFFFFD" is called a memory space. A portion "0xFFFFE" is called a private space which each node can freely use. A portion "0xFFFFE" is called a register space which stores information common to nodes connected to the bus. Each node can control communication with another node by using this information in the register space.

A field 604 having the last 28 bits designate an address which stores information common to nodes or unique to a corresponding node.

For example, in the register space, the first 512 bytes are used for a core (CSR core) register of the CSR architecture. FIG. 7 shows the addresses and functions of information stored in this CSR core register. In FIG. 7, "offset" is a relative position from "0xFFFFF0000000".

The next 512 bytes are used as a serial bus register. FIG. 8 shows the addresses and functions of information stored in this serial bus register. In FIG. 8, "offset" is a relative position from "0xFFFFF0000200".

Figure 9:
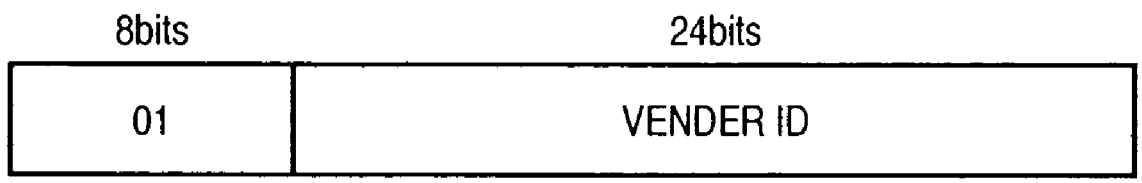
FIG. 9 is a table showing a configuration ROM having a minimum form in the 1394 interface.

The next 1,024 bytes are used for a configuration ROM. This configuration ROM has a minimum form or a general form, and is arranged from "0xFFFFF0000400". FIG. 9 shows a configuration ROM having the minimum form. Referring to FIG. 9, a vender ID is a 24-bit numerical value uniquely assigned to each vender by the IEEE.

Figure 10:
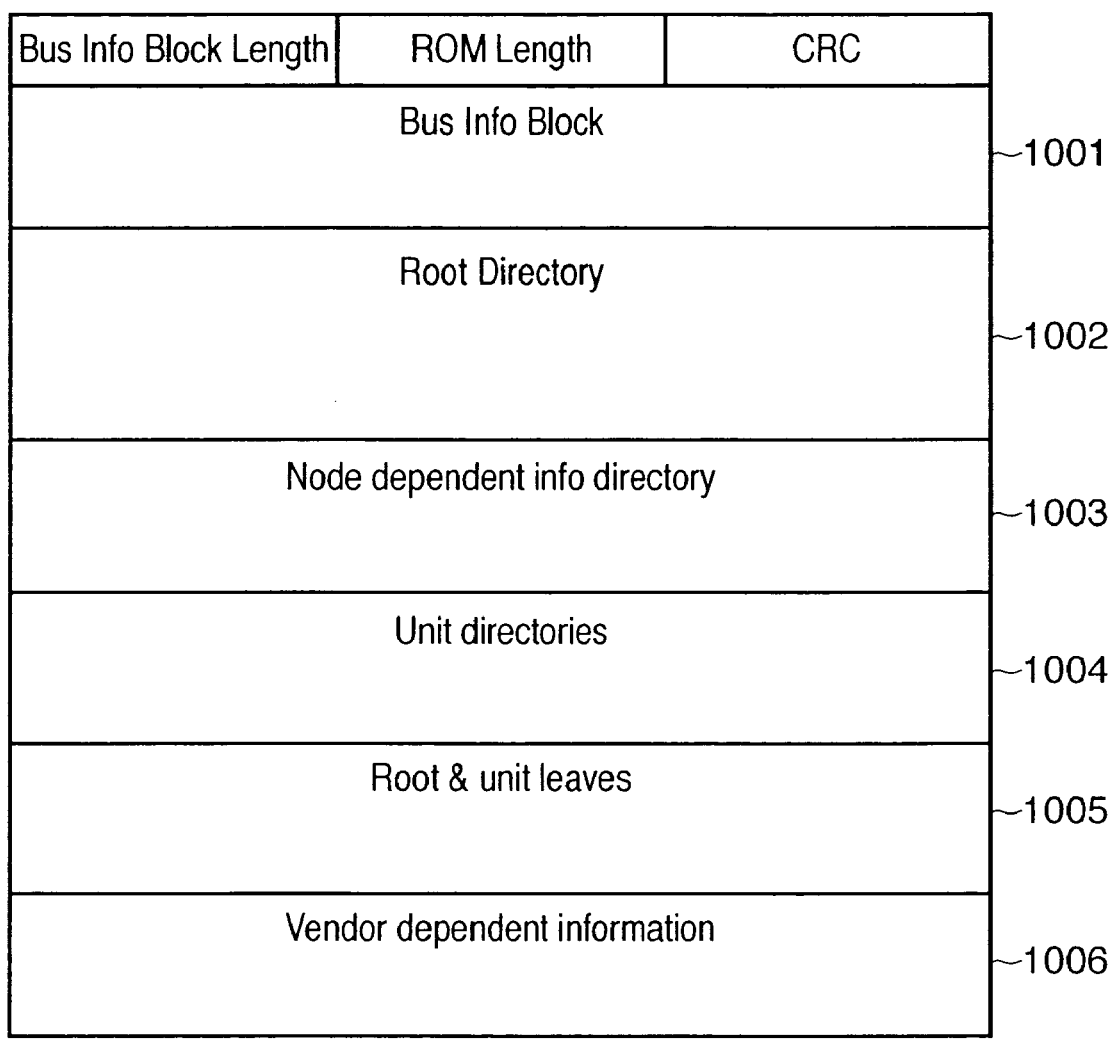
FIG. 10 is a diagram showing a configuration ROM having a general form in the 1394 interface.

FIG. 10 shows a configuration ROM having the general form. Referring to FIG. 10, the vender ID described above is stored in a root directory 1002. A bus info block 1001 and root leaf 1005 can hold a node unique ID as unique ID information for identifying each node.

This node unique ID is a unique ID capable of specifying one node regardless of the manufacturer or machine type. The node unique ID is made up of 64 bits. The 24 upper bits indicate the vender ID described above, and the 48 lower bits indicate information (e.g., the serial number of a node) which can be freely set by the manufacturer manufacturing the node. This node unique ID is used to, e.g., continuously identify a specific node before and after bus reset.

In FIG. 10, the root directory 1002 can hold information concerning the basic functions of a node. Detailed function information is stored in subdirectories (unit directories 1004) offset from the root directory 1002. For example, the unit directories 1004 store information concerning software units supported by the node. More specifically, the unit directories 1004 hold information pertaining to a data transfer protocol for data communication between nodes, a command set for defining a predetermined communication procedure, and the like.

In FIG. 10, a node dependent info directory 1003 can hold information unique to the device. The node dependent info directory 1003 is offset by the root directory 1002.

In FIG. 10, vendor dependent information 1006 can hold information unique to the vender which manufactures or sells each node.

The remaining region is called a unit space. This unit space designates an address storing information unique to each node, e.g., ID information (e.g., the company name and machine type name) and use conditions of each apparatus. FIG. 11 shows the addresses and functions of information stored in a serial bus device register in the unit space. In FIG. 11, "offset" is a relative position from "0xFFFFF0000800".

Generally, to simplify design of different types of bus systems, each node must use only the first 2,048 bytes of the register space. That is, each node is desirably made up of the CSR core register, the serial bus register, the configuration ROM, and the first 2,048 bytes of the unit space, i.e., a total of 4,096 bytes.

(4) Arrangement of Communication Cable

Figure 12:
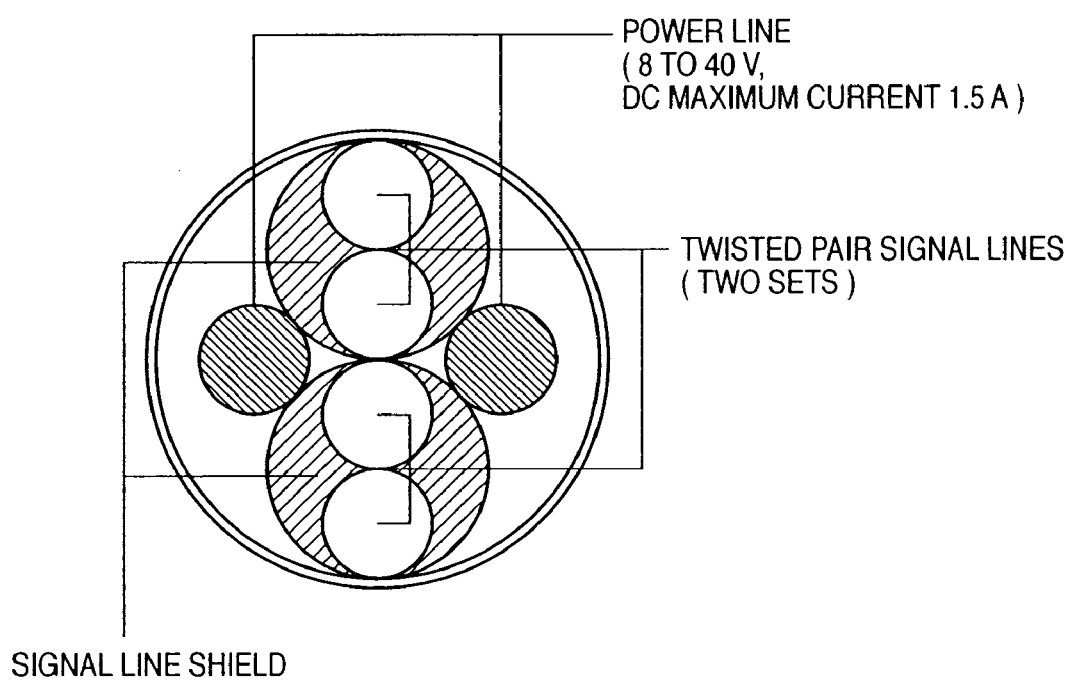
FIG. 12 is a sectional view of a communication cable based on the IEEE1394 standard.

FIG. 12 is a sectional view of a communication cable based on the IEEE1394 standard.

This communication cable includes two sets of twisted pair signal lines and a power line. Since the power line is formed, the 1394 interface can supply power even to an apparatus whose main power supply is turned off, an apparatus whose power is lowered by a failure, and the like. The power supply voltage flowing through the power line is 8 to 40 V, and the maximum electric current is DC 1.5 A.

The two sets of twisted pair signal lines transmit an information signal encoded by a DS-Link (Data/Strobe Link) coding system. FIG. 13 is a view for explaining this DS-Link coding system.

This DS-Link coding system is suited to high-speed serial data communication, and requires two sets of twisted pair lines. One set of twisted pair lines transmit a data signal, and the other set of twisted pair lines transmit a strobe signal. The receiving side can reproduce the clock by calculating exclusive OR of the data signal and strobe signal received from the two sets of signal lines.

The use of the DS-Link coding system gives the following advantages to the 1394 interface. (1) The transfer efficiency is higher than other coding systems. (2) A PLL circuit is unnecessary, so the circuit scale of a controller LSI can be decreased. (3) Since information indicating an idling state need not be sent, a transceiver circuit can be readily set in a sleep state, and this reduces the power consumption.

(5) Bus Reset

The 1394 interface of each node can automatically detect a change in connection configuration of the network. If a change is detected, the 1394 network performs processing called bus reset following the procedure explained below. This change in connection configuration can be detected by a change in bias voltage applied from a communication port of each node.

A node which has detected a change (e.g., insertion or removal of a node, or an increase or decrease in the number of nodes caused by ON or OFF of the power supply of a node) in connection configuration of the network, or a node which must recognize a new connection configuration transmits a bus reset signal onto the bus via the 1394 interface.

The 1394 interface of a node which has received this bus reset signal transmits the occurrence of bus reset to its own link layer 304, and transfers the bus reset signal to other nodes. Each node which has received the bus reset signal clears the network connection configuration recognized so far and node IDs assigned to the individual apparatuses. After all the nodes have finally detected the bus reset signal, each node automatically performs initialization (i.e., recognition of the new connection configuration and assignment of new node IDs) corresponding to the bus reset.

Bus reset can be activated by a change in connection configuration as described above, and can also be activated, under the control of the host, when the application layer 307 directly issues an instruction to the physical layer 303.

When bus reset is activated, data transfer is temporarily stopped. After initialization corresponding to the bus reset is completed, data transfer is resumed under the new network.

(6) Sequence after Activation of Bus Reset

After bus reset is activated, the 1394 interface of each node automatically executes recognition of a new connection configuration and assignment of new node IDs. A basic sequence from the start of bus reset to the assignment of node IDs will be described below with reference to FIGS. 14 to 16.

Figure 14:
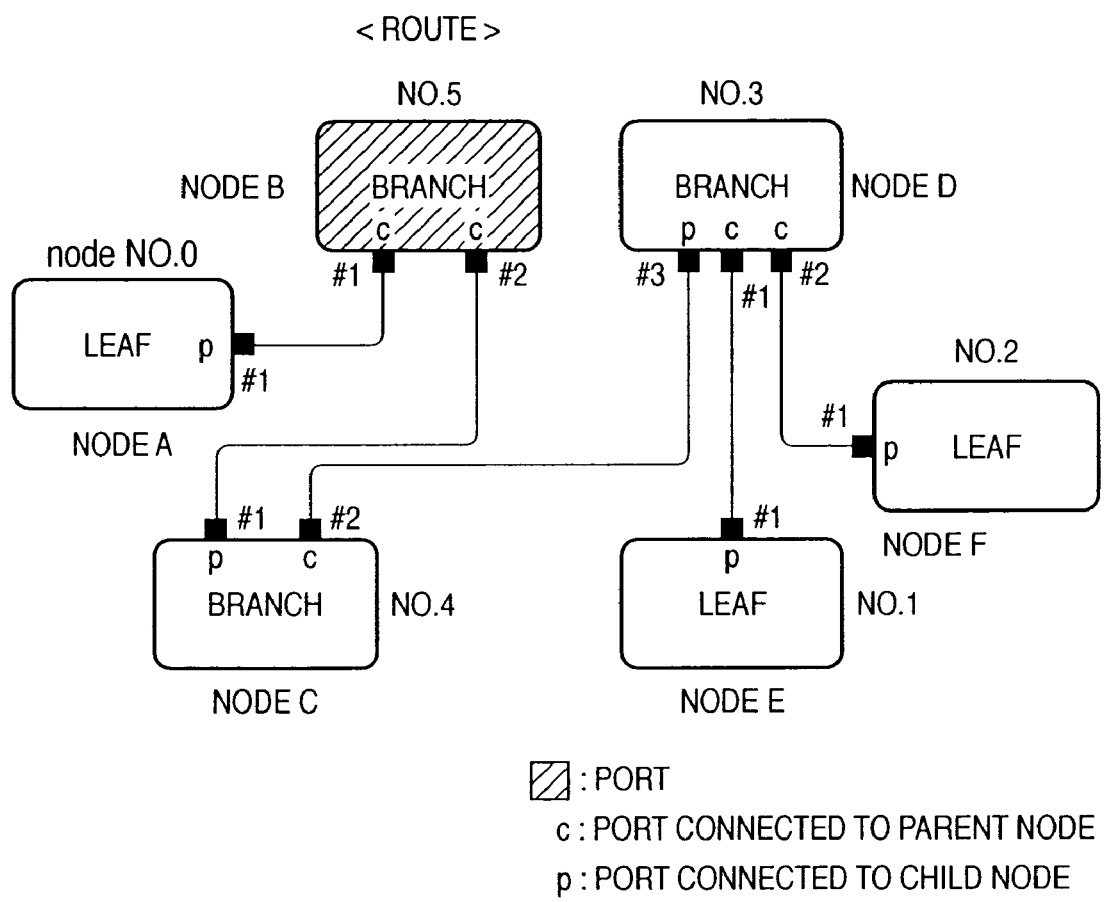
FIG. 14 is a block diagram showing the basic sequence from the start of bus reset to the assignment of node IDs.

FIG. 14 is a block diagram for explaining the state after bus reset is activated in the 1394 network shown in FIG. 2.

Referring to FIG. 14, a node A has one communication port, a node B has two communication ports, a node C has two communication ports, a node D has three communication ports, a node E has one communication port, and a node F has one communication port. Each communication port of each node is assigned a port number for identifying the port.

Processing from the start of bus reset to the assignment of node IDs shown in FIG. 14 will be described below with reference to a flow chart in FIG. 15.

Figure 15:
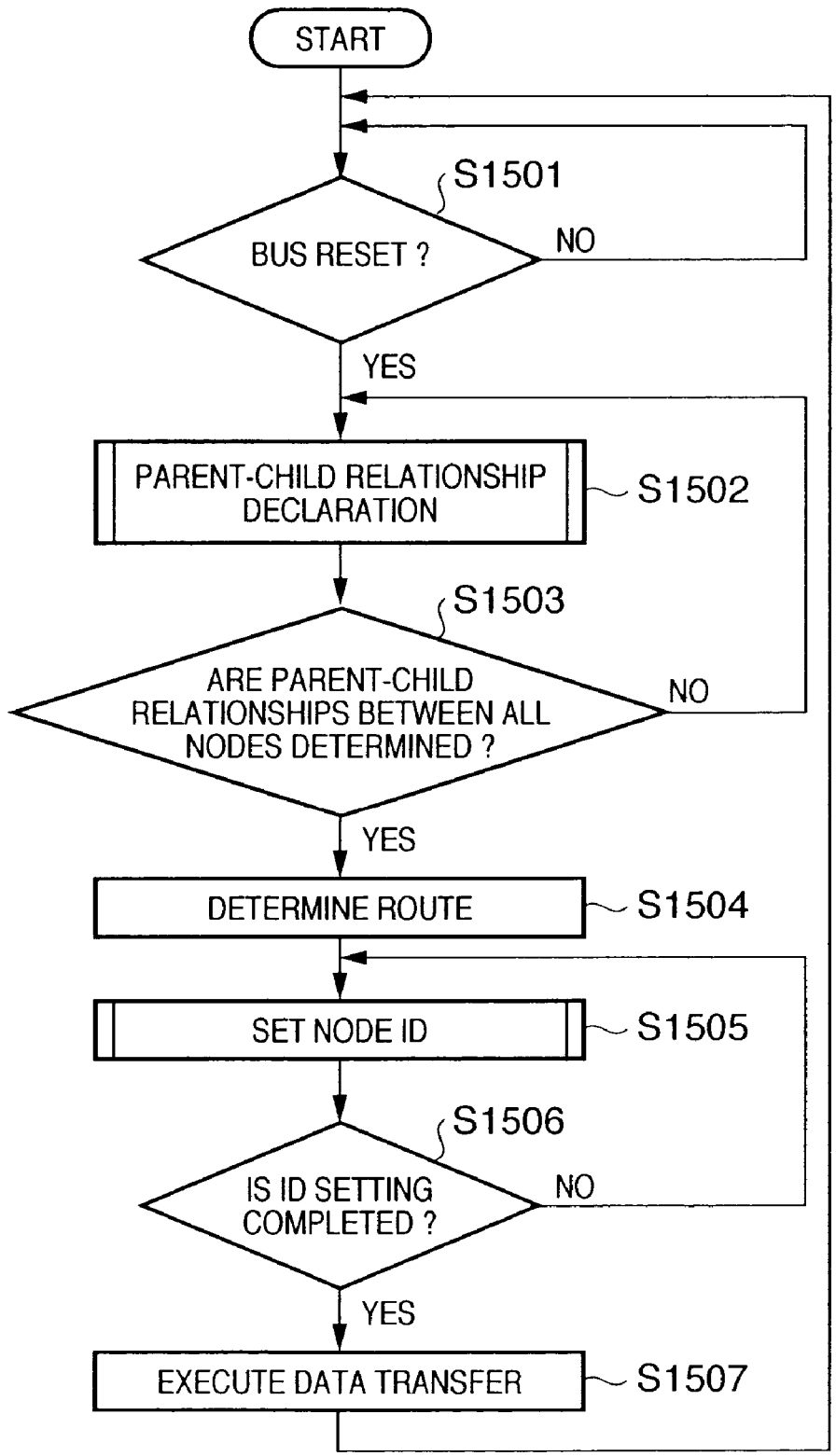
FIGS. 15 and 16 are flow charts showing the basic sequence from the start of bus reset to the assignment of node IDs.

Referring to FIG. 15, the nodes A to F forming the 1394 network always monitor whether bus reset occurs (step S1501). If a bus reset signal is output from a node which has detected a change in connection configuration, each node executes the following processing.

After the occurrence of bus reset, the individual nodes declare parent-child relationships between the communication ports of these nodes (step S1502).

Each node repeats the processing in step S1502 until parent-child relationships between all the nodes are determined (step S1503).

After the parent-child relationships between all the nodes are determined, the 1394 network determines a node which performs network arbitration, i.e., determines a route (step S1504).

After the route is thus determined, the 1394 interface of each node executes an operation of automatically setting the node ID of its own node (step S1505).

Each node executes the processing in step S1505 following a predetermined procedure until node IDs are set for all the nodes (step S1506).

After node IDs are finally set for all the nodes, each node executes isochronous transfer or asynchronous transfer (step S1507).

While executing the processing in step S1507, the 1394 interface of each node monitors occurrence of bus reset again. If bus reset occurs, the processing after step S1501 is executed again.

Following the above procedure, the 1394 interface of each node automatically executes recognition of a new connection configuration and assignment of new node IDs whenever bus reset is activated.

(7) Determination of Parent-Child Relationships

The processing in step S1502 shown in FIG. 15 (i.e., the process of recognizing the parent-child relationships between the nodes) will be described in detail below with reference to FIG. 16.

Figure 16:
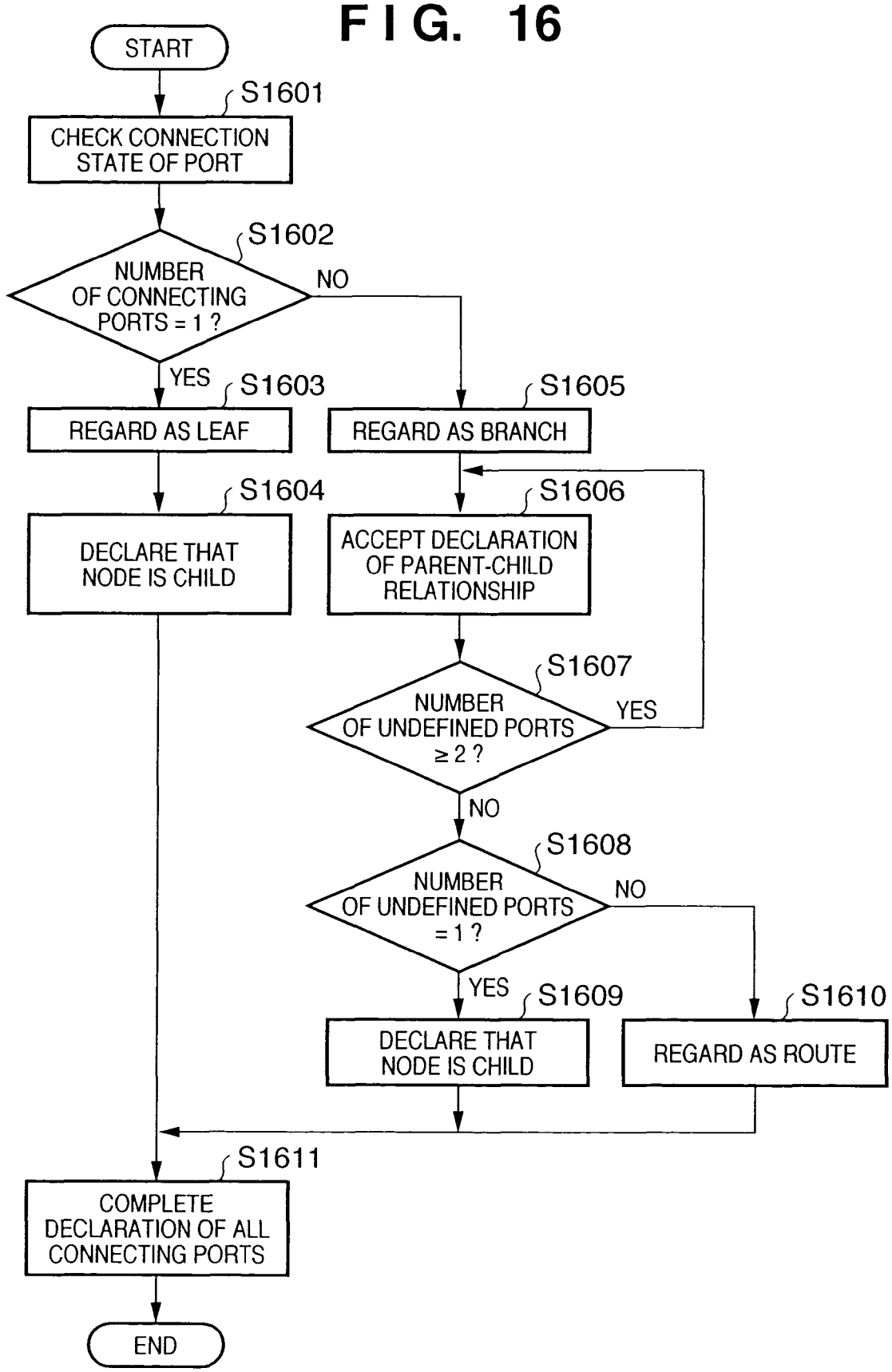

In FIG. 16, after bus reset occurs, each of the nodes A to F on the 1394 network checks the connection state (connected or unconnected) of its own port (step S1601).

After checking the connection state of each port, each node counts the number of communication ports (to be referred to as connecting ports hereinafter) connected to other nodes (step S1602).

If the number of connecting ports is found to be 1 in step S1602, the node regards itself as a "leaf" (step S1603). A "leaf" is a node connected to only one node.

A leaf node declares to the node connected to the connecting port that "this node is a child" (step S1604). The leaf regards its connecting port as a "parent port (a communication port connected to a parent node)".

Parent-child relationship declaration is first performed between a leaf as the terminal end of the network and a branch, and then sequentially performed between branches.

The parent-child relationships between nodes are determined in turn from communication ports which can perform declaration earlier. Between individual nodes, each communication port which has declared that the port is a child is regarded as a "parent port", and a communication port which has received this declaration is regarded as a "child port (a communication port connected to a child node)". For example, in FIG. 14, the nodes A, E, and F declare parent-child relationships after regarding themselves as leaves. Consequently, the parent-child relationships are determined such that the nodes A and B are a child and parent, the nodes E and D are a child and parent, and the nodes F and D are a child and parent.

If the number of connecting ports is found to be 2 or more in step S1602, the node regards itself as a "branch" (step S1605). A branch is a node connected to two or more nodes.

A branch node accepts a parent-child relationship declaration from a node connected to each connecting port (step S1606). A connecting port which has accepted a declaration is regarded as a "child port".

After regarding one connecting port as a "child port", the branch determines whether there are two or more connecting ports (undefined ports) whose parent-child relationships have not been determined yet (step S1607). If two or more undefined ports are present, the branch performs the operation in step S1606 again.

If only one undefined port is present in step S1607, the branch regards this undefined port as a "parent port", and declares to a node connected to the port that "this node is a child" (steps S1608 and S1609).

The branch cannot declare to other nodes that this node is a child, until the number of remaining undefined ports is 1. For example, in FIG. 14, the nodes B, C, and D regard themselves as branches, and accept a declaration from a leaf or another branch. The node D declares a parent-child relationship to the node C, after the parent-child relationships between the nodes D and E and the nodes D and F are determined. Also, the node C which has accepted this declaration from the node D declares a parent-child relationship to the node B.

If no undefined port is present in step S1608 (i.e., if all the connecting ports of the branch are parent ports), the branch regards itself as a route (step S1610).

For example, in FIG. 14, the node B all the connecting ports of which are parent ports is regarded by other nodes as a route for arbitrating communication on the 1394 network. In this example, the node B is regarded as a route. However, if the parent-child relationship declaration timing of the node B is earlier than that of the node C, another node may also be regarded as a route. That is, any node can be a route depending on its declaration timing. Accordingly, the same node is not always a route even in the same network configuration.

When the parent-child relationships of all the connecting ports are thus declared, each node can recognize the connection configuration of the 1394 network as a hierarchical structure (tree structure) (step S1611). The parent node is an apper node of this hierarchical structure, and the child node is a lower node of the hierarchical structure.

(8) Node ID Assignment

Figure 17:
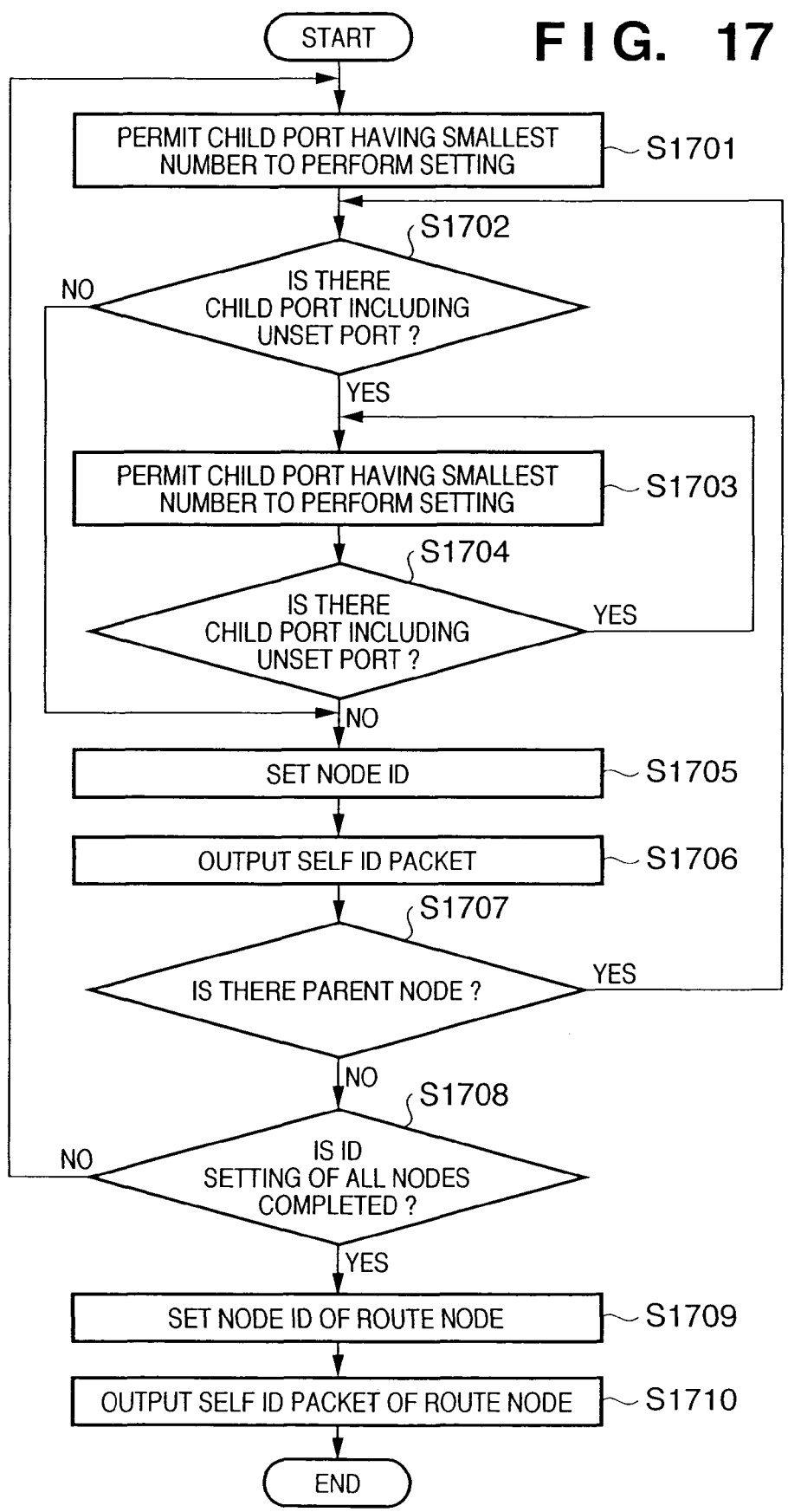
FIG. 17 is a flow chart for explaining details of the process (i.e., the process of automatically allocating the node IDs of individual nodes) in step S1505 shown in FIG. 15.

FIG. 17 is a flow chart for explaining details of the processing in step S1505 shown in FIG. 15 (i.e., the process of automatically assigning the node ID to each node). The node ID is made up of a bus number and node number. In this embodiment, assume that individual nodes are connected to the same bus and assigned the same bus number.

Referring to FIG. 17, the route gives node ID setting permission to a communication port having the smallest number, among other child ports to which nodes whose node IDs are unset are connected (step S1701).

In FIG. 17, the route sets the node IDs of all nodes connected to the child port having the smallest number, regards this child port as "already set", and performs the same control for a child port having the second smallest number. After finally setting the node IDs of all nodes connected to the child ports, the route sets its own node ID. Note that the node numbers included in the node IDs are basically assigned from leaves to branches in the order of 0, 1, 2, . . . Accordingly, the route has the largest node number.

In step S1701, a node which has obtained the setting permission determines whether there is a child port including a node whose node ID is unset, among other child ports of the node (step S1702).

If a child port including an unset node is detected in step S1702, the node which has obtained the setting permission performs control so as to give the setting permission to a node directly connected to that child port (step S1703).

This node which has obtained the setting permission by the processing in step S1703 determines whether there is a child port including a node whose node ID is unset, among other child ports of the node (step S1704). If a child port including an unset node is detected in step S1704, this node executes the processing in step S1703 again.

If no child port including an unset node is found in step S1702 or S1704, the node which has obtained the setting permission sets its own node ID (step S1705).

The node which has set its own node ID broadcasts a self ID packet containing, e.g., its own node number, and information indicating the connection state of a communication port (step S1706). "Broadcast" is to transfer a communication packet of a certain node to many and unspecified nodes forming the 1394 network.

By receiving this self ID packet, each node can recognize the node numbers assigned to the nodes, so each node can know the node number to be assigned to the node. For example, in FIG. 14, the node B as a route gives node ID setting permission to the node A connected to the communication port having the smallest port number "#1". The node A assigns "No. 0" as its own node number, and sets its own node ID made up of the bus number and node number. Also, the node A broadcasts a self ID packet containing this node number.

Figure 18:
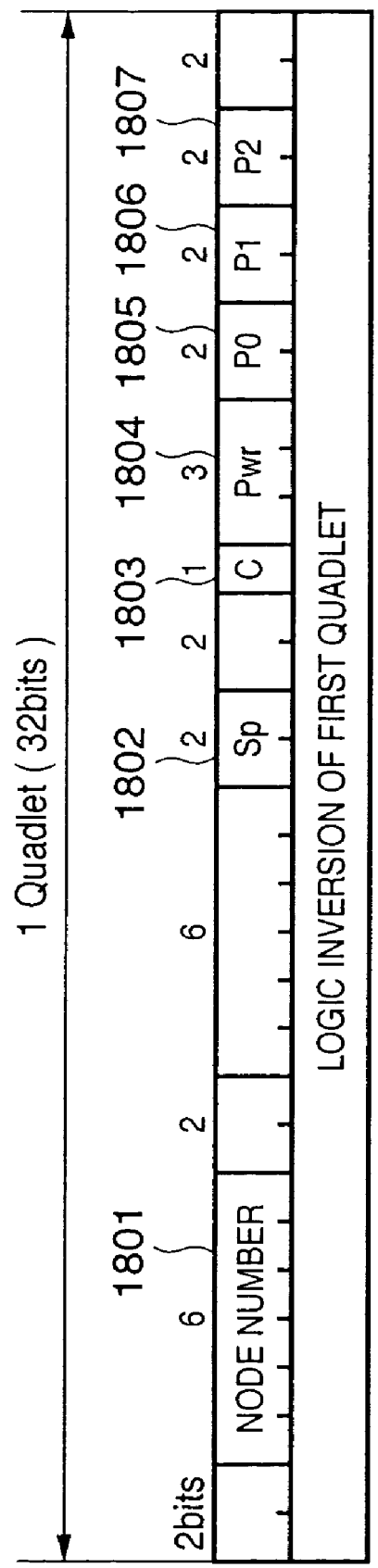
FIG. 18 is a data structure showing the arrangement of a self ID packet in the 1394 interface.

FIG. 18 shows the arrangement of the self ID packet. In FIG. 18, reference numeral 1801 denotes a field for storing the node number of a node which has sent the self ID packet; 1802, a field for storing information concerning a possible transfer rate; 1803, a field indicating the presence/absence of a bus managing function (e.g., the presence/absence of the capability of a bus manager); and 1804, a field for storing information pertaining to the characteristics of power consumption and power supply.

Also, reference numeral 1805 denotes a field for storing information (e.g., connected, unconnected, or a communication port parent-child relationship) concerning the connection state of a communication port having a port number "#0"; 1806, a field for storing information (e.g., connected, unconnected, or a communication port parent-child relationship) concerning the connection state of a communication port having a port number "#1"; and 1807, a field for storing information (e.g., connected, unconnected, or a communication port parent-child relationship) concerning the connection state of a communication port having a port number "#2".

If a node which sends the self ID packet has the capability of a bus manager, a contender bit in the field 1803 is set to "1"; if not, the contender bit is set to "0".

The bus manager is a node which, on the basis of the various pieces of information contained in the self ID packet described above, performs bus power supply management (manages, for each node, information pertaining to whether the power can be supplied through the communication cable, or whether the power supply is necessary, for each node), rate information management (manages the maximum transfer rate between nodes in accordance with the information concerning the possible transfer rate of each node), and topology map information management (manages the connection configuration of the network in accordance with the communication port parent-child relationship information), and optimizes the bus on the basis of the topology map information. The bus manager provides other nodes with these pieces of information. With these functions, a node serving as the bus manger can manage the bus of the whole 1394 network.

A node which has set the node ID after the processing in step S1706 determines whether there is a parent node (step S1707). If there is a parent node, this parent node reexecutes the processing from step S1702, and gives permission to a node for which no node ID has been set.

If there is no parent node, the node is regarded as a route. This route determines whether node IDs have been set for all nodes connected to all the child ports (step S1708).

If the ID setting process has not been completely performed for all the nodes in step S1708, the route gives permission of ID setting to a child node having the smallest number, among other child ports including the node (step S1701). After that, the processing from step S1702 is executed.

If the ID setting process has been completely performed for all the nodes, the route sets its own node ID (step S1709). After setting the node ID, the route broadcasts the self ID packet (step S1710).

By the above processing, the 1394 network can automatically assign node IDs to the individual nodes.

If a plurality of nodes are found to have the capability of a bus manger after the node IDs are thus set, a node having the largest node number functions as a bus manager. That is, if the route having the largest node number in the network has functions with which it can serve as a bus manager, this route functions as a bus manager.

If the route has no such functions, a node having the second largest node number next to that of the route functions as a bus manager. A node serving as a bus manager can be found by checking the contender bit 1803 in the self ID packet broadcast by each node.

(9) Arbitration

Figure 19A:
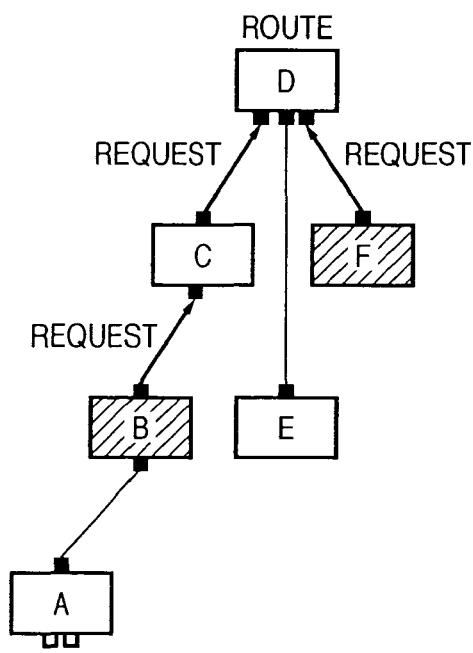
FIGS. 19A and 19B are block diagrams explaining arbitration in a 1394 network.
Figure 19B:
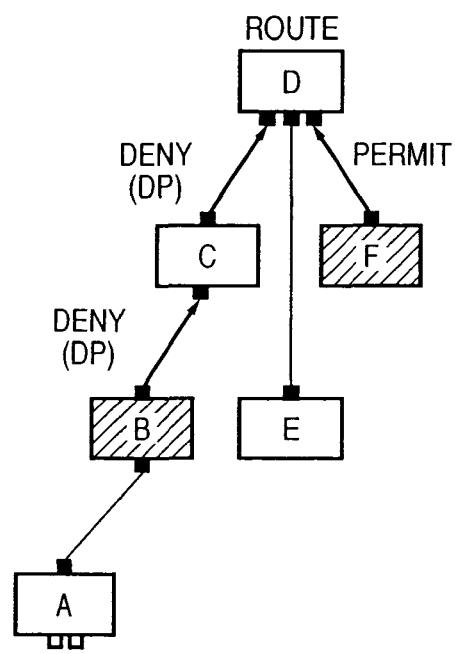

FIGS. 19A and 19B are block diagrams for explaining arbitration in the 1394 network shown in FIG. 1.

In the 1394 network, bus use right arbitration is always performed prior to data transfer. The 1394 network is a logical bus network in which the same communication packet can be transferred to all nodes in the network by relaying a communication packet transferred from each node to another node. Therefore, arbitration is always necessary in order to prevent collision of communication packets. Consequently, only one node can transfer a packet in a certain time.

FIG. 19A is a view for explaining the case in which the nodes B and F have issued requests for the bus use right.

When arbitration begins, the nodes B and F respectively issue requests for the bus use right to their parent nodes. The parent node (i.e., the node C) which has received the request from the node B relays this request to its parent node (i.e., the node D). This request is finally transferred to the route (node D) which performs arbitration.

The route which has received the bus use right determines a node to be permitted to use the bus. This arbitration can be performed only by the node serving as a route. A node which has won the arbitration is given bus use permission.

FIG. 19B is a view showing the case in which the request from the node F is permitted, and the request from the node B is denied.

The route sends a DP (Data Prefix) packet to a node which has lost the arbitration, thereby notifying the node that its request is denied. The denied node holds the bus use request until the next arbitration.

By controlling arbitration as described above, the 1394 network can manage the bus use right.

(10) Communication Cycle

The isochronous transfer mode and asynchronous transfer mode can be mixed in the period of each communication cycle in a time-division manner. The period of the communication cycle is normally 125 μS.

Figure 20:
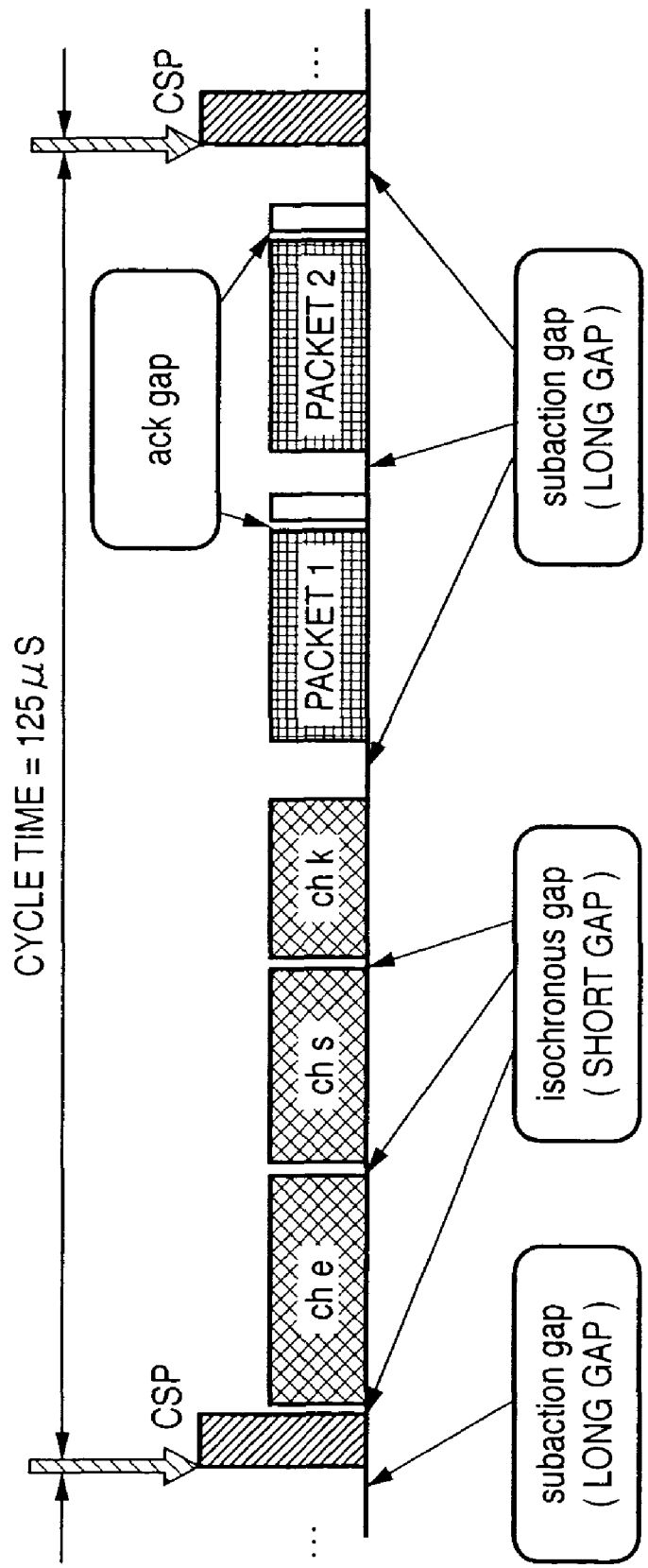
FIG. 20 is a diagram explaining the case in which an isochronous transfer mode and asynchronous transfer mode are mixed in one communication cycle.

FIG. 20 is a diagram explaining the case in which the isochronous transfer mode and asynchronous transfer mode are mixed in one communication cycle.

The isochronous transfer mode is executed in preference to the asynchronous mode. This is so because an idling period (subaction gap) necessary to activate asynchronous transfer after a cycle start packet is so set as to be longer than an idling period (isochronous gap) necessary to activate isochronous transfer. As a consequence, isochronous transfer is executed in preference to asynchronous transfer.

Referring to FIG. 20, when each communication cycle starts, a cycle start packet (to be referred to as a CSP hereinafter) is transferred from a predetermined node. Each node can count the same time as another node by adjusting the time by using this CSP.

(11) Isochronous Transfer Mode

The isochronous transfer mode is a synchronous transfer system. Isochronous mode transfer can be executed in a predetermined period after a communication cycle is started. This isochronous transfer mode is always executed in each cycle in order to maintain real-time transfer.

The isochronous transfer mode is suited to transfer of data, such as motion image data or audio data, requiring real-time transfer. The isochronous transfer mode is not one-to-one communication such as the asynchronous transfer mode, but broadcast communication. That is, a packet sent from a certain node is evenly transferred to all nodes on the network. Note that isochronous transfer uses no ack (acknowledgement return code).

Referring to FIG. 20, channel e (ch e), channel s (ch s), and channel k (ch k) indicate periods in each of which a node performs isochronous transfer. The 1394 interface gives different channel numbers to a plurality of different isochronous transfer operations in order to distinguish between them. This makes isochronous transfer between a plurality of nodes feasible. This channel number does not specify any particular transmission destination; the channel number is merely a logical number given to data.

"Isochronous gap" shown in FIG. 20 indicates a bus idling state. When this idling state continues for a predetermined time, a node desiring isochronous transfer determines that the bus is usable, and executes arbitration.

Figure 21:
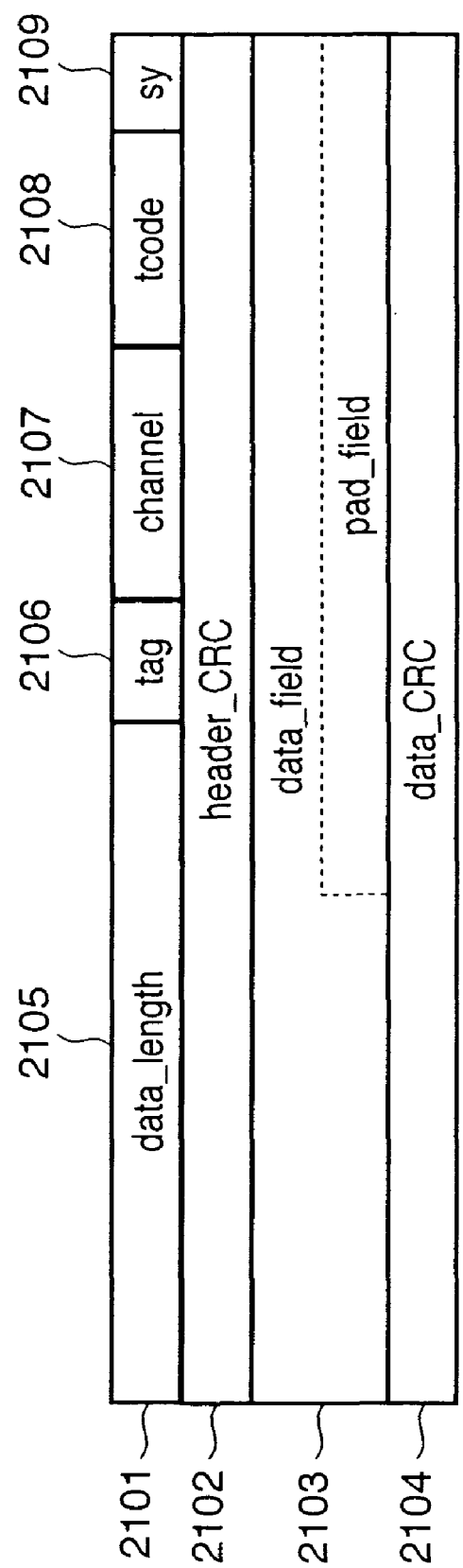
FIG. 21 shows the format of a communication packet which is transferred on the basis of the isochronous transfer mode.

FIG. 21 shows the format of a communication packet transferred on the basis of the isochronous transfer mode. This communication packet transferred on the basis of the isochronous transfer mode will be referred to as an isochronous packet hereinafter.

Referring to FIG. 21, the isochronous packet is made up of a header portion 2101, header CRC 2102, data portion 2103, and data CRC 2104.

The header portion 2101 includes a field 2105 for storing the data length of the data portion 2103, a field 2106 for storing format information of the isochronous packet, a field 2107 for storing the channel number of the isochronous packet, a field 2108 for storing a transaction code (tcode) for identifying the packet format and processing to be executed, and a field 2109 for storing a synchronization code.

(12) Asynchronous Transfer Mode

The asynchronous transfer mode is an asynchronous transfer system. This asynchronous transfer can be executed after the isochronous transfer period is completed and before the next communication cycle is started (i.e., before a CSP of the next communication cycle is transferred).

Referring to FIG. 20, the first subaction gap indicates the bus idling state. After this idling time has reached a predetermined value, a node desiring asynchronous transfer determines that the bus is usable, and executes arbitration.

Figure 22:
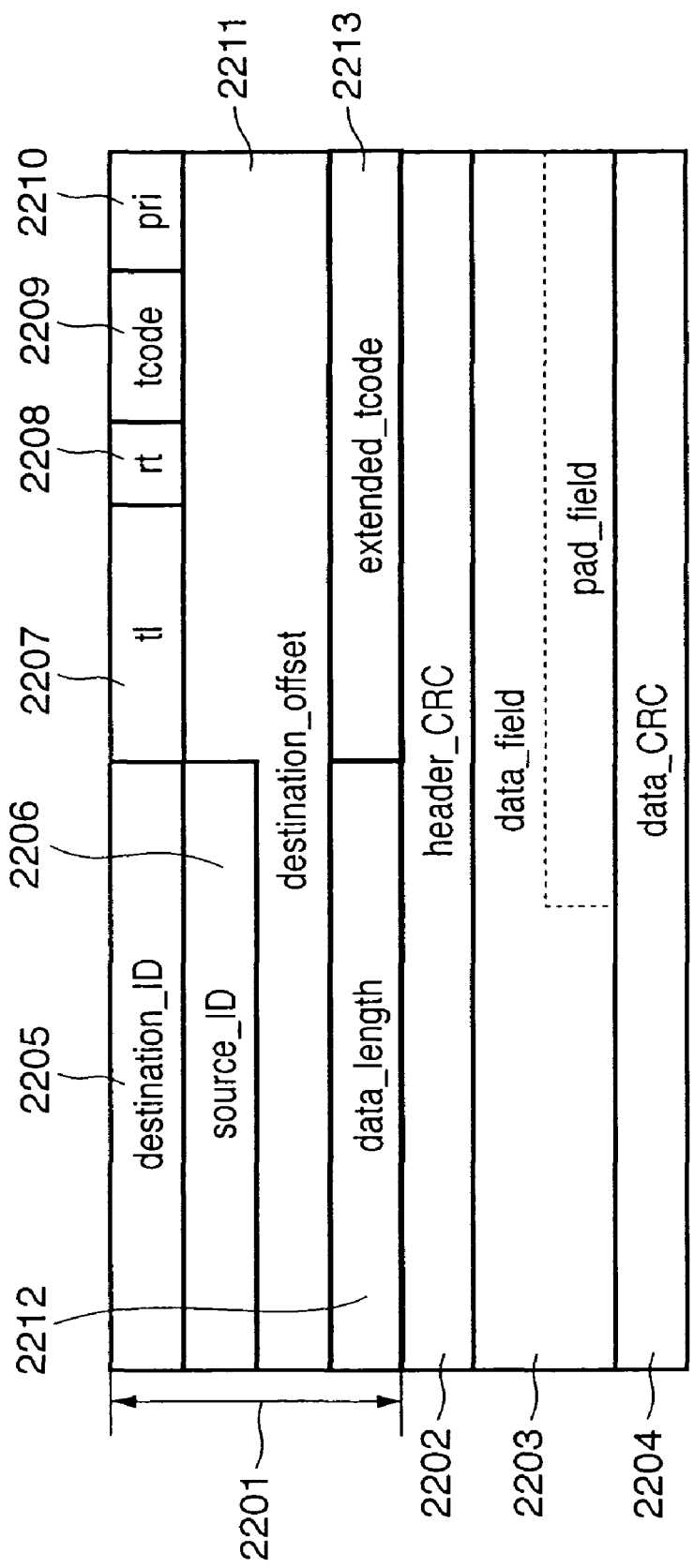
FIG. 22 shows the packet format of asynchronous transfer of the present invention.

The anode which has acquired the bus use right by this arbitration transfers a packet shown in FIG. 22 to a predetermined node. The node which has received this packet returns an ack (acknowledgement return code) or a response packet after an ack gap.

FIG. 22 shows the format of a communication packet based on the asynchronous transfer mode. This communication packet transferred on the basis of the asynchronous transfer mode will be referred to as an asynchronous packet hereinafter.

Referring to FIG. 22, this asynchronous packet is made up of a header portion 2201, header CRC 2202, data portion 2203, and data CRC 2204.

In the header portion 2201, a field 2205 stores the node ID of a node as a destination. A field 2206 stores the node ID of a node as a source. A field 2207 stores a label indicating a series of transactions. A field 2208 stores a code indicating a retransmission status. A field 2209 stores a transaction code (tcode) for identifying the packet format and processing to be executed. A field 2210 stores the priority order. A field 2211 stores the memory address of a destination. A field 2212 stores the data length of the data portion. A field 2213 stores an expanded transaction code.

Asynchronous transfer is one-to-one communication from a certain node to a partner node. A packet transferred from a transfer source node is transferred to each node on the network. However, nodes having addresses different from the address designated by the packet ignore the packet. Consequently, only a node as the destination can load the packet.

If during asynchronous transfer the time for transferring the next CSP is reached, the transfer is not forcedly interrupted, and the next CSP is transferred after the transfer is completed. Therefore, if one communication cycle continues for 125 μS or more, the next communication cycle period is shortened accordingly. With this processing, the 1394 network can hold a substantially predetermined communication cycle.

(13) Device Map

The IEEE1394 standard has the following means which allow an application to recognize the topology of the 1394 network in order to form a device map.
1. Read a topology map register of the bus manager
2. Estimate from the self ID packet upon bus reset By the means 1 and 2 described above, the topology of the cable connection order based on the parent-child relationships between the individual nodes can be known. However, the topology of the physical positional relationships cannot be known (there is also a problem that even an uninstalled port is seen).

It is also possible to have information for forming a device map as a database other than the configuration ROM. In this case, however, means for obtaining various information depend upon the protocol for accessing the database.

A device based on the IEEE1394 always has the configuration ROM itself or a function of reading the configuration ROM. Therefore, pieces of information such as the device position and function are stored in the configuration ROM of each node, and a function of reading these pieces of information is given to an application. This allows an application of each node to have a so-called device map display function independent of specific protocols for database access, data transfer, and the like.

The configuration ROM can store a physical position, functions, and the like as information unique to a node, and can be used to realize the device map display function.

In this case, an application can recognize the 1394 network topology based on a physical positional relationship by reading the configuration ROM of each node upon bus reset or when requested by the user. In addition, not only the physical position of a node but also various pieces of node information such as functions can be described in the configuration ROM. In this case, an application can obtain these pieces of function information and the like of each node in addition to the physical position of the node by reading its configuration ROM. To acquire configuration ROM information of each node, an application uses API for acquiring arbitrary configuration ROM information of a designated node.

By using the above means, a device application on the IEEE1394 network can form various device maps such as a physical topology map and a function map of each node in accordance with intended purposes. This also allows a user to select a device having a necessary function.

<Outline of SBP-2>

Deliberation on standardization of the SBP-2 (Serial Bus Protocol 2) was started in 1996 as a project of Technical Committee T10 which is a subsidiary of NCITS. This standardization was approved as ANSI NCITS 325-1998 in 1998. The SBP-2 is a protocol depending on the IEEE1394 bus. As a layer, the SBP-2 is a command/data transport protocol positioned above the transaction layer of the IEEE1394-199. Initially, the main purpose of the development of the SBP-2 was to operate a device on the IEEE1394 by using SCSI commands. However, commands other than SCSI commands can also be used. The characteristic features of the SBP-2 are as follows.

(1) The SBP-2 is a master/slave model having an initiator/target configuration. The initiator as a master has authority and responsibility for all operations such as login, logout, task management, and command issue.

(2) The SBP-2 is a shared memory model fully utilizing the characteristics of the IEEE1394 as a bus model (basically, the contents of a request to a target, e.g., the contents of a command are entirely placed in a system memory, and the target which has received the request reads out the contents stored in the system memory, or writes requested information such as the status in the system memory).

That is, resources for communication can be concentrated to one place, so the load on these resources can be extremely reduced. In addition, since the target can read and write the system memory at its own pace, the degree of freedom of designing the target is high. Accordingly, the communication rate can be easily increased by accessing the system memory by hardware (either a high-performance model or a very-low-cost model can be obtained).

(3) Commands for exchanging messages are described as a series of link lists. Since this can conceal a decrease in efficiency by latency, it is possible to realize high-speed, high-efficiency data communication fully utilizing the characteristics of the IEEE1394.

(4) The SBP-2 is a command set independent structure (can correspond to various command sets).

Figure 23:
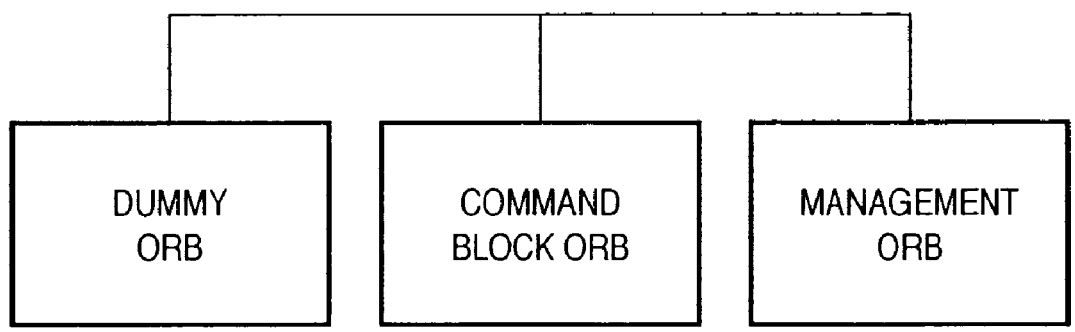
FIG. 23 is a block diagram showing ORB types in the SBP-2.

The SBP-2 is a master/slave model in which an initiator as a master has authority and responsibility for everything, and all operations are initiated by the initiator. A login or logout request, task management request, command, or the like from the initiator is contained in a data structure called an ORB (Operation Request Block) and sent to a target. (Properly speaking, the initiator places a request or command in its own memory, and the target reads out the request or command). FIG. 23 shows major ORB types.

(1) Dummy ORB: This ORB is used when, e.g., a target fetch agent is initialized or a task is canceled. This ORB is processed as "no operation" by the target.

Figure 24:
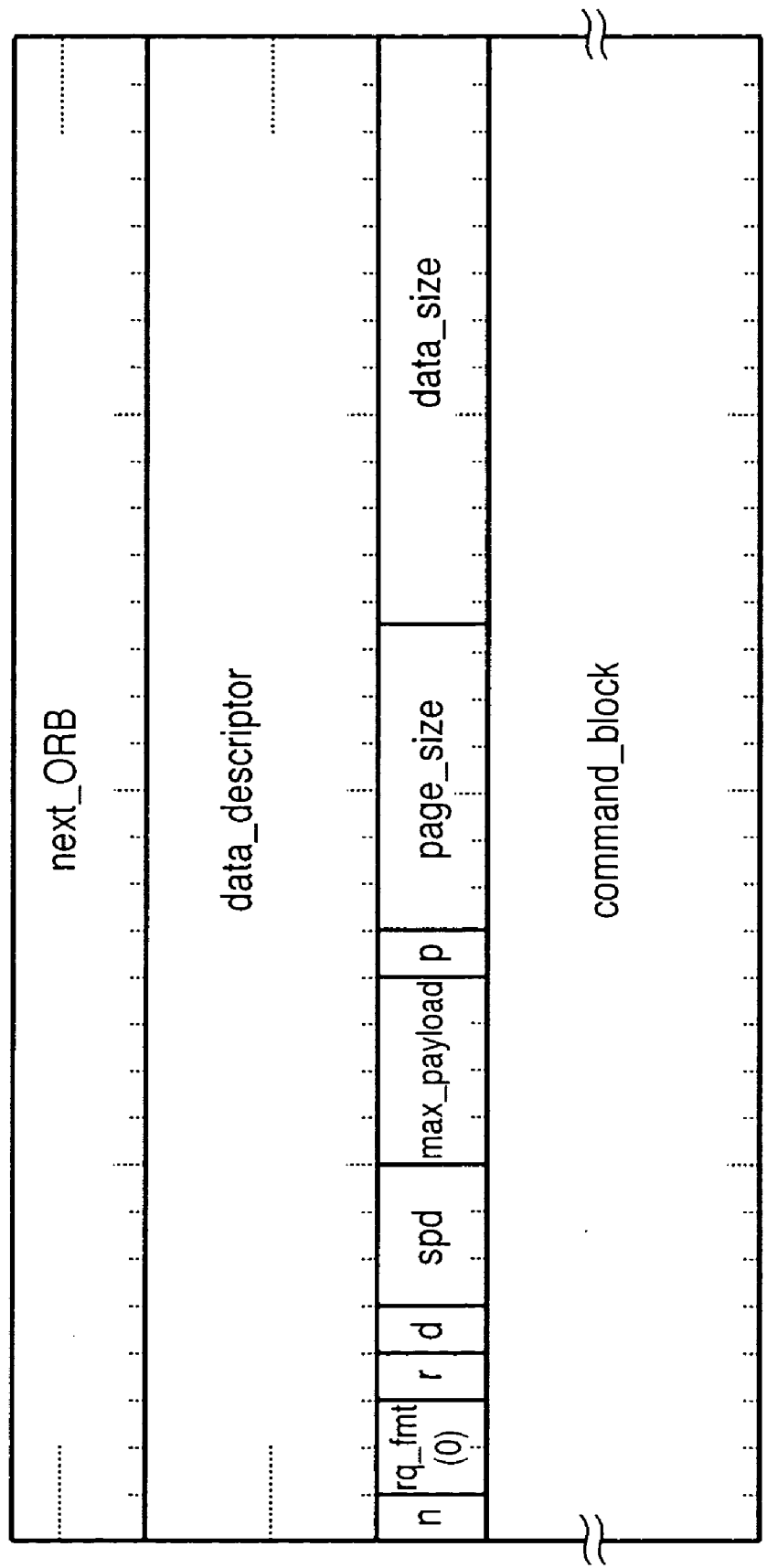
FIG. 24 shows the format of a command block ORB in the SBP-2.

(2) Command Block ORB: This ORB contains commands such as a data transfer command and device control command. This ORB has a data_descriptor field and data_size field indicating the address and size, respectively, of the corresponding data buffer or page table. Since the command block ORB has a next_ORB field indicating the address of the next command block ORB, commands can be linked (FIG. 24).

Figure 25:
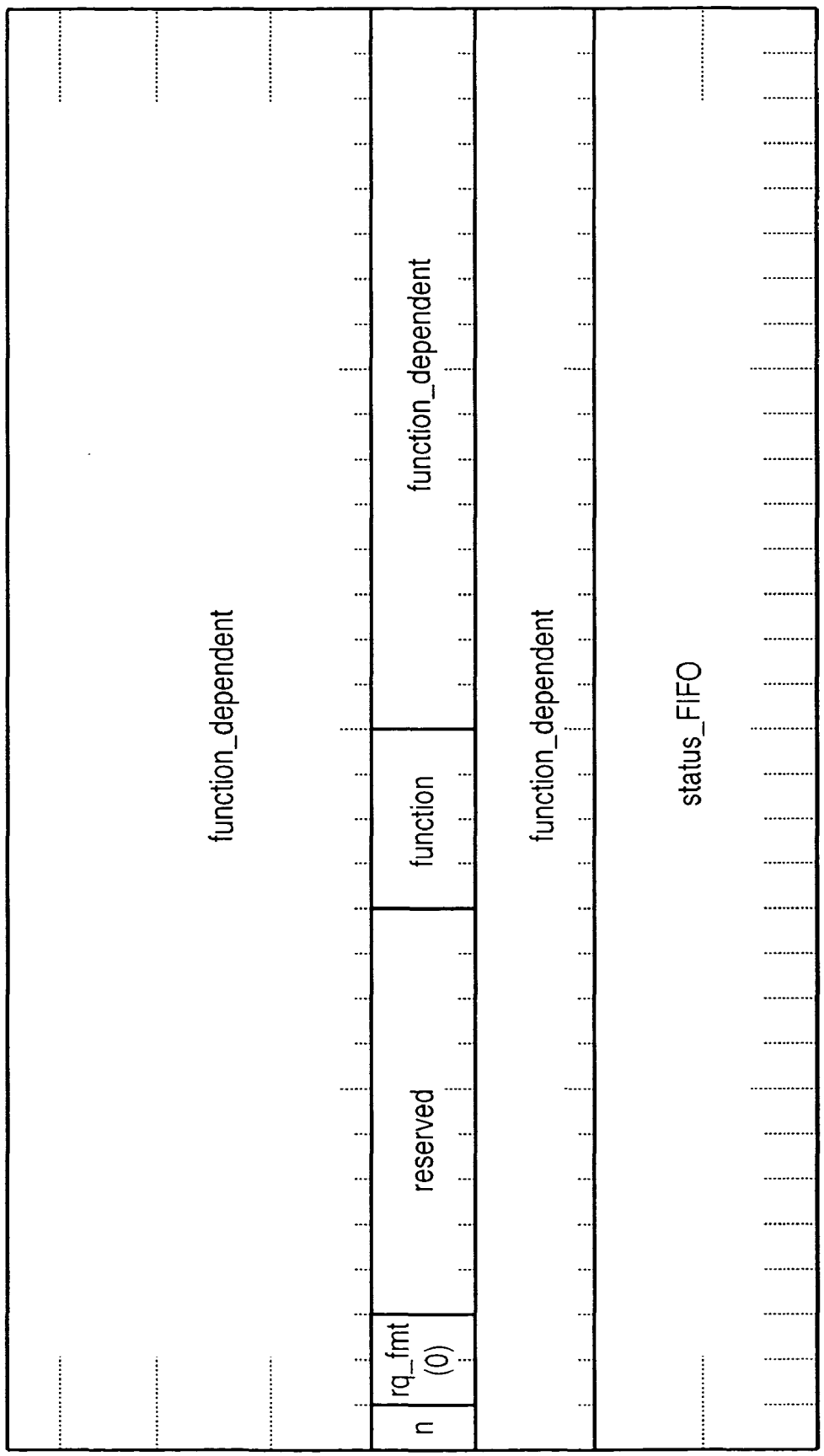
FIG. 25 shows the format of a management ORB in the SBP-2.

(3) Management ORB: This ORB contains management requests (an access request including login and logout, and a task management request). The characteristic of this ORB is that it has a function field indicating the contents of a task management request (e.g., task set interruption and task reset), and a status FIFO field indicating the address of a completion status from the target (FIG. 25).

Figure 26:
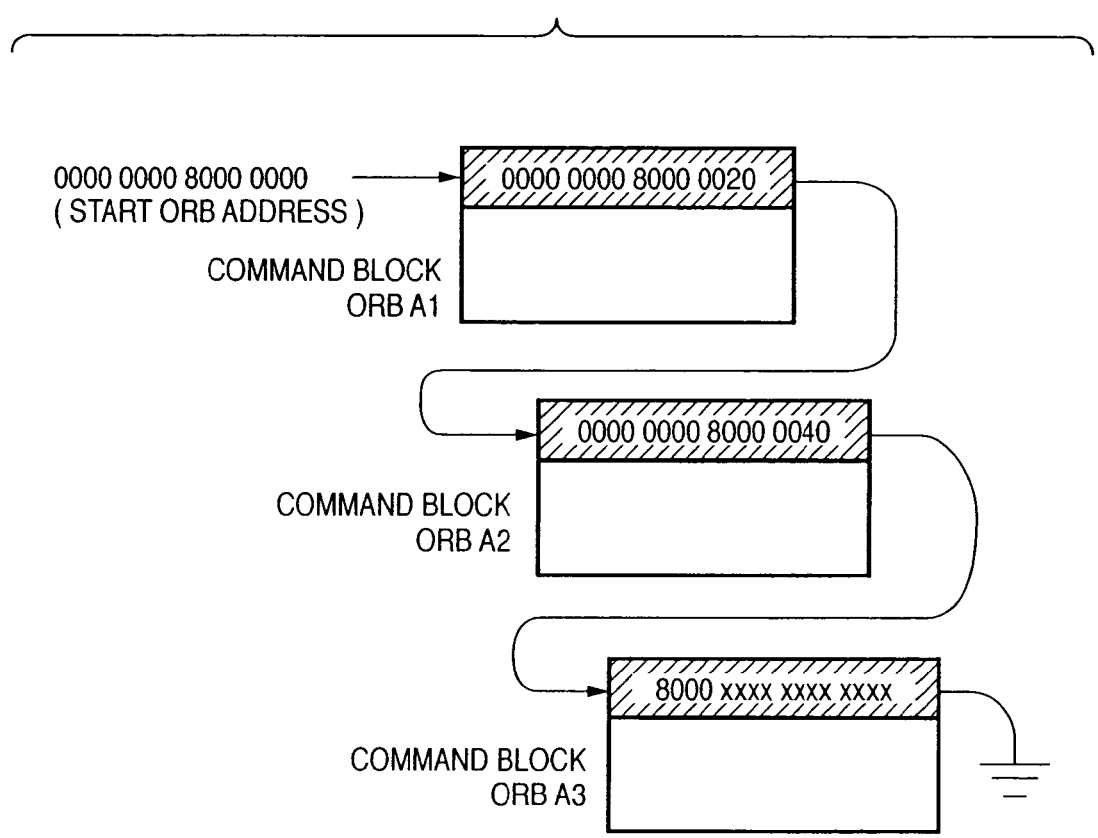
FIG. 26 is a command chain showing a link list of command block ORBs in the SBP-2.

For the management ORB, the initiator cannot issue the next ORB until the target returns the response. However, the command block ORB including the dummy ORB can be issued as a series of command strings in the form of a list linked as shown in FIG. 26. That is, the command block ORB has the next_ORB field indicating the address of the next ORB as shown in FIG. 24, so commands can be linked one after another. If this field is "null", there is no next ORB.

Also, this command block ORB has the fields (data_descriptor and data_size) indicative of the address and size, respectively, of the data buffer or page table. If the command is a write command, for example, the target accesses that data_buffer on the system memory, which is indicated by data_descriptor, and reads out data to be written from data_buffer. If the command is a read command, the target accesses that data_buffer on the system memory, which is indicated by data_descriptor, and writes data requested by the command in data_buffer.

Figure 27:
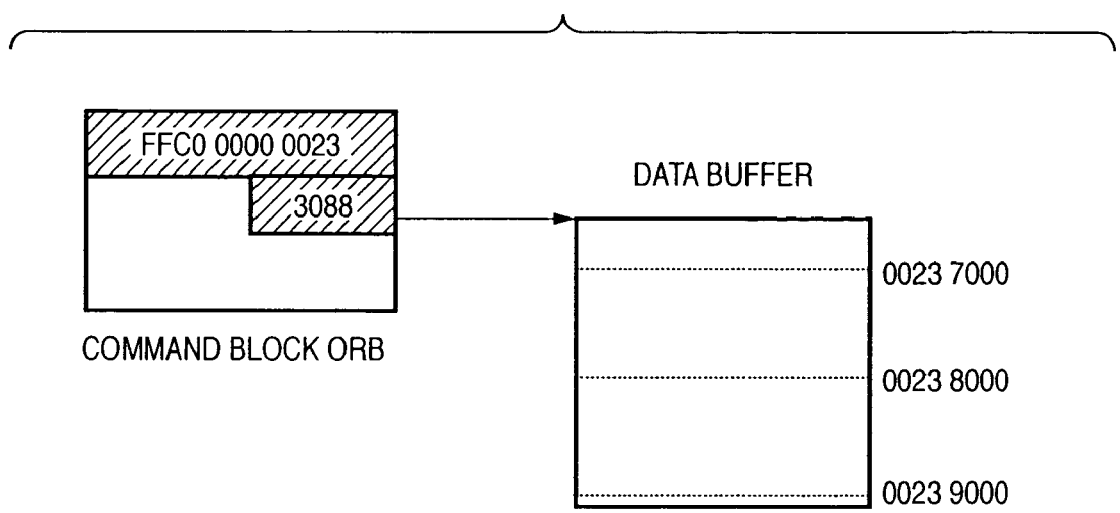
FIG. 27 is a command chain showing direct access to a data buffer in the SBP-2.
Figure 28:
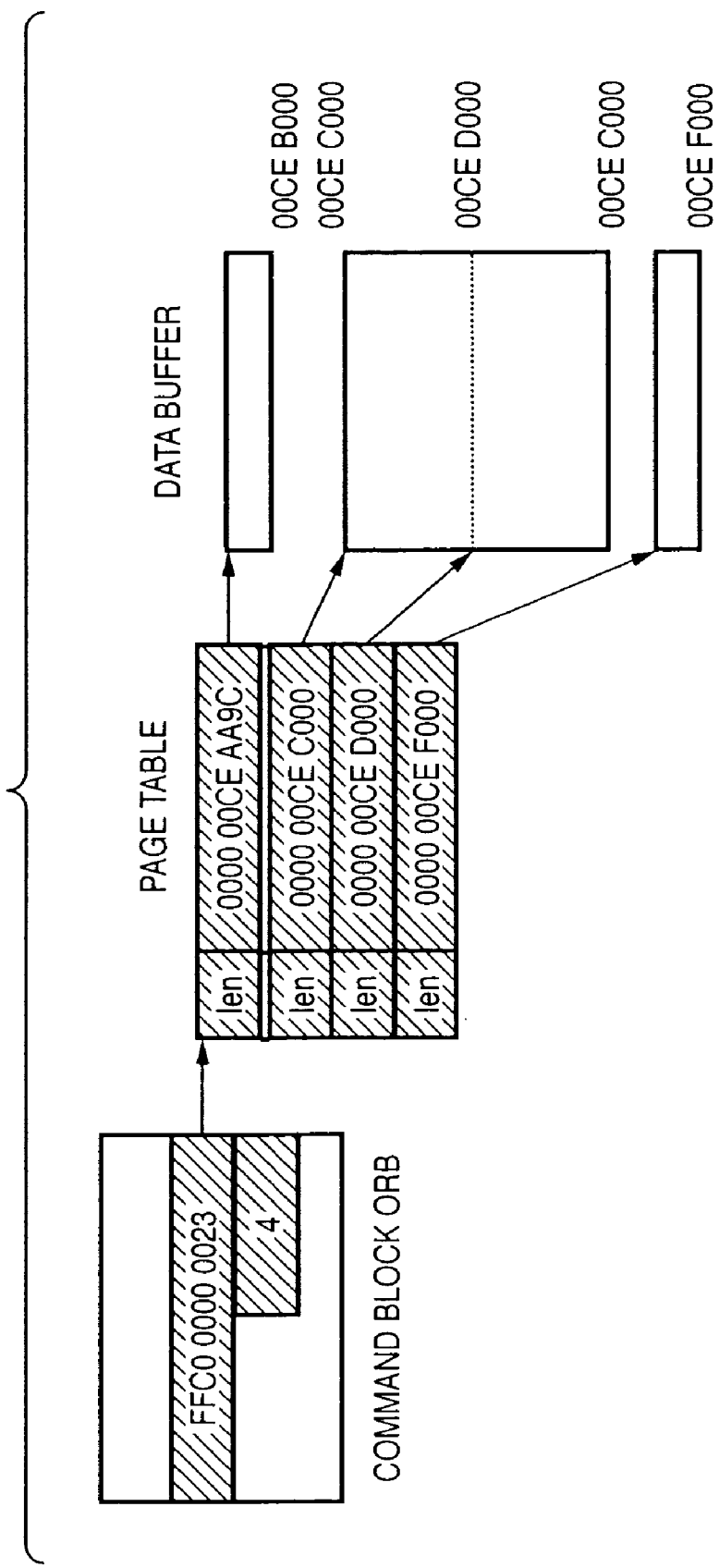
FIG. 28 is a command chain showing the use of a page table in SBP-2.

FIGS. 27 and 28 illustrate the case in which the data buffer is directly indicated, and the case in which the data buffer is indicated via the page table, respectively. The data buffer which is a physically discontinuous area can be continuously handled by the page table. This eliminates the need to physically rearranging a continuous logic area by a virtual storage.

The mechanism on the target side which executes various requests from the initiator is called an agent. This agent is classified into a management agent for executing the management ORB, and a command block agent for executing the command block ORB.

The management agent has a management agent register r in which the initiator stores the address of the management ORB in order to notify the target of this address.

The command block agent is also called a fetch agent since it fetches a command from a list in which commands of the initiator are linked. The fetch agent also has command block agent registers such as an ORB pointer register in which the initiator stores the start address of the command block ORB, and a doorbell register by which the initiator requests the target to fetch the command.

Figure 29:
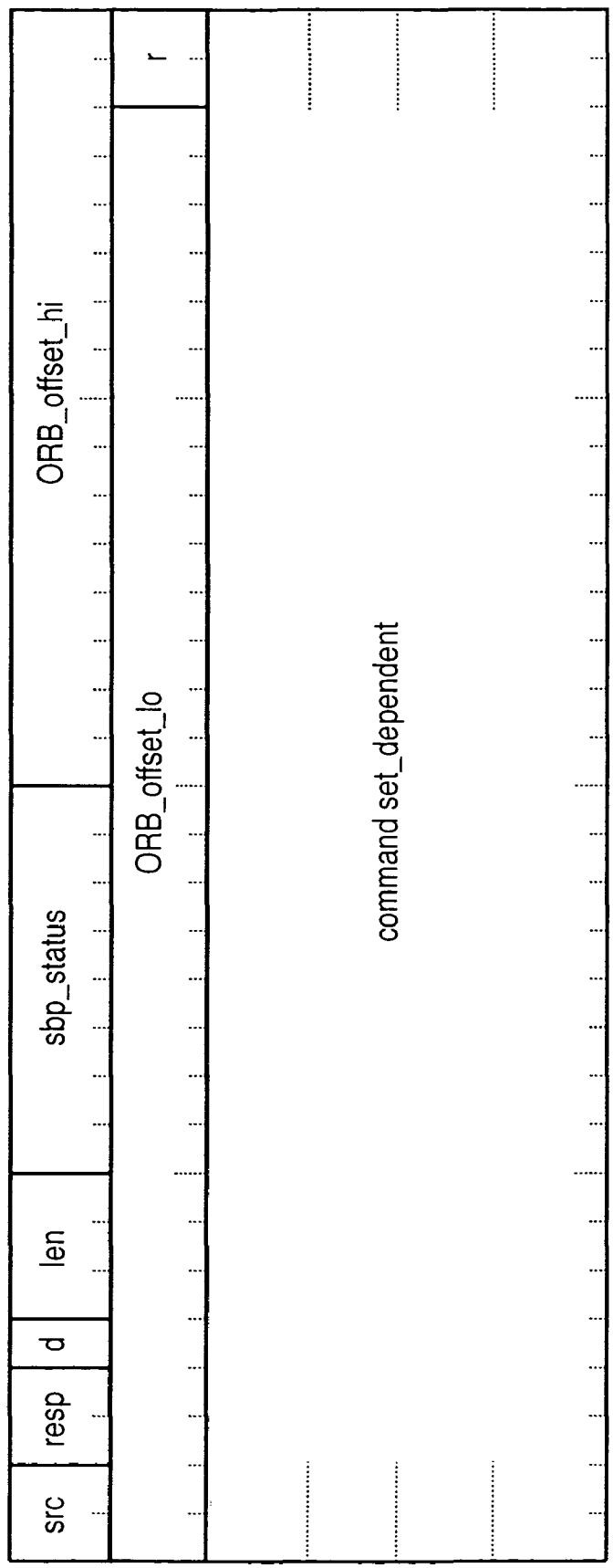
FIG. 29 shows the format of a status FIFO in the SBP-2.

When completing the execution of an ORB from the initiator, the target stores the status of execution completion, in the form of a data structure called a status block (regardless of whether the execution is successful), at an address indicated by the status FIFO of the initiator. FIG. 29 shows an example of the status block.

The target can store status information containing a minimum of 8 bytes and a maximum of 32 bytes. In the management ORB, the status FIFO address is clearly provided as part of the ORB in the status FIFO field shown in FIG. 25, so the target stores the status block in the designated address. In other cases, the target stores the status block in the status FIFO obtained from the context of the fetch agent. In the command block ORB, the initiator provides the status FIFO address as part of the login request.

Normally, the target responds to an ORB issued by the initiator by writing the status block in the status FIFO address. However, if a change occurs on the device side and has influence on the logical unit, the target can spontaneously return an unsolicited status without any request from the initiator. The status FIFO address in this case is the status FIFO address provided by the initiator when the initiator issues a login request.

Figure 30:
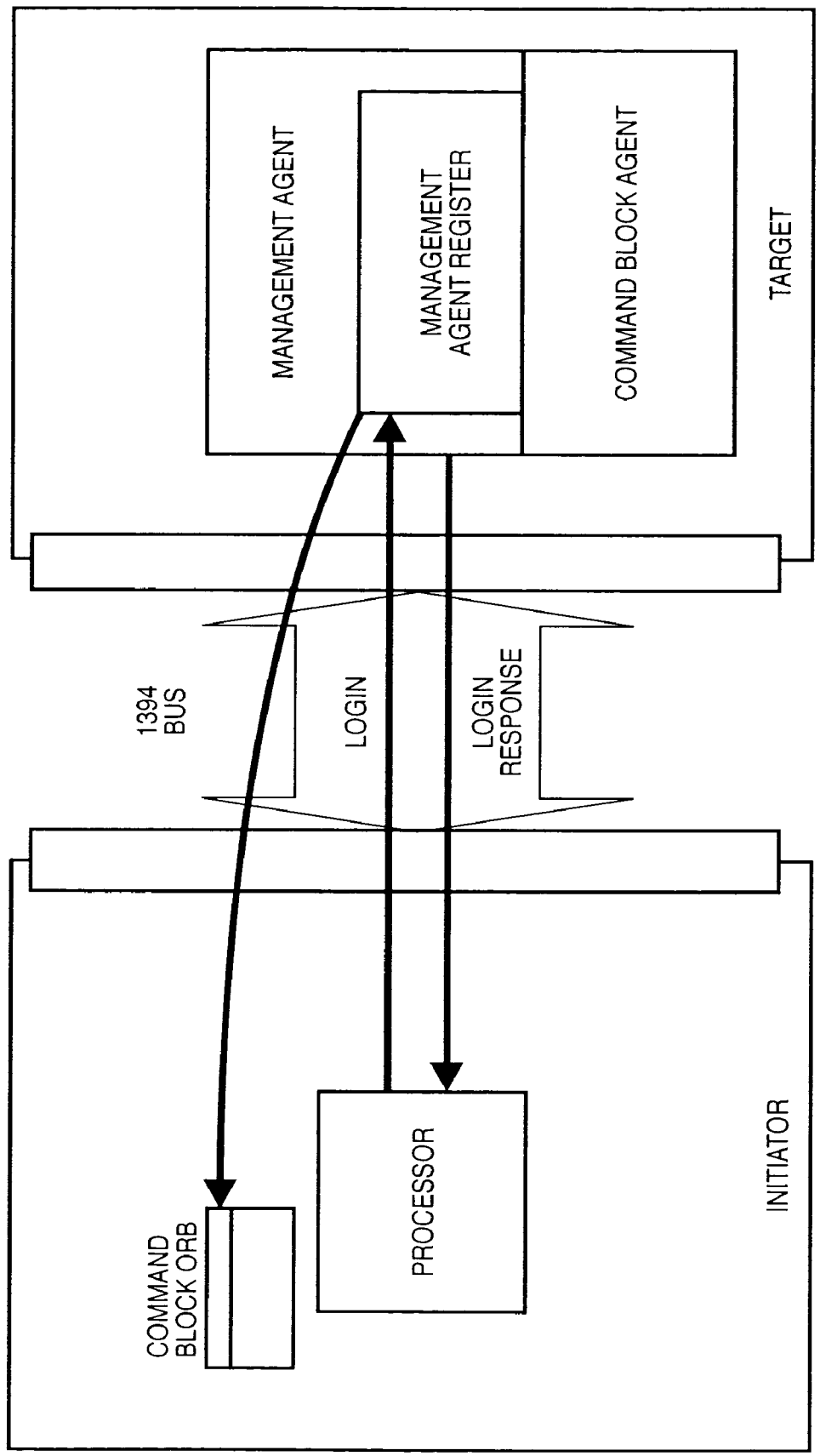
FIG. 30 is a block diagram showing a login operation in the SBP-2.

The operations of the initiator and target in the SBP-2 will be explained below by using an operation model shown in FIG. 30.

The operation of the SBP-2 starts when the initiator issues the management ORB (login ORB) for a login request to the target. The target responds to this request from the initiator by a login response (FIG. 30). When the login request is accepted, the target returns the start address of the command block agent register as the login response.

Figure 31:
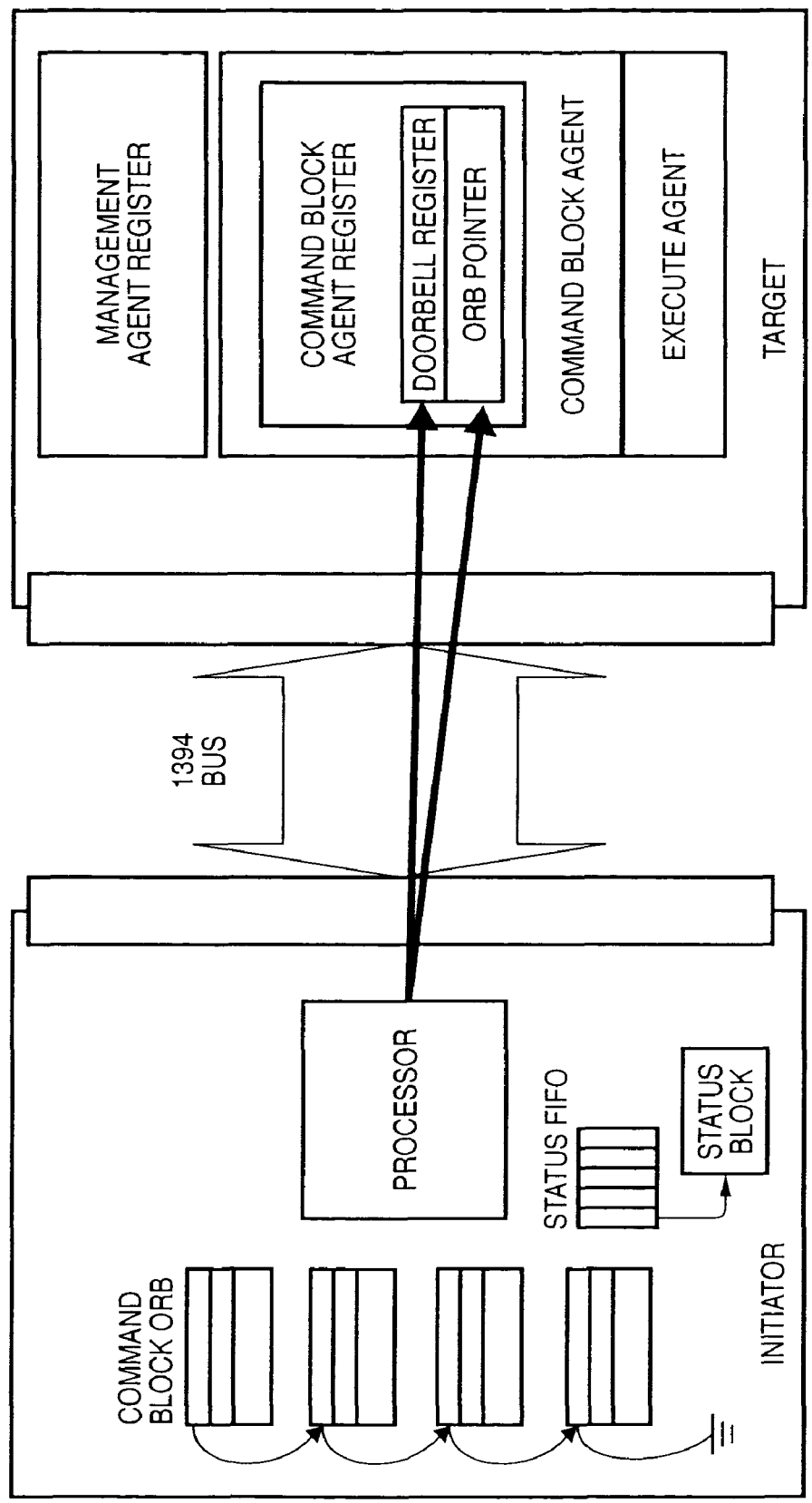
FIG. 31 is a block diagram showing the first operation of task execution in the SBP-2.
Figure 32:
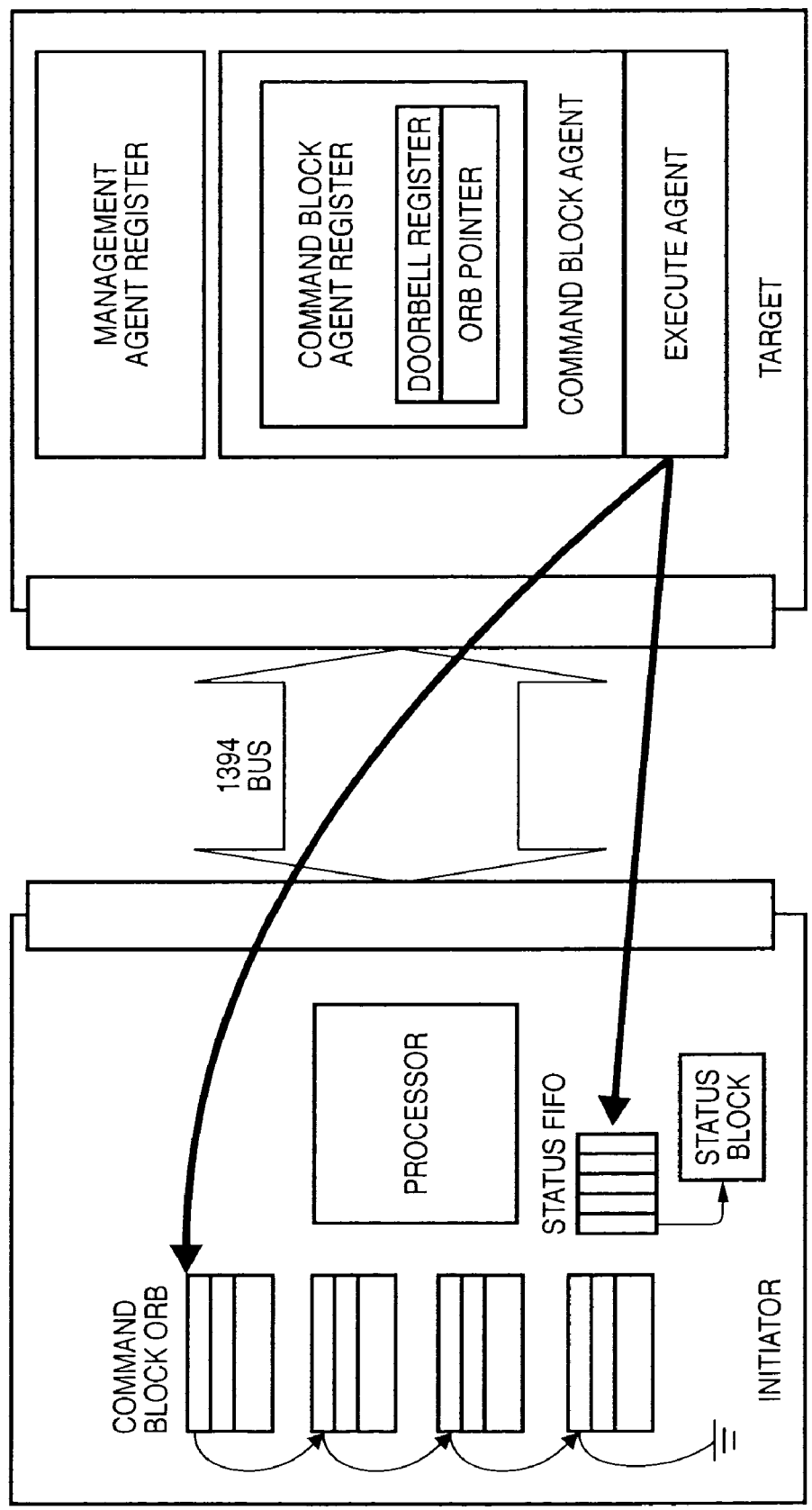
FIG. 32 is a block diagram showing the operation of a command ORB in the SBP-2.

When the login request is accepted, the management agent of the target accepts a task management request from the initiator after that. The initiator issues the task management ORB to exchange information necessary for executing the task with the target. To this ORB issued by the initiator, the target responds by writing the status block in the status FIFO. However, as described above, if a change occurs on the device side and has influence on the logical unit, the target can also spontaneously return the unsolicited status without any request from the initiator. Subsequently to the exchange pertaining to task management, the initiator forms a necessary command block ORB (list) in its own memory area, and writes the start address of the ORB in the ORB pointer of the command block agent register of the target. Alternatively, the initiator knocks the doorbell register of the command block agent register to notify that the initiator has an ORB to be communicated to the target (FIG. 31). On the basis of the start address information of the ORB written in the ORB pointer, the target accesses the initiator's memory, and sequentially processes the ORBs (FIG. 32).

Task execution models are classified into an ordered model and an unordered model. In the ordered model, ORBs are executed in the order written in the list, and completion statuses from the target are also returned in this order. In the unordered model, the execution order of ORBs is not limited. However, the initiator must have responsibility so that the same execution result is finally obtained regardless of the order. Data transfer from the initiator to the target is performed by a read transaction from the target to the system memory. Data transfer from the target to the initiator is performed by a write transaction to the system memory. That is, the target takes the initiative in data buffer transfer regardless of the direction. Conversely speaking, the target can read out data from the system memory at any pace convenient to the target. Even while the target is executing an ORB, the initiator can rewrite next_address of the last ORB in the list with the address of the next ORB, and notify the target of the change by knocking the doorbell register of the target again, thereby adding the ORB to the linked list. The target returns a completion status (status block) to the address of the status FIFO of the initiator. The initiator detects the returned completion status (status block), and recognizes that the execution of this ORB by the target is completed. The completed ORB can be removed from the linked list of the task set (unless the next_ORB field is null). By using this empty resource, the initiator can add, if necessary, the next command to the end of the list to which the command is linked. In this manner, an ORB is executed and a task is executed.

When the task is completed and it is no longer necessary to continue the access, the initiator issues the logout ORB, and the target responds to complete logout.

<Bidirectional Data Transfer Function of SBP-3>

Normalization of the SBP-3 (Serial Bus Protocol 3) has been performed since the latter half of 2000 in order to compensate for the low efficiency and lacking functions of the SBP-2 by expanding the SBP-2 and adding functions to the SBP-2.

Typical functions expanded in the SBP-3 are as follows.

1. Isochronous data transfer function
2. Node ID independent function obtained by specifying initiator/target by device handling
3. Function of bidirectional data transfer in one ORB Of these three functions described above, the third function will be explained below.

The SBP-3 has downward compatibility with the SBP-2. The basic data transfer sequence of the SBP-3 is the same as explained in the outline of the SBP-2. That is, data transfer from the initiator to the target is performed by a read transaction from the target to the system memory. Data transfer from the target to the initiator is performed by a write transaction to the system memory. The target reads out an ORB at any pace convenient to the target, and decodes the contents of the ORB to check type information of the transfer operation. That is, the target decodes the ORB to determine whether the transfer operation corresponding to the ORB is data transfer from the initiator to the target, or data transfer from the target to the initiator, and determine a system memory area in the initiator for which this transfer operation is to be performed, thereby performing the corresponding transfer operation. When completing the transfer operation designated by the ORB, the target returns a completion status (status block) to the address of the status FIFO of the initiator.

The SBP-3 defines two types of command block ORBs, i.e., ORBs containing commands such as a data transfer command and device control command. In one command block ORB, the value of a request format field is 0. This ORB is the same as the command block ORB defined by the SBP-2.

As explained in the section of <Outline of SBP-2>, this command block ORB includes fields for designating parameters concerning data transfer, represented by a data_descriptor field and data_size field indicating the address and size, respectively, of a data buffer or page table which the ORB looks up, a next_ORB field indicating the address of the next command block ORB, and a direction field indicating the data transfer direction with respect to the data buffer.

In the command block ORB newly defined by the SBP-3, the value of the request format field is 1. Therefore, this command block ORB can be discriminated from the conventional ORB.

The characteristic feature of this ORB is that two data buffers are looked up from one ORB. That is, this ORB has two sets of fields concerning a data buffer, e.g., the data_descriptor and data_size fields indicating the address and size of a data buffer or page table, and the direction field. This allows two data buffers to be looked up from one ORB.

This ORB can be used as a bidirectional ORB by using one data buffer for write to the target, and the other data buffer for read from the target.

The initiator forms a necessary command block ORB (list) in its own memory area, and appends the bidirectional ORB as described above to write the start address of the ORB (list) in the ORB pointer of the command block agent register of the target. Alternatively, the initiator knocks the doorbell register of the command block agent register to notify that the initiator has an ORB to be communicated to the target. On the basis of the start address information of the ORB written in the ORB pointer, the target accesses the initiator's memory, fetches the ORB, and processes the ORB.

The target which has fetched the bidirectional ORB performs data transfer for both the two designated data buffers. The direction field corresponding to one data buffer is 0, so the target accesses that data buffer on the system memory, which is indicated by data_descriptor, and loads data to be written from this data buffer. Since the direction field corresponding to the other data buffer is 1, the target accesses that data buffer on the system memory, which is indicated by data_descriptor, and writes data requested by the command in this data buffer.

When completing both the data buffer accesses, the target returns a completion status (status block) to the address of the status FIFO of the initiator, thereby notifying the completion of execution of the ORB.

Figure 33:
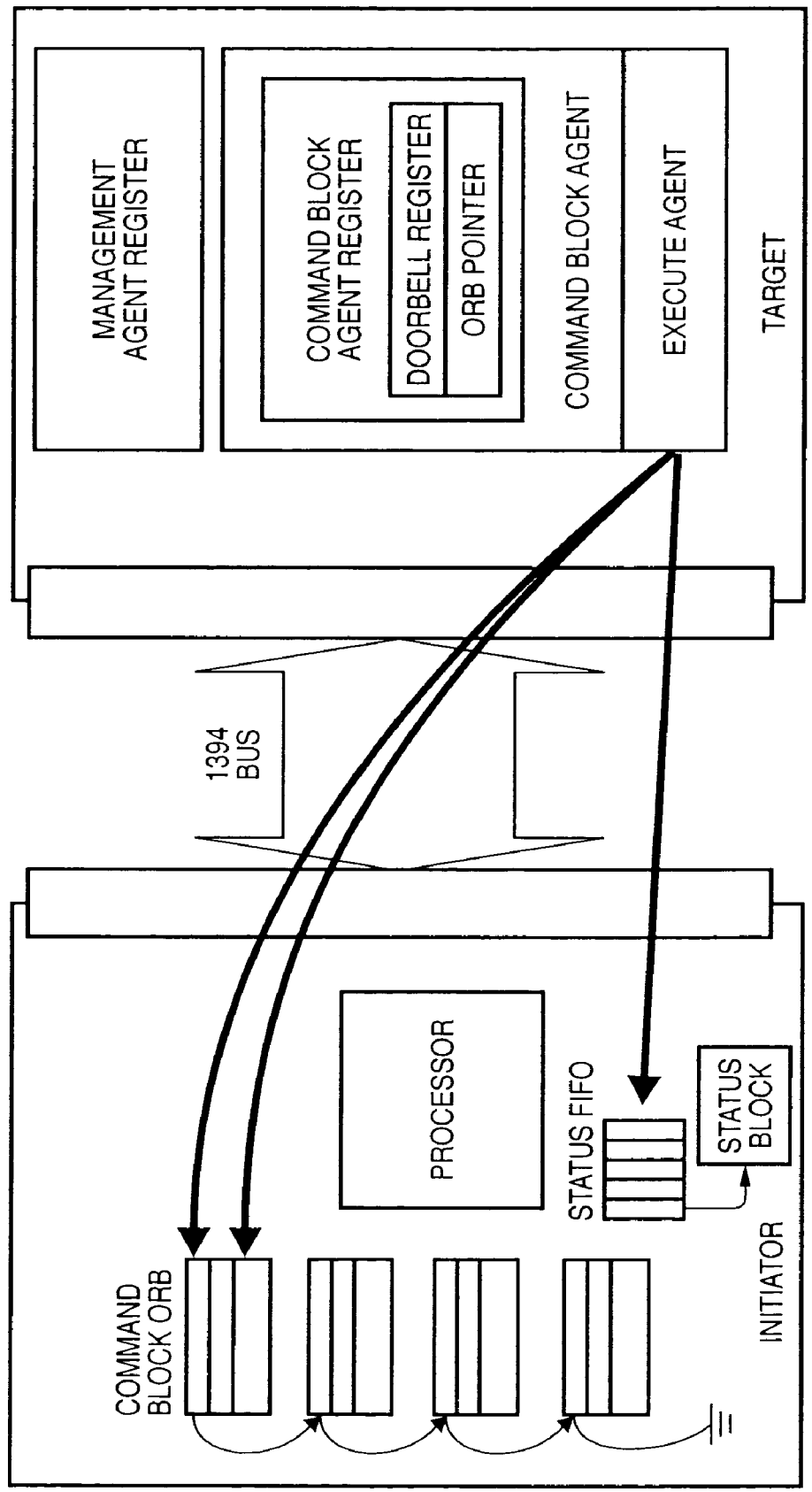
FIG. 33 is a block diagram showing the operation of a command ORB in the SBP-3.

FIG. 33 shows the operation of the command block ORB in the SBP-3. Compared to the SBP-2 shown in FIG. 32, FIG. 33 shows two lines indicating data buffer access to one ORB in the SBP-2, while the SBP-2 can access only one data buffer. Since two data buffers can be independently accessed, two data channels from the initiator to the target can be applied to one ORB. The directions of data flows to these data buffers can be defined independently of each other. Therefore, it is possible to set two data flows from the initiator to the target, one data flow from the initiator to the target and one data flow from the target to the initiator, or two data flows from the target to the initiator. When two data buffers are used by a host and printer, it is possible to use one data flow to supply printing data from the host to the printer, and the other data flow to supply status information from the printer to the host.

Figure 34:
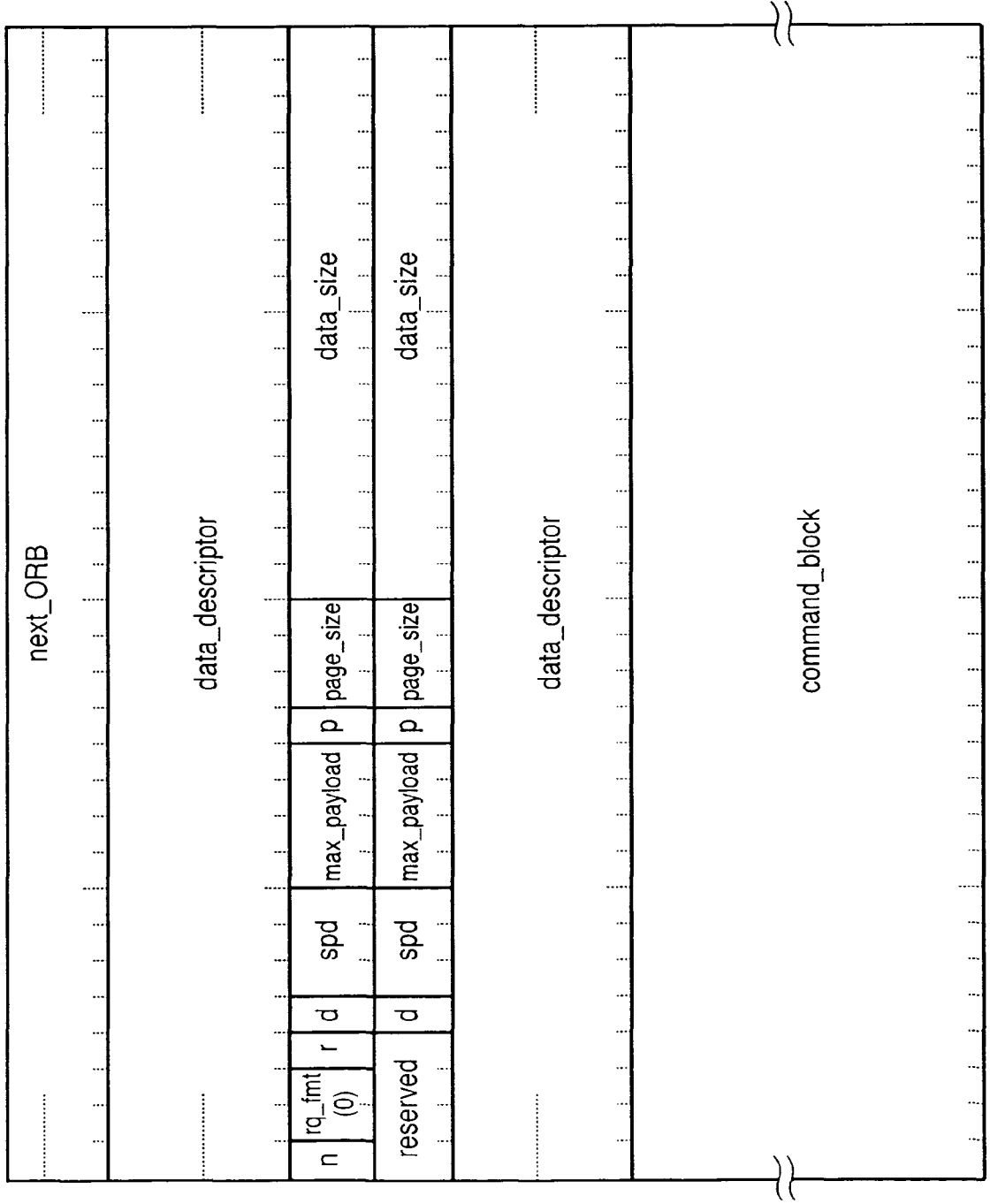
FIG. 34 shows the format of a command block ORB in the SBP-3.

FIG. 34 shows details of the command block ORB when two data buffers are held in the SBP-3. To handle two data buffers, two data_descriptor fields and two buffer information fields from "d" to "data_size" are formed by expanding the SBP-2. The direction of each data buffer can be designated by "direction" indicated by "d" in FIG. 34. Similar to the SBP-2, 0 indicates the direction from the initiator to the target, and 1 indicates the direction from the target to the initiator.

<Description of Embodiment>

An embodiment of the present invention will be described in detail below.

FIG. 35 shows a status block used in the SBP-3 improved version according to the present invention which is a further developed version of the SBP-3, in comparison with the status blocks used in the SBP-2 and SBP-3. This status block basically has the same arrangement as those used in the SBP-2 and SBP-3 except that a portion in which flags "a", "b0", and "b1" are arranged is added to the third quadlet (4-byte data). "a", "b0", and "b1" respectively represent corresponding data buffers; "b0" corresponds to the first data_descriptor shown in FIG. 34, "b1" corresponds to the second data_descriptor, and "a" corresponds to both the two data buffers. A value of 0 or 1 is designated as each of "a", "b0", and "b1". 1 indicates completion of the corresponding data buffer, and 0 indicates incompletion of the corresponding buffer. If 1 is designated as "a", this indicates that the two buffers are simultaneously completed. By combining these three designations of "a", "b0", and "b1", it is possible to individually or simultaneously notify completion of the first buffer, completion of the second buffer, and completion of both the first and second buffers.

FIG. 36 shows the operation of a command block ORB in the SBP-3 improved version, in which access to a status FIFO is performed a plurality of times (in this embodiment, twice). In the operation of the SBP-3 shown in FIG. 33, access to the status FIFO is performed only once. The access to the status FIFO in FIG. 36 is performed by the status block shown in FIG. 35, and 1 is set in the bit of one of "a", "b0", and "b1". For example, when processing for the second buffer is completed, 1 and 0 are set in "b1" and "b0", respectively, in the first access to the status block. When processing for the first buffer is completed, 0 and 1 are set in "b1" and "b0", respectively, in the second access to the status block. Access to the status block is individually performed for these buffers. If completion is notified for both "b0" and "b1", this means that an ORB currently being processed is completed and completion of all commands is notified.

Also, to realize the same operation as the SBP-3, the two buffers can be completed by accessing the status block once by setting 1 in "a".

In the SBP-3, when the two data buffers are completely processed, completion of the ORB is notified by accessing the status block. This operation makes it impossible to notify completion of one data buffer first. In the relationship between a host and a printer, this means that if one data buffer is used for printing data and the other for the status, the status cannot be returned to the host until the printer receives the entire data buffer of the printing data. That is, status information cannot be received at any time. The SBP-3 improved version is so modified that the status FIFO can be returned for each data buffer. Accordingly, the status can be returned independently of printing data.

An example of a command set using the SBP-3 improved version described above will be explained below. A command set is a command for controlling a target device on the protocol. In this embodiment, assume that the target device of the command is a printing device (printer).

Figure 37:
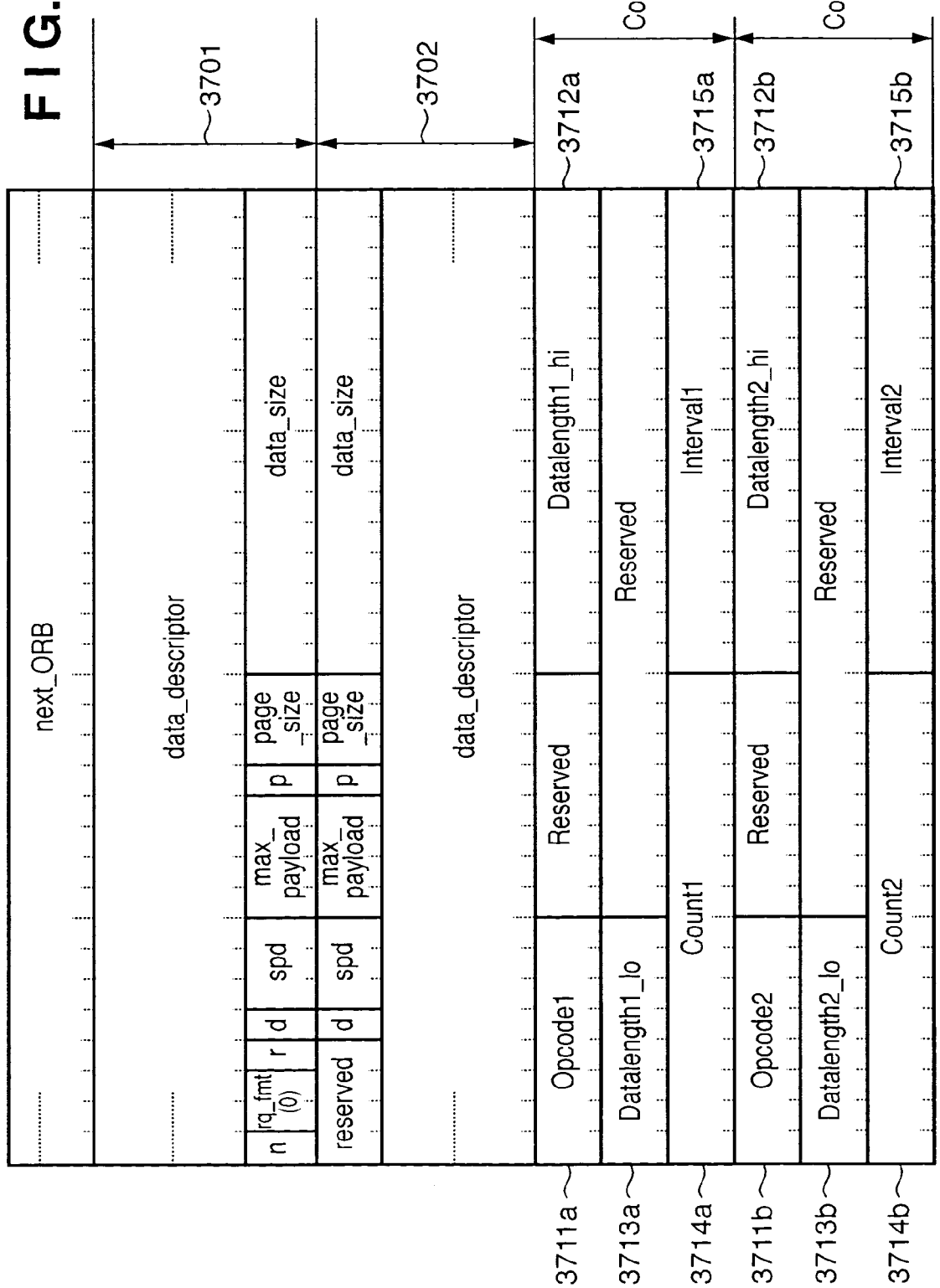
FIG. 37 shows the format of a command block ORB in this embodiment.

FIG. 37 shows details of the arrangement. FIG. 37 shows a format describing in detail the command_block portion shown in FIG. 34. To allow one ORB to handle two commands, commands 1 and 2 (FIG. 37) having the same form are defined. A command corresponding to a portion denoted by reference numeral 3712a is command 1 (Command1), and a command corresponding to a portion denoted by reference numeral 3702 is command 2 (Command2). Each command is made up of Opcode 3711, Datalength_hi 3712, Datalength_lo 3713, Count 3714, and Interval 3715.

Opcode 3711 represents the type of a command to be executed. In the example shown in FIG. 37, WRITE and STATUS are defined. WRITE is a command for writing printing data in the printer, and indicates that data flows from the initiator to the printer as a target. STATUS is a command for acquiring status information of the printer. This status information indicates that data flows from the printer as a target to the initiator. When performing printing, the initiator executes the command for supplying printing data to the printer and at the same acquires the status information of the printer periodically. From the acquired status information, the initiator notifies the user of the printer status. This allows the user to know occurrence of an error or the like in the printer.

Datalength_hi 3712 and Datalength_lo 3713 indicate the amount of data written in the target (printer) from the initiator, or indicate the amount of data written in the initiator from the target (printer). Count 3714 is a value for designating the number of times of execution of the command, and takes a value of 1 or more. Note that −1 means infinite continuation. Interval 3715 is a value for designating a time interval during which the command is executed the number of times designated by Count 3714, and takes a value of 1 or more. In this embodiment, 1 indicates a unit of 1 ms (millisecond). If −1 is designated as the value of Interval 3715, Interval 3715 is not designated. Count 3714 and Interval 3715 define various command execution conditions by combining the two values.

If the command is not completed within the time interval described above, it is determined that this is timeout. Accordingly, Count and Interval can also be used as timeout time by which the command cannot be executed for a predetermined time (Count*Interval). For example, if Count=1 and Interval=1,000 are designated, the command is executed only once. If the command is not executed even after 1,000 ms have elapsed, it is determined that this is timeout, and the initiator is notified of the contents by the status block. If −1 is designated as Interval, the command is not timed out.

Figure 38:
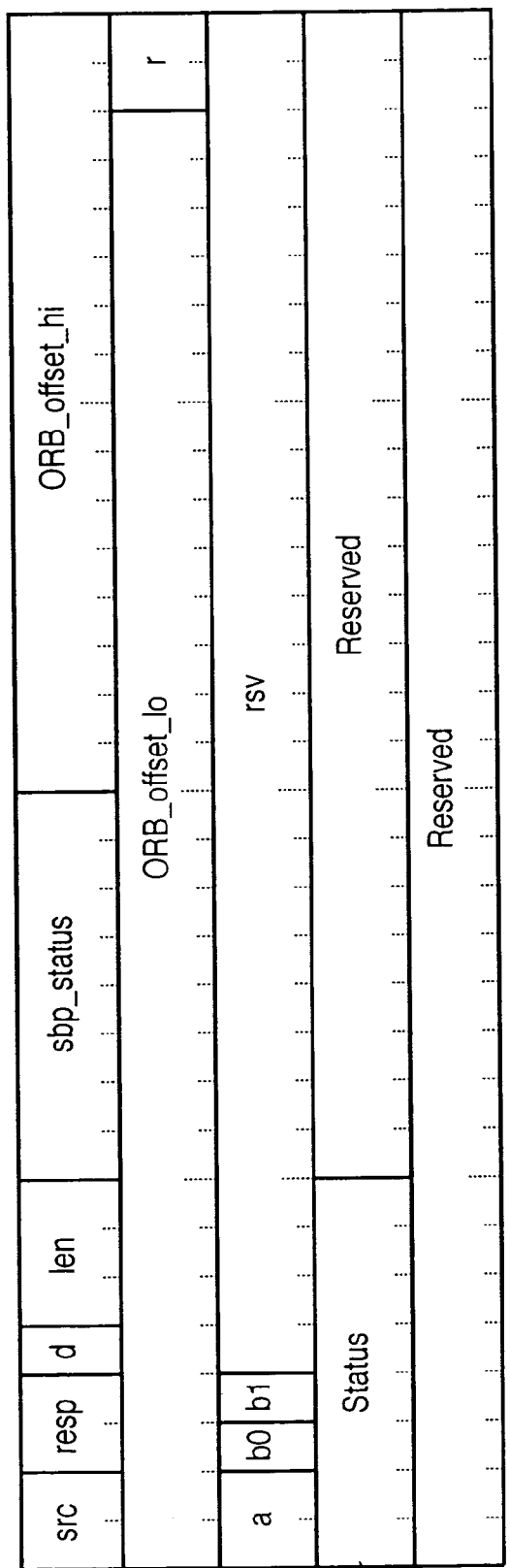
FIG. 38 shows the format of a status FIFO in this embodiment.

FIG. 38 shows details of the status block in this command set. This arrangement shown in FIG. 38 defines a command set dependent portion for the status block in the SBP-3 improved version shown in FIG. 35. The status block for the command is obtained by adding the status to the original form. A status field 3801 shows the completion status of the command. In this embodiment, completion (COMPLETE) and timeout (TIMEOUT) are defined. COMPLETE indicates that the command is normally terminated. TIMEOUT indicates that execution of the command is timed out under the conditions of Count and Interval designated for the command, so the command is not executed.

Figure 39:
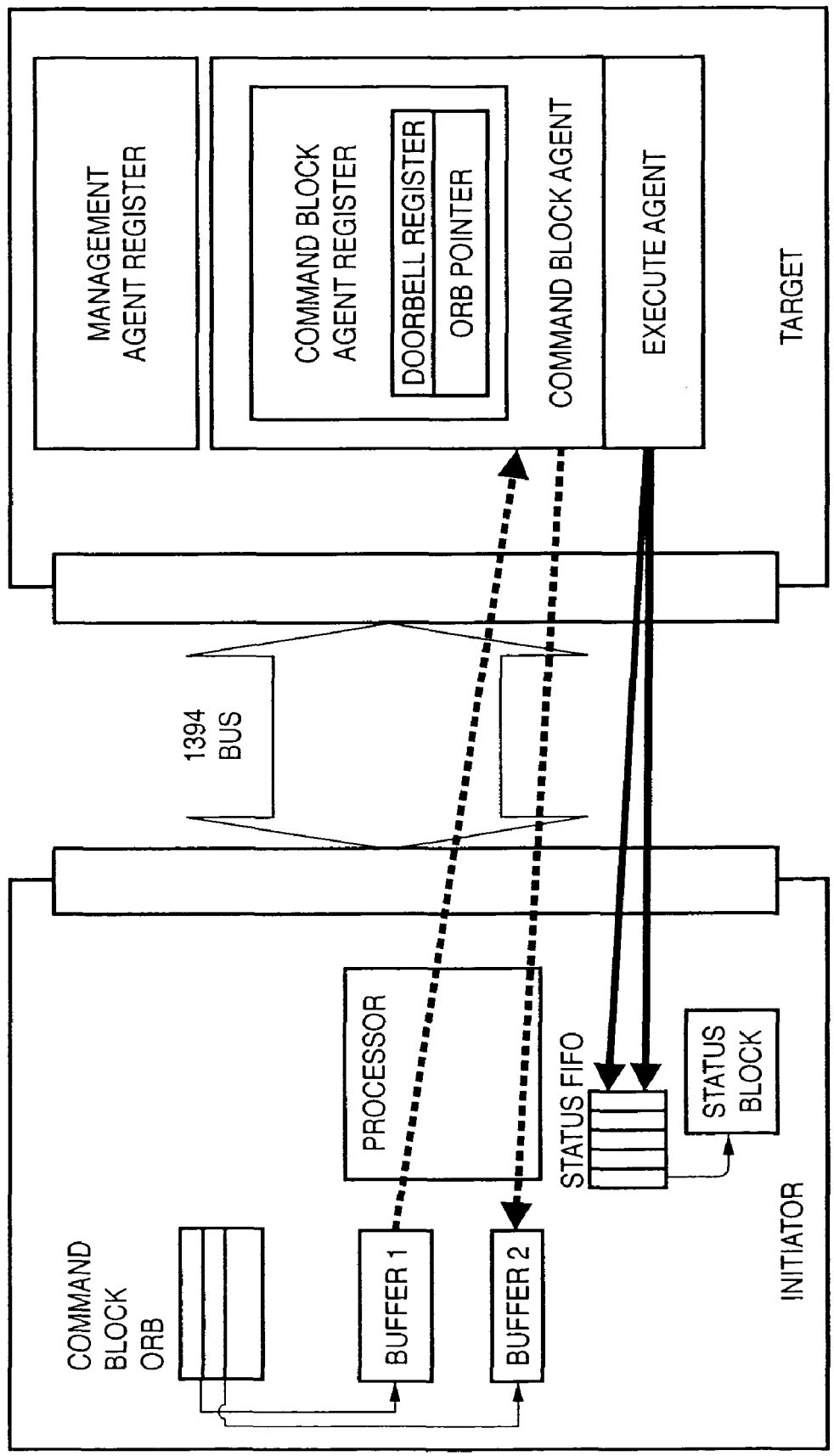
FIG. 39 is a block diagram showing the operation of a command ORB in this embodiment.

FIG. 39 is a block diagram showing flows of printing data and status information between the initiator and the printer, and write to the status block. Referring to FIG. 39, the initiator is one ORB. This ORB has buffer 1 for holding the printing data, and buffer 2 for receiving the status information. To execute a command of the ORB, the printer receives the printing data from buffer 1, and writes the status information of the printer in status buffer 2. When completion of each processing is written in the status block, execution of the two commands with respect to one ORB is completed. The contents of the commands are shown in FIG. 40.

Referring to FIG. 40, for command 1, the address of buffer 1 is set in data_descriptor, and 0 indicating the direction from the initiator to the printer is set in d which indicates the direction. A WRITE command which is a printing data write command is designated in opcode of the command, and Count=1 and Interval=3,000 are designated. This means that the WRITE command is executed once, and that the command is timed out for 3,000 ms if it cannot be executed.

For command 2, the address of buffer 2 is set in data_descriptor, and 1 indicating the direction from the printer to the initiator is set in d which indicates the direction. A STATUS command which is a status information write command is designated in opcode of the command, and Count=−1 and Interval=1,000 are designated. That is, command 2 is execution of STATUS which is a status information acquisition command, and Count=−1 and Interval=1,000 are designated. This means that the STATUS command is infinitely executed at a time interval of 1,000 ms. The command ORB shown in FIG. 40 designates execution of the two commands WRITE and STATUS.

FIG. 41 shows an example of a status block which the printer writes when the above commands are normally executed. To indicate completion by one status block, 1 is set in a flag "a" (FIG. 38), and COMPLETE is designated in Status 3801. When write of this status block is completed, the contents set in buffer 2 become the latest status information, and the user can be notified of the printing status by using this information.

If the two commands are simultaneously executable as shown in FIGS. 40 and 41, no particular problem arises. In an actual printer, however, two commands cannot be executed at the same time in some cases. Although it depends on the type of printer and the contents of the configuration of a printer, an inkjet printer, for example, has a time period (e.g., paper feed, paper discharge, or recovery) during which no printing data can be received. If any of these events occurs, the printing operation is temporarily stopped. Consequently, a printing buffer is filled with already received printing data, so no subsequent printing data can be received. Generally, a status command can be executed in many cases even in a situation like this. A command issued exactly in a case like this cannot be executed until the printer becomes able to receive printing data, if Count and Interval indicated in this embodiment are not designated.

Figure 42A:
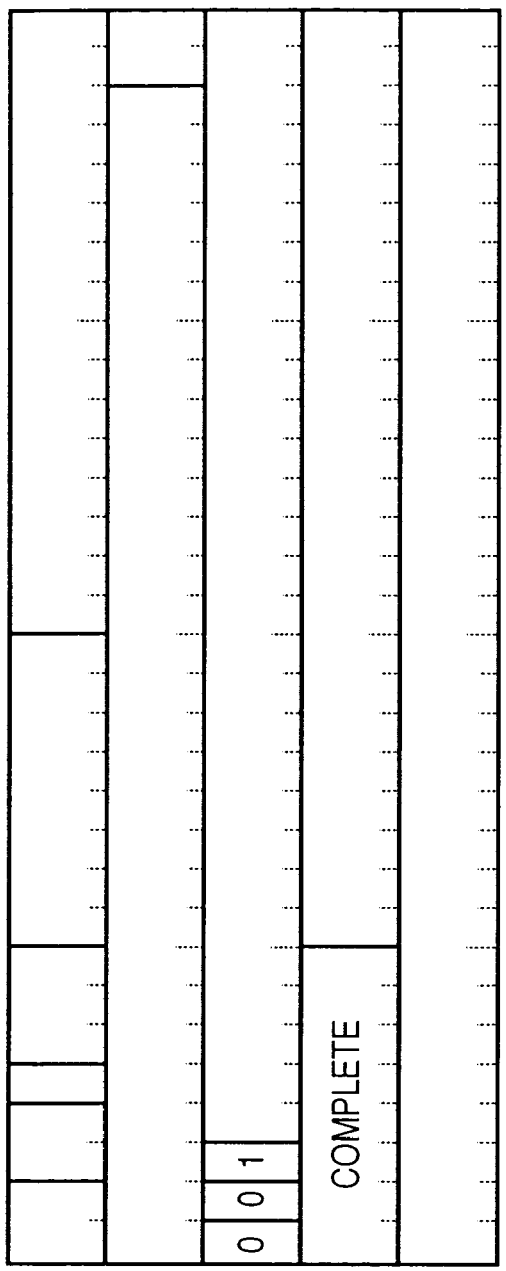
FIGS. 42A and 42B are diagrams showing a practical example of a timed out status FIFO in this embodiment.
Figure 42B:
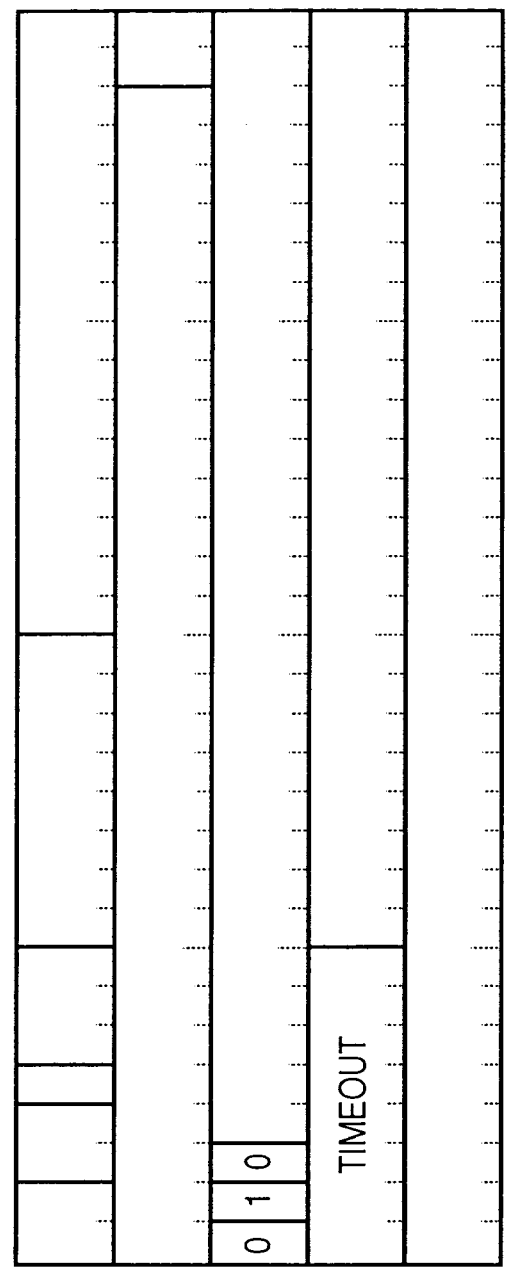

FIGS. 42A and 42B illustrate the contents written in the status block when the commands shown in FIG. 40 are executed in the state in which the printer is unable to receive printing data, i.e., in the state in which the target is unable to receive data from the initiator. As shown in FIG. 42A, status information can be written in the status block in response to the STATUS command even when printing data cannot be received. Accordingly, this write is normally performed, so COMPLETE is written. In this STATUS command, 1,000 ms is designated as Interval, and infinity is designated by setting −1 in Count as the number of times of execution. Therefore, write of new status information is executed at an interval of 1,000 ms, and COMPLETE is written in the status block as shown in FIG. 42A.

In the WRITE command, 3,000 ms is designated as Interval. Therefore, COMPLETE can be written in the status block if the state in which the printer is unable to receive printing data is eliminated within 3,000 ms. If not, write in the status block is performed by TIMEOUT as shown in FIG. 42B. In this case, TIMEOUT occurs because the WRITE command is not properly executed, so the initiator must stop printing or retry printing by the same data. The initiator can detect TIMEOUT by the status block, and determine how to continue the processing after that. Even while the WRITE command cannot be executed because the printer cannot receive printing data, the other command (STATUS command) can be executed at the designated predetermined interval. So, the latest status information can be received even at this time.

Also, since the time of timeout can be designated, TIMEOUT can be effectively used to interrupt execution of printing.

<Outlines of Procedures in Embodiment>

FIGS. 43 to 46 are flow charts showing outlines of processes performed by the initiator and target described above.

Figure 43:
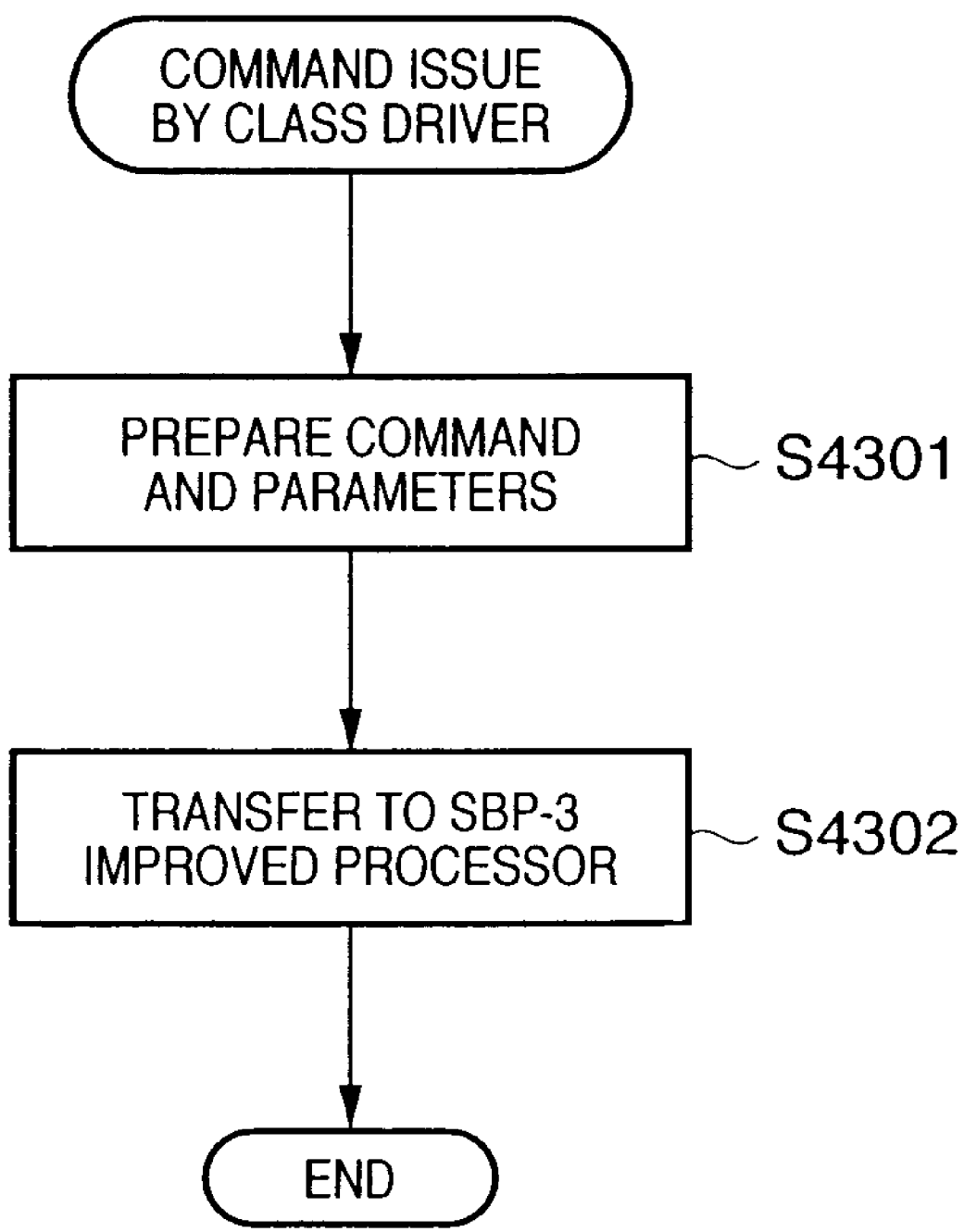
FIG. 43 is a flow chart showing an example of a procedure performed by a class driver in this embodiment.

FIG. 43 is a procedure when the class driver 102 shown in FIG. 1 issues a command. This procedure is performed when the printer driver 101 requests the class driver 102 to issue data such as a PDL command list to the printer as a target. The printer driver 101 calls a function provided by the class driver 102 by using data and parameters such as the number of times of execution and time interval of a command described above, and the command itself. It is of course possible to designate up to two commands. In addition, parameters such as the number of times of execution, time interval, and data length belonging to a command are designated for each command. As already explained above, the number of commands may also be 1.

The class driver 102 forms a command block from the command (step S4301), and transfers this command block together with the designated parameters to the processor 111 (FIG. 1) of the SBP-3 (step S4302). The processor 111 describes the address and data length corresponding to the transferred parameters in the data_descriptor field and data_size field, respectively, and describes the direction field d and the like on the basis of the type of command, thereby forming ORBs shown in FIG. 37. Then, the processor 111 chains the formed ORBs to the ORB list.

The chained ORBs are sequentially processed in the ordered model, or processed in an appropriate order in the unordered model.

Write to the doorbell register 121 triggers the target 1b to perform the ORB processing. The command block agent 122 of the target copies the address of the first one of the ORBs chained by the initiator 1a to the ORB pointer 124, and notifies the execute agent 123 of the reception of the ORB.

Figure 44:
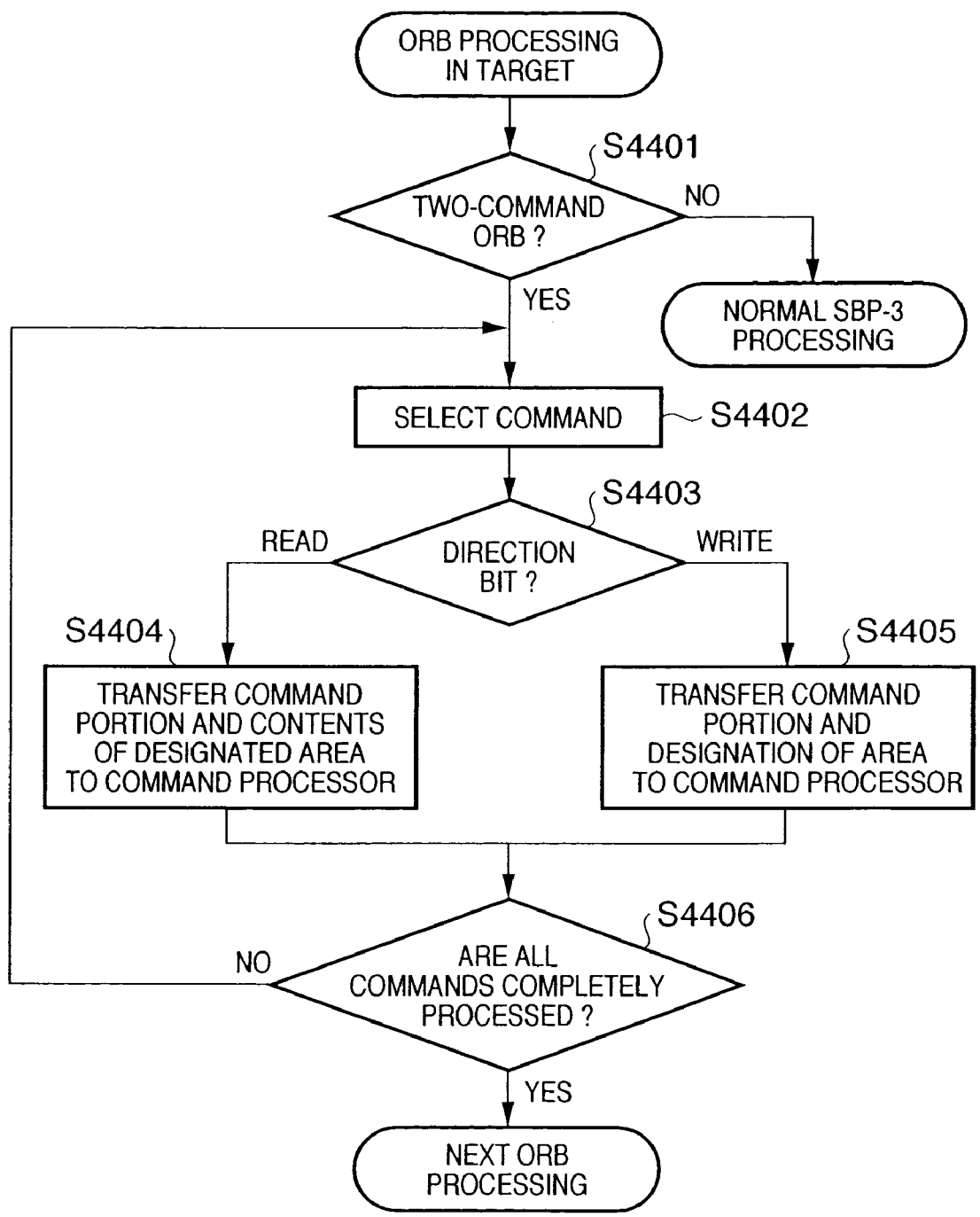
FIG. 44 is a flow chart showing an example of a procedure performed by an execute agent in this embodiment.

FIG. 44 is a flow chart showing the ORB procedure performed by the execute agent 123.

In step S4401, the request format field of the ORB indicated by the ORB pointer 124 is tested. If the result is 1, it is determined that this ORB contains two commands. This ORB will be simply referred to as a two-command ORB hereinafter. If the ORB is not a two-command ORB, a normal SBP-3 (or SBP-2) procedure is performed.

If the ORB is a two-command ORB, one command is selected in step S4402, and the direction bit d is checked in step S4403. If this direction bit indicates the direction from the initiator to the target, the data is to be transferred from the initiator to the target. In step S4404, therefore, the data is read out in accordance with the command portion of the ORB and the buffer address (data_descriptor) and size (data_size), and transferred to the command processor 103.

If the direction bit d indicates the direction from the target to the initiator, the data is to be transferred from the target to the initiator. Therefore, the command portion of the ORB and the address (data_descriptor) and size (data_size) of a buffer area in which the data is to be written are transferred to the command processor 103.

In step S4406, whether the two commands in the ORB of interest are completely processed is determined. If NO in step S4406, the flow returns to step S4402.

FIG. 45 shows a procedure by which the command processor 103 processes the data transferred in step S4404 or S4405 in FIG. 44.

In step S4501, the command processor 103 analyzes the command. In step S4502, the command processor 103 performs processing corresponding to the contents of the command. If the command is a write command, the command processor transfers the contents of the buffer received from the execute agent to the PDL processor 104. If the command is a status command, the command processor 103 reads the status (or causes the PDL processor to read the status), and transfers the read status to the class driver 102. This processing will be explained later.

In step S4503, in accordance with the time interval designated in the interval field of the command, the command processor 103 sets a response monitor timer. Then, the command processor waits for a response (e.g., success, failure, or timeout) to the processing, i.e., enters a response waiting state. This state depends on the processing system of the target. For example, it is possible to select several processes such as to terminate the task once or continue it. However, if the task is terminated once, a response must be asynchronously processed. Accordingly, an identifier or the like for relating command processing to its response must be managed for each command.

When the response is returned, the command processor 103 checks the contents in step S4504. If timeout occurs, however, the command processor 103 presumably detects the occurrence of timeout by timer expiration interrupt. Therefore, the command processor 103 determines to which command the timeout has occurred.

If the contents of the response indicate success of the processing, the flow advances to step S4504 to prepare the contents of the status block indicating "success". If timeout occurs, the flow advances to step S4505 to prepare the contents of the status block indicating "timeout". If another status occurs, the contents corresponding to the status are naturally prepared.

In step S4507, the prepared contents of the status are transferred to the execute agent 123. The execute agent 123 knocks (writes) the unsolicited register prepared in the initiator to notify the initiator of the presence of the status block.

Finally, in step S4508, the command processor 123 determines whether the command is repetitively executed by the number of times of execution designated in the count field of the command. If NO in step S4508, the command processor 123 repeats the processing from step S4502. The remaining number of times of repetition is of course decremented by 1, and the obtained value is tested in step S4508 for the next time.

Figure 46:
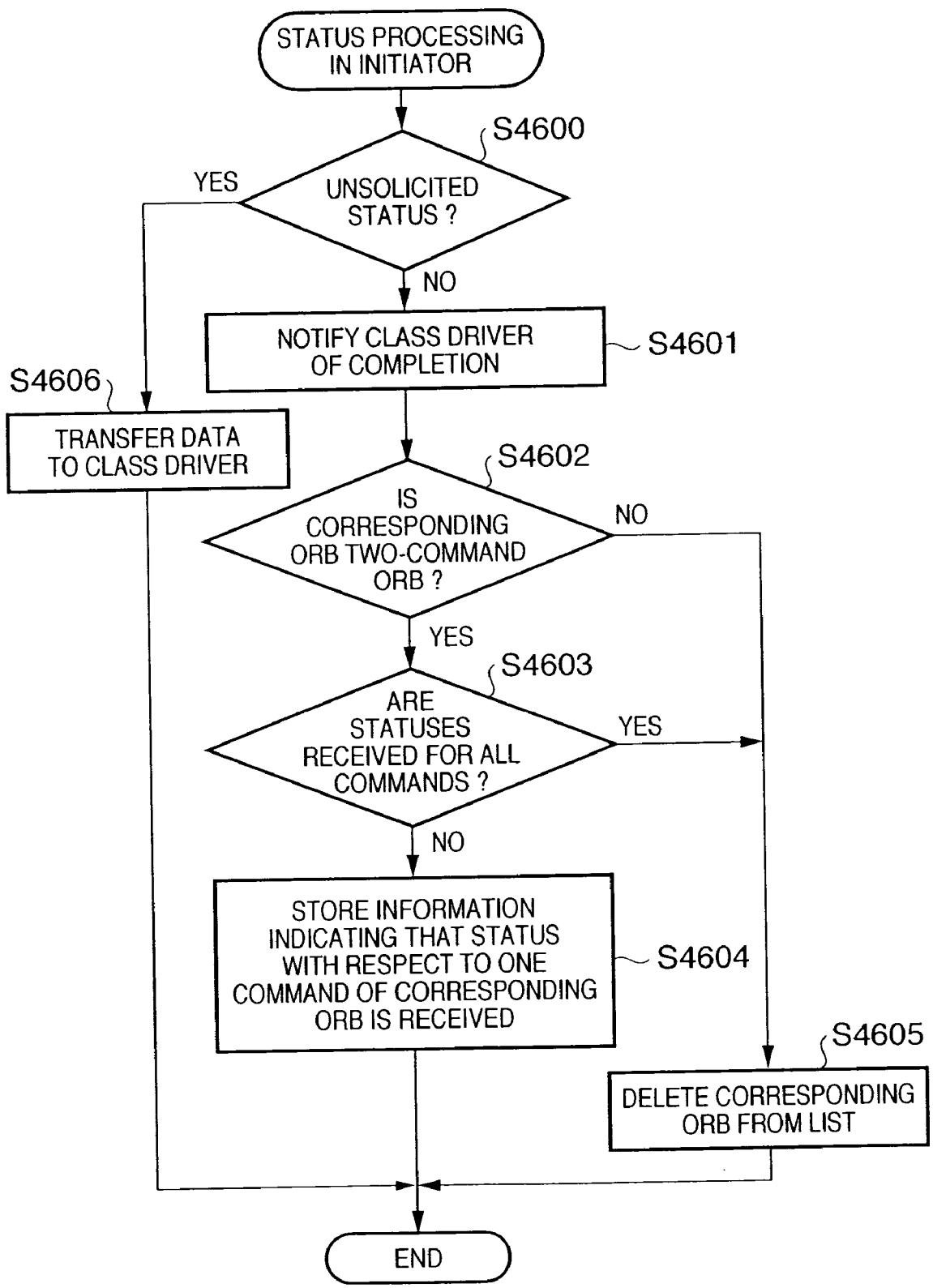
FIG. 46 is a flow chart showing an example of a status block procedure performed by an initiator in this embodiment.

FIG. 46 is a procedure performed by the processor 111 in the initiator which has received the status block.

In step S4600, the processor 111 determines whether the received status block is an unsolicited status, i.e., whether the corresponding ORB is chained to the ORB list. If the status block is an unsolicited status, the processor 111 transfers the contents of the buffer contained in or attached to the status block to the class driver 102, thereby allowing the class driver 102 to perform the processing.

If the status block is not an unsolicited status, the processor 111 notifies the class driver 102 of termination (e.g., success or timeout) in step S4601. In step S4602, the processor 111 determines whether the corresponding ORB is a two-command ORB.

If the ORB is a two-command ORB, the processor 111 determines in step S4603 whether status blocks corresponding to the two commands are received. This determination can be performed by recording the log of reception of status blocks corresponding to command 1 and command 2 in relation to ORBs.

If status blocks corresponding to all commands are received, the processor deletes the corresponding ORB from the ORB list in step S4605. If a status block corresponding to only one command is received, the processor 111 records this information and terminates the processing in step S4604.

By the above procedure, two commands can be placed on one ORB, and each command can be executed by the designated number of times at the designated time interval. Alternatively, the time of timeout can be set for each command.

In addition, since a two-command ORB is not deleted until status blocks corresponding to the two commands are received, data can be reliably transferred from the initiator to the target. Also, even when the transmission waiting timer of the initiator times out, the data can be retransmitted. Once the data (command) is transferred to the target, a status from the target is processed as an unsolicited status. Accordingly, the ORB list is not filled with ORBs, so the process is not delayed.

When the SBP-3 is used, two commands can be executed by one ORB, but there is no means for confirming the completion for each command. In the SBP-3 improved version obtained by improving this point, the completion can be notified for each command. Furthermore, in this embodiment the conditions of completion can be designated for each command. Therefore, even in a situation in which one command cannot be executed due to the contents of the command or the device configuration, the other command can be effectively executed as expected.

In the above procedure, a response to two commands can be returned by one status block if, for example, it is presumably possible to obtain responses to two commands substantially at the same time. This operation is applicable when, e.g., the two commands are identical and the numbers of times of execution (Count) and time intervals (Interval) of the two commands are identical.

<Hardware Configuration of Printer System>

Finally, the hardware configurations of a host apparatus 51 (corresponding to 1*a* in FIG. 1) as an initiator and a printer 52 (corresponding to 1*b* in FIG. 1) as a target will be explained below. FIG. 47 is a block diagram showing outlines of the hardware configurations of the host apparatus 51 and printer 52 forming an information processing system.

As shown in FIG. 47, the entire host apparatus 51 is formed by a processor 1000 and peripheral devices. The image output apparatus 52 has a driving unit which includes a printhead 3010, a carrier (CR) motor 3011 for driving a carrier which carries the printhead 3010, a conveyor motor 3012 for conveying sheets of paper, and a control circuit unit 3003.

The processor 1000 of the host apparatus 51 includes an MPU 1001 for controlling the whole host apparatus in accordance with a control program, a bus 1002 for connecting the system constituent elements, a DRAM 1003 for temporarily storing programs, data, and the like to be executed by the MPU 1001, a bridge 1004 for connecting a system bus, a memory bus, and the MPU 1001, and a graphic adaptor 1005 having a control function of displaying graphic information on a display device 2001 such as a CRT.

In addition, the processor 1000 includes an HDD controller 1006 for interfacing with an HDD 2002, a keyboard controller 1007 for interfacing with a keyboard 2003, and a communication I/F 1008 which is the IEEE1394 for communicating with the printer 52 in accordance with the IEEE1394 standard.

The processor 1000 is also connected to the display device 2001 (in this embodiment, a CRT) for displaying graphic information and the like to the user via the graphic adaptor 1005. Furthermore, the processor 1000 is connected to the hard disk drive (HDD) 2002 which is a large-capacity storage device storing programs and data, and to the keyboard 2003, via their respective controllers.

The control circuit unit 3003 of the printer 52 includes an MCU 3001 which has both a control program executing function and peripheral device control function and controls the whole printer 52, a system bus 3002 for connecting the individual constituent elements in the control circuit, and a gate array (G.A.) which includes, as control circuits, a mechanism for supplying printing data to the printhead 3010, a memory address decoding mechanism, a mechanism for generating a control pulse to be supplied to the carrier motor, and the like.

The control circuit unit 3003 also includes a ROM 3004 storing control programs to be executed by the MCU 3001, host printing information, and the like, a DRAM 3005 for saving various data (e.g., image printing information and printing data to be supplied to the head), a communication I/F 3006 which is a serial interface for communicating with the host apparatus 51 in accordance with the IEEE1394 standard, and a head driver 3007 for converting an output head printing signal from the gate array 3003 into an electrical signal for driving the printhead 3010.

Furthermore, the control circuit unit 3003 includes a CR motor driver 3008 for converting an output carrier motor control pulse from the gate array 3003 into an electrical signal for actually driving the carrier (CR) motor 3011, and an LF motor driver 3009 for converting an output conveyor motor control pulse from the MCU 3001 into an electrical signal for actually driving the conveyor motor.

In the present invention as has been described above, when a command block containing a plurality of commands is to be processed in a secondary apparatus, the conditions of execution can be designated for each command. Therefore, even when one command cannot be executed due to the contents of the command or the device configuration, the other command can be effectively executed as expected.

As many apparently widely different embodiments of the present invention can be made without departing from the spirit and scope thereof, it is to be understood that the invention is not limited to the specific embodiments thereof except as defined in the appended claims.

What is claimed is:

1. An information processing system including first and second apparatuses, wherein
said first apparatus comprises a transmitting unit that transmits to said second apparatus a first request to execute data communication with each of a plurality of data storage areas and a second request to execute data communication with each of a plurality of data storage areas, wherein the first request designates the plurality of data storage areas and the second request designates the plurality of data storage areas; and said second apparatus comprises:

a first completion notifying unit that transmits to said first apparatus a first notification indicating that data communication with one of said plurality of data storage areas designated by the first request is completed by said second apparatus;

a second completion notifying unit that transmits to said first apparatus a second notification indicating that data communication with another one of said plurality of data storage areas designated by the first request is completed by said second apparatus, separately from the first notification; and a third completion notifying unit that transmits to said first apparatus a third notification indicating that data communication with one of said plurality of data storage areas designated by the second request and data communication with another one of said plurality of data storage areas designated by the second request are completed by said second apparatus.

2. The system according to claim 1, wherein said first completion notifying unit and said second completion notifying unit independently transmit the notifications.

3. The system according to claim 1, wherein said first completion notifying unit transmits the first notification indicating that the data communication with the one of said plurality of data storage areas is completed by said second apparatus and that the data communication with the another one of said plurality of data storage areas is not completed by said second apparatus, and said second completion notifying unit transmits the second notification indicating that the data communication with the one of said plurality of data storage areas is not completed by said second apparatus and that the data communication with the another one of said plurality of data storage areas is completed by said second apparatus.

4. The system according to claim 1, wherein the data communication with the one of the plurality of data storage areas and the another one of the plurality of data storage areas includes writing data in the data storage areas or reading data from the data storage areas.

5. An information processing system including first and second apparatuses, wherein said first apparatus comprises two data buffers allocated to a first command ORB, two data buffers allocated to a second command ORB and a transmitter that transmits a command ORB to said second apparatus; and said second apparatus comprises:

a descriptor for performing data communication with each of said two data buffers allocated to each of the first command ORB and the second command ORB;

a first completion notifying unit that transmits to said first apparatus a first notification indicating that data communication with one of said two data buffers allocated to the first command ORB is completed by said second apparatus;

a second completion notifying unit that transmits, separately from the first notification, to said first apparatus a second notification indicating that data communication with the other of the two data buffers allocated to the first command ORB is completed by said second apparatus; and a third completion notifying unit that transmits to said first apparatus a notification indicating that data communication with one of said two data buffers allocated to the second command ORB and data communication with the other of the two data buffers allocated to the second command ORB are completed by said second apparatus.

6. A method of communication between first and second apparatuses, comprising the steps of:

a first request transmitting step of transmitting a first request to execute data communication with each of a plurality of data storage areas, from the first apparatus to the second apparatus, wherein the first request designates the plurality of data storage areas;

a first notification transmitting step of transmitting from the second apparatus to the first apparatus a first notification indicating that data communication with one of the plurality of data storage areas designated by the first request is completed by the second apparatus;

a second notification transmitting step of transmitting from the second apparatus to the first apparatus a second notification indicating that data communication with another one of the plurality of data storage areas designated by the first request is completed by the second apparatus, separately from the first notification;

a second request transmitting step of transmitting a second request to execute data communication with each of a plurality of data storage areas, from the first apparatus to the second apparatus, wherein the second request designates the plurality of data storage areas; and a third notification transmitting step of transmitting from the second apparatus to the first apparatus a notification indicating that data communication with one of the plurality of data storage areas designated by the second request and data communication with another one of the plurality of data storage areas designated by the second request are completed by the second apparatus.

7. The method according to claim 6, wherein the first and second apparatuses are connected by a communication control bus based on IEEE1394.

8. The method according to claim 6, wherein in the first request transmitting step and the second request transmitting step, each of the first request and the second request includes identification information indicating each of the plurality of data storage areas and commands corresponding to each of the plurality of data storage areas.

9. The method according to claim 8, wherein the second apparatus writes data in a data storage area indicated by the identification information, or reads data from a data storage area indicated by the identification information, in accordance with the command.

10. An information processing apparatus that communicates with another apparatus, comprising:

a request transmitting unit that transmit to said another apparatus a first request to execute data communication with each of a plurality of data storage areas and a second request to execute data communication with each of a plurality of data storage areas, wherein the first request designates the plurality of data storage areas and the second request designates the plurality of data storage areas;

a first reception unit that receives from said another apparatus a first completion notification indicating that data communication with one of said plurality of data storage areas designated by the first request is completed by said another apparatus;

a second reception unit that receives from said another apparatus a second notification indicating that data communication with another one of said plurality of data storage areas designated by the first request is completed by said another apparatus, said second notification being received separately from said first notification; and a third reception unit that receives from said another apparatus a third notification indicating that data communication with one of said plurality of data storage areas designated by the second request and data communication with another one of said data storage areas designated by the second request are completed by the another apparatus.

11. The apparatus according to claim 10, wherein each of the first request and the second request transmitted by the request transmitting unit includes identification information indicating each of said plurality of data storage areas, and commands corresponding to each of said plurality of data storage areas.

12. An information processing apparatus communicates with another apparatus, comprising:

a receiving unit that receives from the another apparatus a first request to execute data communication with each of a plurality of data storage areas and a second request to execute data communication with each of a plurality of data storage areas, from said another apparatus, wherein the first request designates the plurality of data storage areas and the second request designates the plurality of data storage areas;

a first completion notifying unit that transmits to said another apparatus a first notification indicating that data communication with one of said plurality of data storage areas designated by the first request is completed by said information processing apparatus;

a second completion notifying unit that transmits to said another apparatus a second notification indicating that data communication with another one of said plurality of data storage areas designated by the first request is completed by information processing apparatus, said second notification being transmitted separately from said first notification; and a third completion notifying unit that transmits to said another apparatus a third notification indicating that data communication with one of said plurality of data storage areas designated by the second request and that data communication with another one of said plurality of data storage areas designated by the second request is completed by the information processing apparatus.

13. The apparatus according to claim 12, further comprising a determining unit that determines, on the basis of identification information included in each of the first request and the second request designating each of said plurality of data storage areas, whether a data storage area is designated by a previously received request.

14. The apparatus according to claim 13, further comprising a data communicating unit that writes data in a data storage area indicated by the identification information, or reads data from a data storage area indicated by the identification information.

15. The apparatus according to claim 12, wherein said first completion notifying unit transmits the first notification indicating that the data communication with the one of said plurality of data storage areas is completed by said information processing apparatus and that the data communication with the another one of said plurality of data storage areas is not completed by said information processing apparatus, and said second completion notifying unit transmits the second notification indicating that the data communication with the one of said plurality of data storage areas is not completed by said information processing apparatus and that the data communication with the another one of said plurality of data storage areas is completed by said information processing apparatus.

16. The apparatus according to claim 12, wherein the data communication with the one of the plurality of data storage areas and the another one of the plurality of data storage areas includes writing data in the data storage areas or reading data from the data storage areas.

* * * * *

UNITED STATES PATENT AND TRADEMARK OFFICE
CERTIFICATE OF CORRECTION

| | |
|---|---|
| PATENT NO. | : 7,346,714 B2 |
| APPLICATION NO. | : 10/654025 |
| DATED | : March 18, 2008 |
| INVENTOR(S) | : Fukunaga et al. |

It is certified that error appears in the above-identified patent and that said Letters Patent is hereby corrected as shown below:

<u>On the Title Page, item [56]</u>:
<u>OTHER PUBLICATIONS</u>:
    P. Johansson: "Revision 11", should read -- Revision 1f" --.

<u>DRAWINGS</u>:
    FIG. 47, block entitled CR MOTOR, reference numeral "3010" should read -- 3011 --.

<u>COLUMN 5</u>:
    Line 61, "institute" should read -- Institute --.

<u>COLUMN 8</u>:
    Line 40, "manger" should read -- manager --.

<u>COLUMN 9</u>:
    Line 10, "designate" should read -- designates --;
    Line 26, "vender" should read -- vendor --;
    Line 36, "vender" should read -- vendor -; and
    Line 55, "vender" should read -- vendor --.

<u>COLUMN 12</u>:
    Line 58, "apper" should read -- upper --.

<u>COLUMN 14</u>:
    Line 19, "manger" should read -- manager --; and
    Line 42, "manger" should read -- manager --.

<u>COLUMN 17</u>:
    Line 49, "IEEE1394-199." should read -- IEEE1394-1995. --.

<u>COLUMN 18</u>:
    Line 63, "rearranging" should read -- rearrange --.

<u>COLUMN 23</u>:
    Line 22, "same acquires" should read -- same time acquires --.

<u>COLUMN 30</u>:
    Line 55, "transmit" should read -- transmits --.

UNITED STATES PATENT AND TRADEMARK OFFICE
CERTIFICATE OF CORRECTION

PATENT NO. : 7,346,714 B2
APPLICATION NO. : 10/654025
DATED : March 18, 2008
INVENTOR(S) : Fukunaga et al.

It is certified that error appears in the above-identified patent and that said Letters Patent is hereby corrected as shown below:

<u>COLUMN 31</u>:
    Line 21, "apparatus communicates" should read -- apparatus that communicates --; and
    Line 40, "by information" should read -- by said information --.

<u>COLUMN 32</u>:
    Line 7, "is" should read -- are --.

Signed and Sealed this

Twenty-first Day of October, 2008

JON W. DUDAS
*Director of the United States Patent and Trademark Office*